United States Patent
Daley et al.

(10) Patent No.: US 12,527,875 B2
(45) Date of Patent: Jan. 20, 2026

(54) METHODS FOR TREATING GRAFT VERSUS HOST DISEASE

(71) Applicant: Evive Biotechnology (Shanghai) Ltd, Shanghai (CN)

(72) Inventors: William Daley, Shanghai (CN); Xiaoqiang Yan, Shanghai (CN)

(73) Assignee: Evive Biotechnology (Shanghai) Ltd, Shanghai (CN)

( * ) Notice: Subject to any disclaimer, the term of this patent is extended or adjusted under 35 U.S.C. 154(b) by 705 days.

(21) Appl. No.: 17/800,827

(22) PCT Filed: Feb. 19, 2021

(86) PCT No.: PCT/CN2021/076929
§ 371 (c)(1),
(2) Date: Aug. 18, 2022

(87) PCT Pub. No.: WO2021/164744
PCT Pub. Date: Aug. 26, 2021

(65) Prior Publication Data
US 2023/0084309 A1    Mar. 16, 2023

Related U.S. Application Data

(60) Provisional application No. 62/978,650, filed on Feb. 19, 2020.

(51) Int. Cl.
*A61K 47/64*    (2017.01)
*A61K 31/573*   (2006.01)
*A61P 37/06*    (2006.01)

(52) U.S. Cl.
CPC .......... *A61K 47/642* (2017.08); *A61K 31/573* (2013.01); *A61P 37/06* (2018.01)

(58) Field of Classification Search
CPC .............................. A61K 47/642; A61K 38/20
See application file for complete search history.

(56) References Cited

U.S. PATENT DOCUMENTS

| | | |
|---|---|---|
| 4,179,337 A | 12/1979 | Davis |
| 4,301,144 A | 11/1981 | Iwashita |
| 4,399,216 A | 8/1983 | Axel |
| 4,496,689 A | 1/1985 | Mitra |
| 4,640,835 A | 2/1987 | Shimizu |
| 4,657,760 A | 4/1987 | Kung |
| 4,670,417 A | 6/1987 | Iwasaki |
| 4,683,195 A | 7/1987 | Mullis et al. |
| 4,683,202 A | 7/1987 | Mullis |
| 4,791,192 A | 12/1988 | Nakagawa |
| 4,849,227 A | 7/1989 | Cho |
| 4,943,529 A | 7/1990 | Van den Berg |
| 4,965,188 A | 10/1990 | Mullis |
| 5,010,182 A | 4/1991 | Brake |
| 5,206,344 A | 4/1993 | Katre |
| 5,225,212 A | 7/1993 | Martin |
| 5,428,130 A | 6/1995 | Capon |
| 5,500,362 A | 3/1996 | Robinson |
| 5,624,821 A | 4/1997 | Winter |
| 5,648,260 A | 7/1997 | Winter |
| 5,654,010 A | 8/1997 | Johnson |
| 5,821,337 A | 10/1998 | Carter |
| 6,194,551 B1 | 2/2001 | Idusogie |
| 6,274,710 B1 | 8/2001 | Dumoutier |
| 6,306,908 B1 | 10/2001 | Carlson et al. |
| 6,331,613 B1 | 12/2001 | Dumoutier |
| 6,359,117 B1 | 3/2002 | Dumoutier |
| 6,551,799 B2 | 4/2003 | Gurney |
| 6,737,056 B1 | 5/2004 | Presta |
| 6,797,493 B2 | 9/2004 | Sun |
| 7,226,591 B2 | 6/2007 | Gurney |
| 7,307,161 B1 | 12/2007 | Jacobs |
| 7,332,581 B2 | 2/2008 | Presta |
| 7,371,826 B2 | 5/2008 | Presta |
| 7,459,533 B2 | 12/2008 | Jacobs |
| 7,537,761 B2 | 5/2009 | Xu et al. |
| 7,585,646 B2 | 9/2009 | Jacobs |
| 7,651,694 B2 | 1/2010 | Lee |
| 7,666,402 B2 | 2/2010 | Huang |
| 7,696,158 B2 | 4/2010 | Huang |
| 7,718,604 B2 | 5/2010 | Huang |
| 7,972,833 B2 | 7/2011 | Dumoutier |
| 7,981,448 B2 | 7/2011 | Otterbein et al. |

(Continued)

FOREIGN PATENT DOCUMENTS

| | | |
|---|---|---|
| CA | 2695734 A1 | 2/2009 |
| CA | 2705007 A1 | 5/2009 |

(Continued)

OTHER PUBLICATIONS

Adachi, M. et al. (2005). "Clinical Syndromes of Alcoholic Liver Disease," Digestive Diseases 23(3-4):255-263.
Adams, L.A. et al. (2006). "Treatment of Non-Alcoholic Fatty Liver Disease," Postgrad Med J 82:315-322.
Afrazi, A. et al. (May 1, 2012, Epub Mar. 28, 2012) "Intracellular Heat Shock Protein-70 Negatively Regulates TLR4 Signaling in The Newborn Intestinal Epithelium," J Immunol. 188(9):4543-4557.

(Continued)

*Primary Examiner* — Prema M Mertz
(74) *Attorney, Agent, or Firm* — MORRISON & FOERSTER LLP

(57) ABSTRACT

Provided are methods for treating graft versus host disease (GvHD) by administering a composition an agent comprising an IL-22 (such as an IL-22 dimer), and optionally an immunosuppressive therapy. The treatment can be administered for multiple cycles which are separated by a rest period and/or individuals who have a specific Ann Arbor score or a characterized gut microbiota profile. Also provided are methods of identifying or selecting individuals suitable for such treatments.

20 Claims, 6 Drawing Sheets
Specification includes a Sequence Listing.

(56) References Cited

U.S. PATENT DOCUMENTS

| | | |
|---|---|---|
| 8,048,984 B2 | 11/2011 | Jacobs |
| 8,178,082 B2 | 5/2012 | Gurney |
| 8,178,675 B2 | 5/2012 | Romantsev |
| 8,945,528 B2 | 2/2015 | Yan |
| 8,956,605 B2 | 2/2015 | Huang |
| 8,980,949 B2 | 3/2015 | Bar-yosef et al. |
| 9,352,024 B2 | 5/2016 | Wu |
| 9,629,898 B2 | 4/2017 | Yan |
| 10,087,227 B2 | 10/2018 | Scheer |
| 10,160,793 B2 | 12/2018 | Scheer |
| 10,543,169 B2 | 1/2020 | Yan |
| 10,786,551 B2 | 9/2020 | Huang et al. |
| 11,510,966 B2 | 11/2022 | Kolls et al. |
| 11,564,973 B2 | 1/2023 | Van Den Brink |
| 11,654,104 B2 | 5/2023 | Yan et al. |
| 2001/0023070 A1 | 9/2001 | Ebner et al. |
| 2002/0102723 A1 | 8/2002 | Gurney |
| 2003/0100076 A1 | 5/2003 | Gurney |
| 2003/0186387 A1 | 10/2003 | Ebner |
| 2003/0235561 A1 | 12/2003 | Vandenburgh et al. |
| 2004/0258623 A1 | 12/2004 | Xu et al. |
| 2005/0014934 A1 | 1/2005 | Hinton |
| 2005/0148029 A1 | 7/2005 | Buechler et al. |
| 2007/0172457 A1 | 7/2007 | Ebner |
| 2007/0207943 A1 | 9/2007 | Ebner |
| 2008/0031882 A1 | 2/2008 | Liang et al. |
| 2008/0069798 A1 | 3/2008 | Huang et al. |
| 2008/0069799 A1 | 3/2008 | Huang et al. |
| 2008/0138314 A1 | 6/2008 | Huang et al. |
| 2008/0241246 A1 | 10/2008 | Sakthivel et al. |
| 2008/0293629 A1 | 11/2008 | Rosen et al. |
| 2009/0202475 A1 | 8/2009 | Abbas |
| 2009/0221008 A1 | 9/2009 | Yu et al. |
| 2010/0015086 A1 | 1/2010 | Huang et al. |
| 2010/0255508 A1 | 10/2010 | Gelzleichter et al. |
| 2011/0091417 A1 | 4/2011 | Gurney |
| 2011/0159011 A1 | 6/2011 | Carrier et al. |
| 2011/0262385 A1 | 10/2011 | Huang |
| 2011/0268696 A1 | 11/2011 | Huang et al. |
| 2011/0280828 A1 | 11/2011 | Abbas |
| 2013/0171100 A1 | 7/2013 | Yan et al. |
| 2014/0314711 A1 | 10/2014 | Scheer |
| 2014/0377222 A1 | 12/2014 | Huang |
| 2015/0147293 A1 | 5/2015 | Wu |
| 2015/0202267 A1 | 7/2015 | Yan |
| 2016/0263020 A1 | 9/2016 | Yan |
| 2016/0271221 A1 | 9/2016 | Yan |
| 2016/0287670 A1 | 10/2016 | Van Den Brink et al. |
| 2017/0088596 A1 | 3/2017 | Scheer et al. |
| 2017/0320926 A1 | 11/2017 | Scheer et al. |
| 2018/0015130 A1 | 1/2018 | Berry et al. |
| 2018/0028614 A1 | 2/2018 | Huang |
| 2020/0155448 A1 | 5/2020 | Yan et al. |
| 2021/0100877 A1 | 4/2021 | Kolls et al. |
| 2021/0138038 A1 | 5/2021 | Van Den Brink et al. |
| 2023/0079150 A1 | 3/2023 | Yang et al. |
| 2023/0293635 A1 | 9/2023 | Van Den Brink et al. |

FOREIGN PATENT DOCUMENTS

| | | | |
|---|---|---|---|
| CA | 2903587 A1 | 9/2014 | |
| CN | 1264596 A | 8/2000 | |
| CN | 1269718 A | 10/2000 | |
| CN | 1381512 A | 11/2002 | |
| CN | 1652802 A | 8/2005 | |
| CN | 101168049 A | 4/2008 | |
| CN | 101198625 A | 6/2008 | |
| CN | 101218254 A | 7/2008 | |
| CN | 101225110 A | 7/2008 | |
| CN | 102124344 A | 7/2011 | |
| CN | 102197051 A | 9/2011 | |
| CN | 102380091 A | 3/2012 | |
| CN | 103118699 A | 5/2013 | |
| CN | 101896073 B | 11/2013 | |
| CN | 104623637 A | 5/2015 | |
| CN | 105143252 A | 12/2015 | |
| EP | 0036776 A2 | 9/1981 | |
| EP | 0073657 A1 | 3/1983 | |
| EP | 0117058 A2 | 8/1984 | |
| EP | 0117060 A2 | 8/1984 | |
| EP | 0139383 A1 | 5/1985 | |
| EP | 10183070 A2 | 6/1986 | |
| EP | 0244234 A2 | 11/1987 | |
| EP | 0362179 A2 | 4/1990 | |
| EP | 0394538 A1 | 10/1990 | |
| EP | 0402226 A1 | 12/1990 | |
| EP | 1748789 B1 | 12/2010 | |
| EP | 3065763 A1 | 9/2016 | |
| JP | 2008508862 A | 3/2008 | |
| JP | 2011507863 A | 3/2011 | |
| JP | 2013536254 A | 9/2013 | |
| WO | 198705330 A1 | 9/1987 | |
| WO | 198905859 A1 | 6/1989 | |
| WO | 199100357 A1 | 1/1991 | |
| WO | 199408606 A1 | 4/1994 | |
| WO | 199429351 A2 | 12/1994 | |
| WO | 199513312 A1 | 5/1995 | |
| WO | 199522419 A1 | 8/1995 | |
| WO | 199607399 A1 | 3/1996 | |
| WO | 199634103 A1 | 10/1996 | |
| WO | 199640072 A2 | 12/1996 | |
| WO | 199703692 A1 | 2/1997 | |
| WO | 199932139 A1 | 1/1999 | |
| WO | 199951642 A1 | 10/1999 | |
| WO | 199954440 A1 | 10/1999 | |
| WO | 199961617 A1 | 12/1999 | |
| WO | 2002029098 A2 | 4/2002 | |
| WO | 2003013589 A1 | 2/2003 | |
| WO | 2003089569 A2 | 10/2003 | |
| WO | 2004056312 A2 | 7/2004 | |
| WO | 2005044292 A2 | 5/2005 | |
| WO | 2005100402 A1 | 10/2005 | |
| WO | 2006000448 A2 | 1/2006 | |
| WO | 2006029879 A2 | 3/2006 | |
| WO | 2006073508 A1 | 7/2006 | |
| WO | 2006088833 A2 | 8/2006 | |
| WO | 2007047796 A2 | 4/2007 | |
| WO | 2007115230 A2 | 10/2007 | |
| WO | 2009020844 A1 | 2/2009 | |
| WO | 2009041734 A1 | 4/2009 | |
| WO | 2009062102 A2 | 5/2009 | |
| WO | 2009079024 A1 | 6/2009 | |
| WO | 2010081112 A1 | 7/2010 | |
| WO | 2011087986 A1 | 7/2011 | |
| WO | 2012028089 A1 | 3/2012 | |
| WO | 2013097748 A1 | 7/2013 | |
| WO | 2014053481 A1 | 4/2014 | |
| WO | 2014145016 A2 | 9/2014 | |
| WO | 2014207248 A1 | 12/2014 | |
| WO | 2015067198 A1 | 5/2015 | |
| WO | 2015067199 A1 | 5/2015 | |
| WO | 2015070077 A1 | 5/2015 | |
| WO | 2015197861 A1 | 12/2015 | |
| WO | 2016086205 A2 | 6/2016 | |
| WO | 2017181143 A1 | 10/2017 | |
| WO | 2019148020 A1 | 8/2019 | |
| WO | 2019148026 A1 | 8/2019 | |
| WO | 2019165140 A1 | 8/2019 | |
| WO | 2021160163 A1 | 8/2021 | |
| WO | 2021164744 A1 | 8/2021 | |
| WO | 2021207662 A1 | 10/2021 | |

OTHER PUBLICATIONS

Arab, J.P. et al. (e-pub Nov. 27, 2019). "An Open Label, Dose Escalation Study to Assess The Safety and Efficacy of IL-22 Agonist F-652 in Patients With Alcoholic Hepatitis," Hepatology 72(2):441-453, 30 pages.

Arora, P. et al. (2019). "[P21] A Randomized, Multiple-Dose Study of Subcutaneous UTTR1147A (IL-22Fc) in Patients with Neuropathic, Non-Healing Diabetic Foot Ulcers (DFUs)," Journal of Diabetes Science and Technology 14(3):632.

Asiedu, C. et al. (2007). "Cloning and Characterization of Recombinant Rhesus Macaque IL-10/Fc(ala-ala) Fusion Protein: A Poten-

(56) References Cited

OTHER PUBLICATIONS tial Adjunct for Tolerance Induction Strategies," Cytokine 40:183-192.
Asplund, S. et al. (1998). "Chronic Mucosal Changes of the Colon in Graft-versus-Host Disease," Mod Pathol 11(6): 513-515.
Aujla, S.J. et al. (Mar. 2008, e-pub. Feb. 10, 2008). "IL-22 Mediates Mucosal Host Defense Against Gram-Negative Bacterial Pneumonia," Nat Med 14(3):275-281.
Ballance, D.J. et al. (Apr. 15, 1983). "Transformation of Aspergillus Nidulans by the Orotidine-5'-Phosphate Decarboxylase Gene of Neurospora Crassa," Biochem. Biophys. Res. Commun. 112(1):284-289.
Balthazar, E.J. et al. (Feb. 1990). "Acute Pancreatitis: Value of CT in Establishing Prognosis," Radiology 174(2):331-336.
Balthazar, E.J. et al. (Sep. 1985). "Acute Pancreatitis: Prognostic Value of CT," Radiology 156(3):767-772.
Bamba, T. et al. (Aug. 2003). "Bacterial Translocation From Basic to Clinical Study," Nihon Shokakibyo Gakkai Zasshi The Japanese Journal of Gastro-Enterology 100(8):957, 9 pages. (English Abstract).
Banks, P.A. et al. (Oct. 2006). "Practice Guidelines in Acute Pancreatitis," The American Journal of Gastroenterology 101(10): 2379-2400.
Barker, N. et al. (Oct. 25, 2007, e-pub. Oct. 14, 2007). "Identification of Stem Cells in Small Intestine and Colon by Marker Gene Lgr5," Nature 449:1003-1007.
Barker, N. et al. (Oct. 5, 2012). "Identifying the Stem Cell of the Intestinal Crypt: Strategies and Pitfalls," Cell Stem Cell 11:452-460.
Beach, D. et al. (Mar. 12, 1981). "High-frequency Transformation of the Fission Yeast Schizosaccharomyces pombe," Nature 290:140-142.
Bingold, T.M. et al. (Oct. 2010). "Interleukin-22 Detected in Patients With Abdominal Sepsis," Shock 34(4):337-340.
Blazar, B. R., et al. (May 11, 2012). "Advances in Graft-Versus-Host Disease Biology and Therapy," Nat Rev Immunol 12(6):443-458.
Bone, R.C. et al. (Jun. 1, 1992). "Definitions for Sepsis and Organ Failure and Guidelines for the Use of Innovative Therapies in Sepsis," Chest 101:1644-1655.
Browning, J.D. et al. (Jul. 2004). "Molecular Mediators of Hepatic Steatosis and Liver Injury," The Journal of Clinical Investigation 114(2):147-152.
Brüggemann, M. et al. (Nov. 1, 1987). "Comparison of the Effector Functions of Human Immunoglobulins Using a Matched Set of Chimeric Antibodies," J. Exp. Med. 166:1351-1361.
Caballero, F. et al. (2009). "Enhanced Free Cholesterol, SREBP-2 and StAR Expression in Human NASH," Journal of Hepatology 50:789-796.
Carlson, M.J. et al. (Feb. 5, 2009, e-pub Oct. 28, 2008). "In vitro-Differentiated TH17 Cells Mediate Lethal Acute Graft-Versus-Host Disease With Severe Cutaneous and Pulmonary Pathologic Manifestations," Blood. 113(6):1365-1374.
Carmon, K.S. et al. (Jun. 2012; e-pub. Apr. 2, 2012). "LGR5 Interacts and Cointernalizes with Wnt Receptors to Modulate Wnt/β-Catenin Signaling," Mol Cell Biol 32(11):2054-2064.
Carryer, H.M. (Jul. 1950). "The Effect of Cortisone of Bronchial Asthma and Hay Fever Occurring in Subjects Sensitive to Ragweed Pollen," Journal of Allergy 21(4):282-287.
Carter, P. et al. (Feb. 1992). "High Level *Escherichia coli* Expression and Production of a Bivalent Humanized Antibody Fragment," Bio/Technology 10:163-167.
Case, M. E. et al. (Oct. 1979). "Efficient Transformation of Neurospora Crassa by Utilizing Hybrid Plasmid DNA," Proc. Natl. Acad. Sci. U. S. A. 76(10):5259-5263.
Cella, M. et al. (Feb. 2009, e-pub. Nov. 2, 2008). "A Human Natural Killer Cell Subset Provides an Innate Source of IL-22 for Mucosal Immunity," Nature 457:722-725.
Chan, H.L-Y. et al. (Jun. 2007). "How Should We Manage Patients With Non-Alcoholic Fatty Liver Disease in 2007?" Journal of Gastroenterology and Hepatology 22(6):801-808.

Chang, A.C.Y. et al. (Oct. 19, 1978). "Phenotypic Expression in *E. coli* of a DNA Sequence Coding for Mouse Dihydrofolate Reductase," Nature 275(5681):617-624.
Cheadle, C. et al. (Jan. 1992). "Cloning and Expression of the Variable Regions of Mouse Myeloma Protein MOPC315 in *E. coli*: Recovery of Active FV Fragments," Mol Immunol 29(1):21-30. (Abstract Only).
Choi, S. M. et al. (Mar. 2013). "Innate Stat3-Mediated Induction of the Antimicrobial Protein Reg3γ is Required for Host Defense Against MRSA Pneumonia," J Exp Med 210:551-561.
Clayburgh, D.R. et al. (Mar. 2004; e-published on Jan. 19, 2004). "A Porous Defense: the Leaky Epithelial Barrier in Intestinal Disease," Lab Invest 84(3):282-291.
Clinical Research (2006). vol. 83, No. 2, p. 238-242. (Cited in the Japanese Decision of Refusal dated Aug. 29, 2013 for Japanese Patent Application No. 2010-520208), ten pages. English translation of the relevant parts referred by the Examiner in the Decision of Refusal is being provided.
Clynes, R. et al. (Jan. 1998). "Fc Receptors are Required in Passive and Active Immunity to Melanoma," Proc. Natl. Acad. Sci. U.S.A. 95:652-656.
Cobleigh, M.A. et al. (Jan. 2013). "Protective and Pathological Properties of IL-22 in Liver Disease: Implications for Viral Hepatitis," Am. J. Pathology 182(1):21-28.
Couturier, M. et al. (Jul. 2013, e-pub Feb. 12, 2013) "IL-22 Deficiency in Donor T Cells Attenuates Murine Acute Graft-Versus-Host Disease Mortality While Sparing The Graft-Versus-Leukemia Effect," Leukemia. 27(7):1527-1537.
Cox, G.N. et al. (2004). "Enhanced Circulating Half-Life and Hematopoietic Properties of a Human Granulocyte Colony-Stimulating Factor/Immunoglobulin Fusion Protein," Exp. Hematol. 32:441-449.
Cragg, M.S. et al. (Apr. 1, 2004). "Antibody Specificity Controls In Vivo Effector Mechanisms of Anti-CD20 Reagents," Blood 103(7):2738-2743.
Cragg, M.S. et al. (Feb. 1, 2003). "Complement-Mediated Lysis by Anti-CD20 Mab Correlates With Segregation Into Lipid Rafts," Blood 101(3):1045-1052.
Craig, D.G.N. et al. (Feb. 2010). "Review Article: The Current Management of Acute Liver Failure," Alimentary Pharmacology and Therapeutics 31(3):345-358.
Czajkowsky, D.M. et al. (Oct. 2012)."Fc-Fusion Proteins: New Developments and Future Perspectives," EMBO Mol. Med. 4(10):1015-1028.
Dall'acqua, W. et al. (1998). "Contribution of Domain Interface Residues to the Stability of Antibody CH3 Domain Homodimers", Biochemistry37:9266-9273.
Dambacher, J. et al. (Mar. 2008). "The Role of Interleukin-22 in Hepatitis C Virus Infection," Cytokine 41(3):209-216.
Das, R. et al. (Mar. 5, 2009). "Interleukin-23 Secretion by Donor Antigen-Presenting Cells is Critical for Organ-Specific Pathology in Graft-Versus-Host Disease," Blood 113(10):2352-2362.
De Lau, W. et al. (Aug. 18, 2011). "Lgr5 Homologues Associate with Wnt Receptors and Mediate R-spondin Signalling," Nature 476:293-297.
De Oliveira Neto, M. et al. (Mar. 1, 2008; e-pub. Nov. 16, 2007). "Interleukin-22 Forms Dimers That are Recognized by Two Interleukin-22R1 Receptor Chains," Biophys. J. 94(5):1754-1765.
Deboer, H.A. et al. (Jan. 1983). "The Tac Promoter: a Functional Hybrid Derived From the trp and lac Promoters," Proc. Natl. Acad. Sci. U.S.A. 80(1):21-25.
Delaney, A.P. et al. (2011). "The Role of Albumin as a Resuscitation Fluid for Patients With Sepsis: A Systematic Review and Meta-Analysis," Grit Care Med 39(2):386-391.
Denning, T.L. et al. (Feb. 2017, e-pub Dec. 9, 2016) "Pathogenesis of NEC: Role of The Innate and Adaptive Immune Response," Semin Perinatol. 41(1):15-28.
Diefenbach, A. (Aug. 24, 2012). "Interleukin-22, the Guardian of the Intestinal Stem Cell Niche?" Immunity 37:196-198.
DiMartino, J.F. et al. (Sep. 1999). "Mill Rearrangements in Haematological Malignancies: Lessons from Clinical and Biological Studies," Br J Haematol. 106(3):614-626.

(56) References Cited

OTHER PUBLICATIONS

Dubois, M.-J. et al. (Oct. 2006). "Albumin Administration Improves Organ Function In Critically Ill Hypoalbuminemic Patients: A Prospective, Randomized, Controlled, Pilot Study," Crit Care Med 34(10)2536-2540.
Dudakov, J.A. et al. (2015, e-pub Feb. 11, 2015). "Interleukin-22: Immunobiology and Pathology," Annu Rev Immunol. 33:747-785.
Dudakov, J.A. et al. (Apr. 6, 2012, e-pub Mar. 1, 2012). "Interleukin-22 Drives Endogenous Thymic Regeneration in Mice," Science 336(6077):91-95.
Dumoutier, L. et al. (Aug. 29, 2000). "Human Interleukin-10-Related T Cell-Derived Inducible Factor: Molecular Cloning and Functional Characterization as an Hepatocyte-Stimulating Factor," PNAS 97(18):10144-10149.
Dumoutier, L. et al. (Feb. 15, 2000). "Cloning and Characterization of IL-10-Related T Cell-Derived Inducible Factor (IL-TIF), a Novel Cytokine Structurally Related to IL-10 and Inducible by IL-91," The Journal of Immunology 164(4):1814-1819.
Duncan, A.R. et al. (Apr. 21, 1988). "The Binding Site for C1q on IgG," Nature 322:738-740.
EBI Accession No. AWL86673. (May 26, 2018). "Streptomyces Globisporus Elongation Factor Tu," Located at URL: https://www.ebi.ac.uk/ena/data/view/AWL86673&display=text, last visited on May 31, 2018.Database Geneseq [Online] May 28, 2009 (May 28, 2009), "Human IgG double chain constant region protein Seq ID:97.", retrieved from EBI accession No. GSP:AWL86673 Database accession No. AWL86673.
Emami, C. N. et al. (Oct. 2009). "Role of the host defense system and intestinal microbial flora in the pathogenesis of necrotizing enterocolitis," Surgical infection 10(5):407-417.
Eriguchi, Y. et al. (Jul. 5, 2012, e-pub. Apr. 24, 2012). "Graft-Versus-Host Disease Disrupts Intestinal Microbial Ecology by Inhibiting Paneth Cell Production of α-Defensins," Blood 120(1):223-231.
Eyerich, S. et al. (Sep. 2010; e-pub. Aug. 4, 2010). "IL-17 and IL-22: Siblings, Not Twins," Trends Immunol. 31(9):354-361.
Fard, N.A. et al. (Jul.-Aug. 2016, e-pub. Aug. 1, 2016). "The Potential Role of T Helper Cell 22 and IL-22 in Immunopathogenesis of Multiple Sclerosis," Innov Clin Neurosci. 13(7-8):30-36.
Feng, D. et al. (2012). "Interleukin-22 Ameliorates Cerulein-Induced Pancreatitis in Mice by Inhibiting the Autophagic Pathway," International Journal of Biological Sciences 8(2):249-257.
Ferrara, J. L. (Oct. 1993). "Cytokine Dysregulation as a Mechanism of Graft Versus Host Disease," Curr Opin Immunol. 5(5):794-799.
Ferrara, J. L., et al. (May 2, 2009). "Graft-Versus-Host Disease," Lancet 373:1550-1561.
Fleer, R. et al. (Oct. 1, 1991). "Stable Multicopy Vectors for High-Level Secretion of Recombinant Human Serum Albumin by Kluyveromyces Yeasts," Bio/Technology 9(10):968-975.
Food and Drug Administration. (Jul. 2005). "Guidance for Industry: Estimating The Maximum Safe Starting Dose in Initial Clinical Trials for Therapeutics in Adult Healthy Volunteers," Center for Drug Evaluation and Research (CDER) 7(0.001):30 pages.
Food and Drug Administration. (May 5, 2016). "Drug Research and Children," 2 pages, as retrieved on Feb. 7, 2022 fromhttps://www.fda.gov/drugs/information-consumers-and-patients-drugs/drug-research-and-children.
Gan, M. et al. (2006). "The Progress of Multiple Organ Dysfunction Syndrome," Medical Recapitulate 14:14. (Abstract Only).
Gao, B. (Apr. 2005). "Cytokines, STATs and Liver Disease," Cell. Mol. Immunol. 2(2):92-100.
Gao, B. et al. (Jul. 2019, e-pub Jun. 19, 2018). "Interleukin-22 From Bench to Bedside: A Promising Drug for Epithelial Repair," Cellular & Molecular Immunology 16(7):666-667.
Gao, H. et al. (Jun. 2006). "Long-Term Administration of Estradiol Decreases Expression of Hepatic Lipogenic Genes and Improves Insulin Sensitivity in ob/ob Mice: A Possible Mechanism is through Direct Regulation of Signal Transducer and Activator of Transcription 3," Molecular Endocrinology 20(6):1287-1299.

Gavrieli, Y. et al. (Nov. 1992) "Identification of Programmed Cell Death In Situ via Specific Labeling of Nuclear DNA Fragmentation," J Cell Biol. 119:493-501.
Gazzano-Santoro, H. et al. (Mar. 28, 1997). "A Non-Radioactive Complement-Dependent Cytotoxicity Assay for Anti-CD20 Monoclonal Antibody," J. Immunol. Methods 202:163-171.
Generon BioMed Holding Ltd. (Nov. 13, 2018). "Generon's F-652 Shows Positive Results in" An Open Label, Cohort Dose Escalation Study to Assess the Safety and Efficacy in Patients with Alcoholic Hepatitis, located at https://www.businesswire.com/news/home/20181113005520/en/Generon%E2%80%99s-F-652-Shows-Positive-Results-%E2%80%9CAn-Open, last visited on Mar. 20, 2020, 2 pages.
Gerbitz, A. et al. (Jun. 1, 2004, e-pub. Feb. 12, 2004). "Probiotic Effects on Experimental Graft-Versus-Host Disease: Let Them Eat Yogurt," Blood 103(11):4365-4367.
Gething, M.J. et al. (Oct. 22, 1981). "Cell-Surface Expression of Influenza Haemagglutinin from a Cloned DNA the RNA Gene," Nature, 293:620-625.
Gill, H.K. et al. (Jan. 21, 2006). "Non-Alcoholic Fatty Liver Disease and the Metabolic Syndrome: Effects of Weight Loss and a Review of Popular Diets. Are Low Carbohydrate Diets the Answer?" World Journal of Gastroenterology 12(3):345-353.
Glinka, A. et al. (Sep. 30, 2011, e-pub. Sep. 9, 2011). "LGR4 and LGR5 are R-spondin Receptors Mediating Wnt/62 -Catenin and Wnt/PCP Signalling," EMBO Rep. 12(10):1055-1061.
Goeddel, D.V. et al. (Oct. 18, 1979). "Direct Expression in *Escherichia coli* of a DNA Sequence Coding for Human Growth Hormone," Nature 281:544-548.
Goeddel, D.V. et al. (Sep. 25, 1980). "Synthesis of Human Fibroblast Interferon by *E. coli*," Nucleic Acids Res. 8(18):4057-4074.
Good, M. et al. (May 1, 2015). "The Role of IL-22 Signaling in the Pathogenesis of Necrotizing Enterocolitis (HUM1P.314)," The Journal of Immunology 194(Supplement 1): Abstract No. 52.39.
Graham, F.L. et al. (1977). "Characteristics of a Human Cell Line Transformed by DNA from Human Adenovirus Type 5," J. Gen Virol. 36:59-72.
Graham, F.L. et al. (Apr. 1973). "A New Technique for the Assay of Infectivity of Human Adenovirus 5 DNA," Virology 52(2):456-467.
Grattagliano, I. et al. (May 2007). "Managing Nonalcoholic Fatty Liver Disease: Recommendations for Family Physicians," Canadian Family Physician 53(5):857-863.
Greenwald, R.B. et al. (Oct. 20, 1994). "Highly Water Soluble Taxol Derivatives: 2'-Polyethyleneglycol Esters as Potential Prodrugs," Bioorg. Med. Chem. Lett. 4(20):2465-2470.
Guiddir, T. et al. (2014). "Anti-TNF-A Therapy May Cause Neonatal Neutropenia," Pediatrics. 134(4):e1189-1193.
Guss, B. et al. (Jul. 1986). "Structure of the IgG-Binding Regions of Streptococcal Protein G," EMBO J. 5(7):1567-1575.
Guyer, R.L. et al. (Aug. 1976). "Immunoglobulin Binding by Mouse Intestinal Epithelial Cell Receptors," J. Immunol. 117(2):587-593.
Hale, L.P. et al. (Mar. 10, 2008). "Treatment of Experimental Colitis in Mice With LMP-420, An Inhibitor of TNF Transcription," J Inflamm (Lond). 5(4):13 pages.
Han, L. et al. (2019). "Intestinal Microbiota can Predict Acute Graft-Versus-Host Disease Following Allogeneic Hematopoietic Stem Cell Transplantation," Biology of Blood and Marrow Transplantation 25(10):1944-1955.
Hanash, A. et al. (Feb. 2012). "Host-Derived IL-22 Protects Intestinal Stem Cells from GvHD," Biology of Blood and Marrow Transplantation 18(2): Abstract No. 426, S361-S362.
Hanash, A.M. (Aug. 26, 2012). "IL-22 in Epithelial Regeneration After Allogeneic Transplant," NIH Report Portfolio Online Reporting Tools, 5 pages. (Abstract Only).
Hanash, A.M. et al. (2012). "Effect of IL-22 on Intestinal Stem Cells, GVHD-related Tissue Damage, and GVL," Journal of Clinical Oncology: 6539, 1 page. (Abstract only).
Hanash, A.M. et al. (Aug. 24, 2012). "Interleukin-22 Protects Intestinal Stem Cells from Immune-mediated Tissue Damage and Regulates Sensitivity to Graft Versus Host Disease," Immunity 37(2):339-350.

(56) References Cited

OTHER PUBLICATIONS

Hanash, A.M. et al. (Nov. 18, 2011). "Host-Derived IL-22 Limits Graft Versus Host Disease and Protects the Intestinal Stem Cell Niche," Blood. 118(21):309, 7 pages. (Abstract Only).
Heel, K. A. et al. (Feb. 1997). "Review: Peyer's Patches," Journal of Gastroenterology and Hepatology 12(2):122-136.
Heida, F. H. et al. (Aug. 2016, e-pub. Apr. 6, 2016). "Paneth Cells in The Developing Gut: When Do They Arise and When are They Immune Competent?" Pediatric Research 80(2): 306-310.
Hellstrom, I. et al. (Mar. 1985). "Strong Antitumor Activities of IgG3 Antibodies to a Human Melanoma-associated Ganglioside," Proc. Natl. Acad. Sci. USA 82:1499-1502.
Hellstrom, I. et al. (Sep. 1986). "Antitumor Effects of L6, an IgG2a Antibody That Reacts With Most Human Carcinomas," Proc. Natl. Acad. Sci. USA 83:7059-7063.
Henikoff, S. et al. (Nov. 15, 1992). "Amino Acid Substitution Matrices From Protein Blocks," Proc. Nat'l Acad. Sci. USA 89:10915-10919.
Herrine, S.K. et al. (Jan. 2018). "Fatty Liver Hepatic Steatosis," Merck Manual, one page only.
Hess, B. et al. (1969). "Cooperation of Glycolytic Enzymes," Adv Enzyme Regul. 7:149-167.
Hill, G.R. et al. (May 1, 2000). "The Primacy of the Gastrointestinal Tract as a Target Organ of Acute Graft-Versus-Host Disease: Rationale for the use of Cytokine Shields in Allogeneic Bone Marrow Transplantation," Blood 95(9):2754-2759.
Hines, I.N. et al. (Aug. 2004). "Recent Advances in Alcoholic Liver Disease III. Role of the Innate Immune Response in Alcoholic Hepatitis," American Journal of Physiology—Gastrointestinal and Liver Physiology 287(2):G310-G314.
Hitzeman, R.A. et al. (Dec. 25, 1980). "Isolation and Characterization of the Yeast 3-Phosphoglycerokinase Gene (PKG) by an Immunological Screening Technique," J. Biol. Chem. 255(24):12073-12080.
Holland, J.P. (Nov. 14, 1978). "Isolation and Identification of Yeast Messenger Ribonucleic Acids Coding for Enolase, Glyceraldehyde-3-Phosphate Dehydrogenase, and Phosphoglycerate Kinase," Biochemistry 17(23):4900-4907.
Hong, F. et al. (Oct. 2004). "Interleukin 6 Alleviates Hepatic Steatosis and Ischemia/Reperfusion Injury in Mice with Fatty Liver Disease," Hepatology 40(4):933-941.
Hsiao, C.L. et al. (Aug. 1979). "High-Frequency Transformation of Yeast by Plasmids Containing the Cloned Yeast ARG4 Gene," Proc. Natl. Acad. Sci. (USA) 76(8):3829-3833.
Hua, G. et al. (Nov. 2012, e-pub. Jul. 27, 2012). "Crypt Base Columnar Stem Cells in Small Intestines of Mice are Radioresistant," Gastroenterology 143:1266-1276.
Huber, S. et al. (Nov. 8, 2012, Epub Oct. 17, 2012) "IL-22BP is regulated by the inflammasome and modulates tumorigenesis in the intestine." Nature, 491(7423):259-263.
Hwang, T.-L. (May 2009). "Potential Use of Albumin Administration in Severe Sepsis," J Chin Med Assoc 72(5):225-226.
Idusogie, E.E. et al. (2000). "Mapping of the C1q Binding Site on Rituxan, a Chimeric Antibody With a Human IgG1 Fc," J. Immunol. 164:4178-4184.
Inoue, H. et al. (Feb. 2004; e-published on Jan. 11, 2004). "Role of STAT-3 in Regulation of Hepatic Gluconeogenic Genes and Carbohydrate Metabolism In Vivo," Nat Med. 10(2):168-174. (English Abstract only).
International Diabetes Federation. (2006). "The IDF Consensus Worldwide definition of the metabolic Syndrome," 24 pages.
International Preliminary Examination Report Completed on Sep. 3, 2009 for PCT Application No. PCT/US2008/071859 filed on Aug. 1, 2008, 4 pages.
International Preliminary Report on Patentability issued Aug. 23, 2022, mailed on Apr. 29, 2021 for International Application No. PCT/CN2021/076929, filed on Feb. 19, 2021, 6 pages.
International Preliminary Report on Patentability issued Aug. 23, 2022, mailed on May 14, 2021 for International Application No. PCT/CN2021/076519, filed on Feb. 10, 2021, 6 pages.
International Preliminary Report on Patentability mailed Jul. 10, 2007, for International Application No. PCT/US05/28186, filed Aug. 8, 2005, four pages.
International Preliminary Report on Patentability mailed Jul. 10, 2014, for International Application No. PCT/CN2012/087694, filed Dec. 27, 2012, 21 pages (with attached English translation of the Written Opinion of the International Searching Authority).
International Preliminary Report on Patentability mailed Jul. 21, 2011, for International Application No. PCT/US2010/20673, filed Jan. 11, 2010, six pages.
International Preliminary Report on Patentability mailed Mar. 14, 2013, for International Application No. PCT/CN2011/079124, filed Aug. 30, 2011, fourteen pages (with attached English translation).
International Preliminary Report on Patentability mailed May 10, 2016 for International Application No. PCT/CN2014/090520, filed on Nov. 6, 2014, six pages.
International Preliminary Report on Patentability mailed May 10, 2016 for International Application No. PCT/US2014/064655, filed on Nov. 7, 2014, eleven pages.
International Preliminary Report on Patentability mailed May 19, 2016, for International Application No. PCT/CN2014/090519, filed Nov. 6, 2014, seven pages.
International Preliminary Report on Patentability mailed on Oct. 25, 2018 for PCT Application No. PCT/US2017/027806 filed on Apr. 14, 2017, 7 pages.
International Search Report and Written Opinion mailed on Apr. 29, 2021 for International Application No. PCT/CN2021/076929, filed on Feb. 19, 2021, sixteen pages.
International Search Report and Written Opinion mailed on Jun. 23, 2017 for PCT Application No. PCT/US2017/027806, filed on Apr. 14, 2017, 12 pages.
International Search Report and Written Opinion mailed on Mar. 27, 2015 for PCT Application No. PCT/US2014/64655, filed on Nov. 7, 2014, 16 pages.
International Search Report and Written Opinion mailed on May 14, 2021 for International Application No. PCT/CN2021/076519, filed on Feb. 10, 2021, sixteen pages.
International Search Report mailed Mar. 9, 2010, for International Application No. PCT/US10/20673, filed Jan. 11, 2010, three pages.
International Search Report mailed May 3, 2006, for International Application No. PCT/US05/28186, filed Aug. 8, 2005, one page.
International Search Report mailed Nov. 26, 2008, for International Application No. PCT/US08/71859, filed Aug. 1, 2008, one page.
International Search Report mailed on Apr. 18, 2013, for PCT Patent Application No. PCT/CN2012/087694, filed on Dec. 27, 2012, 4 pages.
International Search Report mailed on Dec. 8, 2011 for PCT Patent Application No. PCT/CN2011/079124, filed on Aug. 30, 2011, 4 pages.
International Search Report mailed on Feb. 10, 2015 for International Application No. PCT/CN2014/090520 filed on Nov. 6, 2014, 5 pages.
International Search Report mailed on Jan. 30, 2015 for PCT Application No. PCT/CN2014/090519 filed Nov. 6, 2014, 6 pages.
Ivanov, S. et al. (Jun. 30, 2013). "Interleukin-22 Reduces Lung Inflammation During Influenza A Virus Infection and Protects Against Secondary Bacterial Infection and Protects Against Secondary Bacterial Infection," Journal of Virology 12(87)6911-6924.
Jenq, R.R. et al. (Mar. 2010; e-published on Feb. 19, 2010). "Allogeneic Haematopoietic Stem Cell Transplantation: Individualized Stem Cell and Immune Therapy of Cancer," Nat Rev Cancer 10(3)213-220; pp. 1-10 (advance publication).
Jenq, R.R. et al. (May 2012, e-pub. Apr. 30, 2012). "Regulation of Intestinal Inflammation by Microbiota Following Allogeneic Bone Marrow Transplantation," The Journal of Experimental Medicine 209(5):903-911.
Jiang, R. et al. (Dec. 2013). "IL-22 is Related to Development of Human Colon Cancer by Activation of STAT3," BMC Cancer 13(1):59.
Jiang, R. et al. (Sep. 2, 2011). "Interleukin-22 Promotes Human Hepatocellular Carcinoma by Activation of STAT3," Hepatology 54(3):900-909.

(56) References Cited

OTHER PUBLICATIONS

Johnson, O.L. et al. (Jul. 1996). "A Month-Long Effect from a Single Injection of Microencapsulated Human Growth Hormone," Nature Medicine 2(7):795-799.
Jones, B.C. et al. (Apr. 1, 2008; e-pub. Mar. 21, 2008). "Crystallization and Preliminary X-Ray Diffraction Analysis of Human IL-22 Bound to the Extracellular IL-22R1 Chain," Acta Crystall. Sect. F. Structure Biol. Cryst. Commun. 64(Pt. 4):266-269.
Jones, E.W. (Jan. 1977). "Proteinase Mutants of *Saccharomyces cerevisiae*," Genetics 85(1):23-33.
Kabiri, Z. et al. (Jun. 2014). "Stroma Provides an Intestinal Stem Cell Niche in the Absence of Epithelial Wnts," Development 141:2206-2215.
Kappel, L.W. et al. (Jan. 22, 2009, e-pub. Oct. 17, 2008). "IL-17 Contributes to CD4-Mediated Graft-Versus-Host Disease," Blood 113(4):945-952.
Kelly, J.M. et al. (Feb. 1985). "Transformation of Aspergillus Niger by the amdS Gene of Aspergillus Nidulans," EMBO J. 4(2):475-479.
Keown, W.A. et al. (1990). "Methods for Introducing DNA into Mammalian Cells," Methods in Enzymology 185:527-537.
Ki, S.H. et al. (Oct. 2010). "Interleukin-22 Treatment Ameliorates Alcoholic Liver Injury in a Murine Model of Chronic-Binge Ethanol Feeding: Role of Signal Transducer and Activator of Transcription 3," Hepatology 52(4):1291-1300.
Killen, J.A. et al. (Nov. 1, 1984). "Specific Killing of Lymphocytes That Cause Experimental Autoimmune Myasthenia Gravis by Ricin Toxin-Acetylcholine Receptor Conjugates," J. Immunol. 133(5):2549-2553.
Kim, T.W. et al. (Jan. 14, 2006). "Involvement of Lymphocytes in Dextran Sulfate Sodium-Induced Experimental Colitis," World J Gastroenterol. 12(2):302-305.
Kingsman, A.J. et al. (Oct. 1979). "Replication in *Saccharomyces cerevisiae* of Plasmid pBR313 Carrying DNA from the Yeast trpl Region," Gene 7(2):141-152.
Klöppel, G. et al. (1991). "Chronic Pancreatitis: Evolution of the Disease," Hepato-gastroenterology 38(5):408-412.
Knaus, W.A. et al. (Dec. 1985) "Prognosis in Acute Organ-System Failure," Ann. Surg. 202(6):685-693.
Kolls, J. K. et al. (Nov. 2008). "Cytokine-Mediated Regulation of Antimicrobial Proteins," Nat Rev Immunol 8(11):829-835.
Kong, Q. et al. (Oct. 11, 2012). "Increased Expressions of IL-22 and Th22 Cells in The Coxsackievirus B3-Induced Mice Acute Viral Myocarditis," Virol. J. 9(232):1-10.
Kotenko, S.V. et al. (Sep. 8, 1995). "Interaction Between the Components of the Interferon γ Receptor Complex," J. Biol. Chem. 270(36):20915-20921.
Kreymborg, K. et al. (Dec. 2007). "IL-22 is Expressed by Th17 Cells in an IL-23-Dependent Fashion, but Not Required for the Development of Autoimmune Encephalomyelitis," J Immunol 179:8098-8104.
Krijanovski, O.I. et al. (Jul. 15, 1999). "Keratinocyte Growth Factor Separates Graft-Versus-Leukemia Effects From Graft-Versus-Host Disease," Blood 94(2): 825-831.
Krivtsov, A.V. et al. (Aug. 2006, e-pub. Jul. 16, 2006). "Transformation from Committed Progenitor to Leukaemia Stem Cell Initiated by MLL-AF9," Nature. 442(7104):818-822.
Kuroiwa, T. et al. (Jun. 2001). "Hepatocyte Growth Factor Ameliorates Acute Graft-Versus-Host Disease and Promotes Hematopoietic Function," J. Clin. Invest 107:1365-1373.
Lamarthee, B. at al. (Apr. 2016). "Interleukin-22 in Graft-Versus-Host Disease after Allogeneic Stem Cell Transplantation," Front. Immunol. 7:148, 9 pages.
Lee, W.-C. at al. (Jan. 2010). "Palmatine Attenuates D-Galactosamine/Lipopolysaccharide-Induced Fulminant Hepatic Failure in Mice," Food Chem Toxicol 48(1):222-228.
Lei, K. et al. (May 19, 1995). "Structure-Function Analysis of Human Glucose-6-Phosphatese, the Enzyme Deficient in Glycogen Storage Disease Type 1a*," The Journal of Biological Chemistry 270(20):11882-11886.
Levine, J.E. et al. (Aug. 22, 2013, e-pub. Jun. 12, 2013). "Low Paneth Cell Numbers at Onset of Gastrointestinal Graft-Versus-Host Disease Identify Patients at High Risk for Nonrelapse Mortality," Blood 122(8):1505-1509.
Levine, J.E. et al. (Jan. 1, 2015). "A Prognostic Score for Acute Graft-Versus-Host Disease Based on Biomarkers: A Multicentre Study," Lancet Haematol. 2(1):e21-e29.
Lewis, D.H. (1990). "Controlled Release of Bioactive Agents From Lactide/Glycolide Polymer," in Chapter 1 of Biodegradable Polymers as Drug Delivery Systems, Chasin, M. (ed.) et al., Marcel Dekker Inc. New York, 1990, pp. 1-41, 52 pages.
Li, H. et al. (2016). "Gastrointestinal Stem Cells in Health and Disease: From Flies to Humans," Dis Model Mech 9: 487-499.
Li, Q. (Sep. 2003). "Research Development of Interleukin-22," Chinese J. of Cancer Biotherapy 10(3):226-228 (Translation of Abstract Only).
Lieber, C.S. et al. (Mar. 1966). "Study of Agents for the Prevention of the Fatty Liver Produced by Prolonged Alcohol Intake," Gastroenterology 50(3):316-322.
Lieber, C.S. et al. (Oct. 1989). "Experimental Methods of Ethanol Administration," Hepatology 10(4):501-510.
Lindemans, C. et al. (2014). "IL-22 Administration Protects Intestinal Stem Cells from Gvhd," Biol Blood Marrow Transplant 20(2): Supp. Suppl. 1, Abstract No. 49, 553-554.
Lindemans, C. et al. (Dec. 24, 2015). "Interleukin-22 Promotes Intestinal-Stem-Cell-Mediated Epithelial Regeneration," Nature 528(7583):560-564.
Lindmark, R. et al. (1983). "Binding of Immunoglobulins to Protein A and Immunoglobulin Levels in Mammalian Sera," J. Immunol. Meth. 62:1-13.
Longman, R. S. et al. (Jul. 2014, e-pub. Jul. 14, 2014). "CX3CR1+ Mononuclear Phagocytes Support Colitis-Associated Innate Lymphoid Cell Production of IL-22," J Exp Med 211:1571-1583.
Louvencourt, L.D. et al. (May 1983). "Transformation of Kluyveromyces Lactis by Killer Plasmid DNA," J. Bacterial. 154(2):737-742.
Low, S.C. et al. (Jul. 2005). "Oral and pulmonary delivery of FSH-Fc fusion proteins via neonatal Fc receptor-mediated transcytosis," Human Reproduction 20(7):1805-1813.
Ma, H.L. (Feb. 2008). "IL-22 is Required for Th17 Cell-Mediated Pathology in a Mouse Model of Psoriasis-Like Skin Inflammation," J Clin Invest.118(2):597-607.
Mansour, S.L. et al. (Nov. 24, 1988). "Disruption of the Proto-Oncogene Int-2 in Mouse Embryo-Derived Stem Cells: A General Strategy for Targeting Mutations to Non-Selectable Genes," Nature 336:348-352.
Mantei, N. et al. (Sep. 6, 1979). "Rabbit β-globin mRNA Production in Mouse L Cells Transformed with Cloned Rabbit β-Globin Chromosomal DNA," Nature 281:40-46.
Marchesini, G. et al. (Aug. 2001). "Nonalcoholic Fatty Liver Disease," Diabetes 50(8):1844-1850.
Mather, J.P. (Aug. 1980) "Establishment and Characterization of Two Distinct Mouse Testicular Epithelial Cell Lines," Biol. Reprod. 23(1):243-252.
Matsusue, K. et al. (Mar. 2003). "Liver-Specific Disruption of Pparγ in Leptin-Deficient Mice Improves Fatty Liver but Aggravates Diabetic Phenotype," J. Clin. Invest. 111(5):737-747.
Matthews, J. R. et al. (Dec. 2011). "Absolute Requirement for STAT3 Function in Small-Intestine Crypt Stem Cell Survival," Cell Death Differ 18:1934-1943.
Mavrelis, P.G. et al. (1983). "Hepatic Free Fatty Acids in Alcoholic Liver Disease and Morbid Obesity," Hepatology 3(2):226-231.
Max Bayard, M.D. et al. (Jun. 1, 2006). "Nonalcoholic Fatty Liver Disease," American Family Physician 73(11):1961-1968.
McGee, H. M. et al. (2013, e-pub. Dec. 6, 2012). "IL-22 Promotes Fibroblast-Mediated Wound Repair in The Skin," Journal of Investigative Dermatology 133(5):1321-1329.
Medema, J.P. et al. (Jun. 16, 2011). "Microenvironmental Regulation of Stem Cells in Intestinal Homeostasis and Cancer," Nature 474:318-326.
Mertelsmann, A.M. et al. (2013). "IL-22 Administration Decreases Intestinal Gvhd Pathology, Increases Intestinal Stem Cell Recovery,

(56) References Cited

OTHER PUBLICATIONS and Enhances Immune Reconstruction Following Allogeneic Hematopoietic Transplantation," Blood 122(22), Abstract 290, 3 pages.
Metcalfe, C. et al. (Feb. 6, 2014, e-pub Dec. 12, 2013). "Lgr5+ Stem Cells are Indispensable for Radiation-Induced Intestinal Regeneration," Cell Stem Cell 14:149-159.
Mitra, A. et al. (2012). "Functional Role of IL-22 in Psoriatic Arthritis," Arthritis Research & Therapy 14(2):1-10.
Mordenti, J. et al. (1989). "The Use of Interspecies Scaling in Toxicokinetics," Chapter 4 in Toxicokinetics and New Drug Development, Yacobi A. ed et al.; Pergamon Press, New York, pp. 42-96.
Morris, H.G. (Jan. 1985). "Mechanisms of Action and Therapeutic Role of Corticosteroids in Asthma," Allergy Clin. Immunol. 75(1 Pt 1):1-13.
Morris, S. A. et al. (Aug. 14, 2014). "Dissecting Engineered Cell Types and Enhancing Cell Fate Conversion via CellNet," Cell 158:889-902.
Mortele, K.J. et al. (Nov. 2004). "A Modified CT Severity Index for Evaluating Acute Pancreatitis: Improved Correlation With Patient Outcome," American Journal of Roentgenology 183:1261-1265.
Muhl, H. et al. (Jun. 2013). "IL-22 in Tissue-Protective Therapy," Br. J. Pharmacol. 169(4): 761-771.
Munneke, J. M. et al. (Jul. 31, 2014). "Activated Innate Lymphoid Cells are Associated with a Reduced Susceptibility to Graft-Versus-Host Disease," Blood 124:812-821.
Nagalakshmi, M.L. et al. (May 2004). "Interleukin-22 Activates STAT3 and Induces IL-10 by Colon Epithelial Cells," International Immunopharmacology 4(5):679-691.
Nazani, A.F. et al. (Jul.-Aug. 2016). "The Potential Role of T Helper Cell 22 and IL-22 in Immunopathogenesis of Multiple Sclerosis," Innovations in Clinical Neuroscience 13(7-8):30-36.
NIH (Apr. 2, 2015). "Study of IL-22 IgG2-Fc (F-652) for Subjects With Grade II-IV Lower GI aGVHD," ClinicalTrials.gov, No. NCT02406651, 13 pages, retrieved on Jun. 27, 2022, from https://www.clinicaltrials.gov/ct2/show/results/NCT02406651?term=NCT02406651&draw=2&rank=1&view=results.
NIH (Feb. 11, 2009). "Antibiotics for the Treatment of Ulcerative Colitis," ClinicalTrials.gov, No. NCT00355602, 8 pages, retrieved from https://clinicaltrials.gov/ct2/show/NCT00355602.
NIH (Jan. 14, 2016). "Use of F-652 in Patients With Alcoholic Hepatitis (Treat 008)," ClinicalTrials.gov, No. NCT02655510, 8 pages, retrieved from https://clinicaltrials.gov/ct2/show/.
NIH (Jun. 30, 2018). "RePorter Frequently Asked Questions (Faq)," NIH Research Portfolio Online Reporting Tools (RePort), 2 pages.
Nilson, B.H.K. at al. (Feb. 5, 1992). "Protein L From Peptostreptococcus Magnus Binds to the Kappa Light Chain Variable Domain," J. Biol. Chem. 267(4):2234-2239.
Nursing and Midwifery Council (Nov. 19, 2007). "The Administration of Medicines," Medicines Management, 7 pages.
Oki, K. et al. (2016, e-pub. Nov. 28, 2016). "Comprehensive Analysis of The Fecal Microbiota of Healthy Japanese Adults Reveals a New Bacterial Lineage Associated With a Phenotype Characterized by a High Frequency of Bowel Movements and a Lean Body Type," BMC Microbiology 16:284, 13 pages.
Pan, H. et al. (Feb. 2004). "Hydrodynamic Gene Delivery of Interleukin-22 Protects the Mouse Liver from Concanavalin A-, Carbon Tetrachloride-, and Fas Ligand-Induced Injury via Activation of STAT3," Cell. Mol. Immunol. 1(1):43-49.
Papathanassoglou, E.D.E. et al. (Sep. 2008). "Multiple Organ Dysfunction Syndrome Pathogenesis and Care: A Complex Systems' Theory Perspective," Nursing in Critical Care 13(5):249-259. (Abstract Only).
Parks, O.B. et al. (Jan. 13, 2016). "Interleukin-22 Signaling in the Regulation of Intestinal Health and Disease," Frontiers in Cell and Developmental Biology 3:1-13(Article 85).
Pearson, C. et al. (Jun. 2012; e-published on May 10, 2012). "Lymphoid Microenvironments and Innate Lymphoid Cells in the Gut," Trends Immunol 33(6):289-296.
Peery, A. F. et al. (Nov. 2012, e-pub. Aug. 8, 2012). "Burden of Gastrointestinal Disease in the United States—2012 Update," Gastroenterology 143:1179-1187.
Petkova, S.B. et al. (2006, e-pub. Oct. 31, 2006). "Enhanced Half-Life of Genetically Engineered Human IgG1 Antibodies in a Humanized FcRn Mouse Model: Potential Application in Humorally Mediated Autoimmune Disease," Int'l. Immunol. 18(12):1759-1769.
Petrovic, A. et al. (Feb. 15, 2004; Epub Oct. 16, 2003) "LPAM (Alpha 4 Beta 7 Integrin) is an Important Homing Integrin on Alloreactive T Cells in The Development of Intestinal Graft-Versus-Host Disease." Blood. 103:1542-1547.
Piaggesi, A. et al. (Oct. 17-19, 2019). "A Randomized, Multiple-Dose Study of Subcutaneous UTTR1147A (IL-22Fc) in Patients with Neuropathic, Non-Healing Diabetic Foot Ulcers (DFUs)," Abstract IDL 67, Poster presented at Diabetic Foot Global Conference (DFCon), Oct. 17-19, 2019, Los Angeles, CA, 1 page.
Pickert, G. et al. (Jul. 2009, e-pub. Jun. 29, 2009). "STAT3 Links IL-22 Signaling in Intestinal Epithelial Cells to Mucosal Wound Healing," J. Exp. Med. 206:1465-1472.
Pociask, D. et al. (Apr. 2013). "IL-22 is Essential for Lung Epithelial Repair Following Influenza Infection," Am. J. Pathol. 182(4):1286-1296.
Ponce, D.M. et al. (2020). "A Phase 2 Study of F-652, a Novel Tissue-Targeted Recombinant Human Interleukin-22 (IL-22) Dimer, for Treatment of Newly Diagnosed Acute Gvhd of the Lower GI Tract," Biol Blood Marrow Transplant. 26(3):S51-S52.
Ponce, D.M. et al. (Jun. 2013). "Graft-versus-host Disease After Double-Unit Cord Blood Transplantation Has Unique Features and an Association with Engrafting Unit-Recipient HLA-match," Biol Blood Marrow Transplant 19(6): 904-911.
Qiu, Z. et al. (Jan. 2006). "Fibronectin Prevents D-Galactosamine/Lipopolysaccharide-Induced Lethal Hepatic Failure in Mice," Shock 25(1):80-87.
Quinlan, G.J. et al. (Oct. 1998). "Administration of Albumin to Patients With Sepsis Syndrome: A Possible Beneficial Role in Plasma Thiol Repletion," Clinical Science 95:459-465.
R&D Systems, Inc. (2021). "Quantikine® Elisa Human IL-10 Immunoassay," Product Datasheets, located at: https://resources.rndsystems.com/pdfs/datasheets/d1000b.pdf, last visited on Mar. 20, 2020, 16 pages.
Raag, R. et al. (Jan. 1995). "Single-chain Fvs," The FASEB Journal 9:73-80.
Radaeva, S. et al. (May 2004). "Interleukin 22 (IL-22) Plays a Protective Role in T Cell-Mediated Murine Hepatitis: IL-22 is a Survival Factor for Hepatocytes via STAT3 Activation," Hepatology 39(5):1332-1342.
Rahman, T. M. (Apr. 2000). "Animal Models of Acute Hepatic Failure," International Journal of Experimental Pathology 81(2):145-157.
Ramakrishnan, S. et al. (Jan. 1984). "Comparison of the Selective Cytotoxic Effects of Immunotoxins Containing Ricin A Chain or Pokeweed Antiviral Protein and Anti-Thy 1.1 Monoclonal Antibodies," Cancer Res. 44:201-208.
Ramaswamy, S. et al. (2017). "Antinociceptive and Immunosuppressive Effect of Opioids in an Acute Postoperative Setting: An Evidence-Based Review," BJA Education 17(3):105-110.
Ravetch, J.V. et al. (1991). "Fc Receptors," Annu. Rev. Immunol. 9:457-492.
Reagan-Shaw, S. et al. (Oct. 17, 2007). "Dose Translation From Animal to Human Studies Revisited," The FASEB Journal 22(3):659-661.
Remick, D.G. et al. (May 2007). "Pathophysiology of Sepsis", Am J Pathol 170(5):1435-1444.
Rendon, J.L. et al. (Sep. 2012). "Th17 Cells: Critical Mediators of Host Responses to Burn Injury and Sepsis," Journal of Leukocyte Biology 92(3):529-538.
Res, P.C.M. et al. (Nov. 24, 2010). "Overrepresentation of IL-17A And IL-22 Producing CD8 T Cells in Lesional Skin Suggests Their Involvement in The Pathogenesis of Psoriasis," Plos One 5(11):e14108, 11 pages.

(56) References Cited

OTHER PUBLICATIONS

Richter, W.F. et al. (Sep. 2012). "Mechanistic Determinants of Biotherapeutics Absorption Following SC Administration," The AAPS Journal 14(3):559-570.
Riley, P. et al. (Dec. 2007; e-published on May 4, 2007). "A Growing Burden: The Pathogenesis, Investigation and Management of Non-Alcoholic Fatty Liver Disease," Journal of Clinical Pathology 60(12):1384-1391.
Ritsma, L. et al. (Mar. 20, 2014, e-pub. Feb. 16, 2014). "Intestinal Crypt Homeostasis Revealed at Single-Stem-Cell Level by In Vivo Live Imaging," Nature 507:362-365.
Roche (Dec. 2020). "Summary of Clinical Trial Results: A Study to Look at a New Medicine Called "UTTR1147A"—How Safe are Different Doses for Healthy People and Patients ro Take—And How is This Medicine Processed Through The Body," ClinicalTrialsGov No. NCT02749630, 10 pages.
Rothenberg, M. E. et al. (Jan. 2019). "Randomized Phase I Healthy Volunteer Study of UTTR 1147A (IL-22Fc): A Potential Therapy for Epithelial Injury," Clinical Pharmacology & Therapeutics 105(1):177-189.
Rutz, S. et al. (Dec. 2014). "The IL-20 Subfamily of Cytokines—From Host Defence to Tissue Homeostasis," Immunology 14:783-795.
Rutz, S. et al. (Feb. 13, 2013). "IL-22, Not Simply A Th17 Cytokine," Immunol Rev. 252(1):116-132, 1 page (Abstract Only).
Sabat, R. et al. (Jan. 2014). "Therapeutic Opportunities of the IL-22-IL-22R1 System," Nat Rev Drug Discov 13:21-38.
Sale, G.E. (Mar. 1996). "Does Graft-Versus-Host Disease Attack Epithelial Stem Cells?," Mol Med Today 2(3):114-119.
Sambrook, J. et al. (1989). Molecular Cloning—A Laboratory Manual, 2nd Edition, Maniatis, T.(ed.) et al., Cold Spring Harbor Laboratory Press, New York, NY pp. v-xxxii, 28 pages, (Table of Contents only).
Sanos, S. L. et al. (Mar. 2013, e-pub. Jan. 29, 2013) "Innate Lymphoid Cells: from Border Protection to the Initiation of Inflammatory Diseases," Immunol Cell Biol 91(3):215-224.
Sato, T. et al. (Jan. 20, 2011, e-pub. Nov. 28, 2010). "Paneth Cells Constitute the Niche for Lgr5 Stem Cells in Intestinal Crypts," Nature 469:415-418.
Sato, T. et al. (May 14, 2009; e-pub. Mar. 29, 2009). "Single Lgr5 Stem Cells Build Crypt-Villus Structures in Vitro without a Mesenchymal Niche," Nature 459:262-265.
Satoh-Takayama, N. et al. (Dec. 19, 2008). "Microbial Flora Drives Interleukin 22 Production in Intestinal NKp46+ Cells that Provide Innate Mucosal Immune Defense," Immunity 29(6):958-970.
Sawa, S. et al. (Apr. 2011, e-pub. Feb. 20, 2011). "RORγt+ Innate Lymphoid Cells Regulate Intestinal Homeostasis by Integrating Negative Signals from the Symbiotic Microbiota," Nat Immunol 12:320-326, 33 pages.
Scheiermann, P. et al. (Apr. 2013). "Application of Interleukin-22 Mediates Protection in Experimental Acetaminophen-Induced Acute Liver Injury," The American Journal of Pathology 182(4):1107-1113.
Scheraga, H.A. (Jan. 1992). "Predicting Three-Dimensional Structures of Oligopeptides," Reviews in Computational Chemistry 3:73-142. (Abstract only).
Schmidt, J. et al. (Jan. 1992). "A Better Model of Acute Pancreatitis for Evaluating Therapy," Annals of Surgery 215(1):44-56.
Schroeder, M. A., et al. (May 2011). "Mouse Models of Graft-Versus-Host Disease: Advances and Limitations," Dis Model Mech 4(3):318-333.
Sekikawa, A. et al. (Mar. 2010, e-pub. Jan. 11, 2010). "Involvement of the IL-22/REG Lα Axis in Ulcerative Colitis," Lab Invest 90(3):496-505.
Shaw, C.H. et.al. (Sep. 1983). "A General Method for the Transfer of Cloned Genes to Plant Cells," Gene 23(3):315-330.
Shields, R.L. et al. (Mar. 2, 2001). "High Resolution Mapping of the Binding Site on Human IgG1 for FcγRI, FcγRII. FcγRIII, and FcRn and Design of IgG1 Variants With Improved Binding to the FcγR," J. Biol. Chem. 276(9):6591-6604.

Shin, J.-W. et al. (2010). "Interpretation of Animal Dose and Human Equivalent Dose for Drug Development," The Journal of Korean Oriental Medicine 31(3):1-7.
Shlomchik, E.D. (May 2007). "Graft-Versus-Host Disease," Nat. Rev. Immunol. 7(5):340-352.
Simons, B.D. et al. (Nov. 2011, e-pub. Jul. 20, 2011). "Stem Cell Self-Renewal in Intestinal Crypt," Exp Cell Res. 317(19):2719-2724.
Sonnenberg, G.F. et al. (Jan. 2011, e-pub. Dec. 30, 2010). "CD4(+) Lymphoid Tissue-Inducer Cells Promote Innate Immunity in the Gut," Immunity 34(1):122-134.
Sonnenberg, G.F. et al. (May 2011, e-pub. Apr. 19, 2011). "Border Patrol: Regulation of Immunity, Inflammation and Tissue Homeostasis at Barrier Surfaces by IL-22," Nat Immunol. 12(5):383-390.
Spits, H. et al. (Feb. 2013; e-published on Jan. 7, 2013). "Innate Lymphoid Cells—A Proposal for Uniform Nomenclature," Nat Rev Immunol 13:145-149, advance online publication pp. 1-5.
Sreekrishna, K. et al. (1988). "High Level Expression of Heterologous Proteins in Methylotrophic Yeast Pichia Pastoris," J. Basic Microbial. 28(4):265-278.
Stinchcomb, D.T. et al. (Nov. 1, 1979). "Isolation and Characterisation of a Yeast Chromosomal Replicator," Nature 282:39-43.
Stoner, K. L. et al. (2015, e-pub. Jul. 12, 2014). "Intravenous Versus Subcutaneous Drug Administration. Which Do Patients Prefer? A Systematic Review," The Patient-Patient-Centered Outcomes Research 8(2):145-153, 2 pages. (Abstract Only).
Stubbs, M.C. et al. (Jan. 2008, e-pub. Sep. 13, 2007). "MLL-AF9 and FLT3 Cooperation in Acute Myelogenous Leukemia: Development of a Model for Rapid Therapeutic Assessment," Leukemia 22:66-77.
Sugimoto, K. et al. (Feb. 2008). "IL-22 Ameliorates Intestinal Inflammation in a Mouse Model of Ulcerative Colitis," The Journal of Clinical Investigation 118(2):534-544.
Takashima, S. et al. (Feb. 14, 2011, e-pub. Jan. 31, 2011). "The Wnt Agonist R-Spondin1 Regulates Systemic Graft-Versus-Host Disease by Protecting Intestinal Stem Cells," J Exp Med 208(2):285-294.
Takatsuka, H. et al. (2003). "Intestinal Graft-Versus-Host Disease: Mechanisms and Management," Drugs 63(1): 1-15. (Abstract Only).
Talbot, I. et al. (2006). "Graft-Versus-Host Disease," Biopsy Pathology in Colorectal Disease, 2Ed: Chapter 11.6, 192-194.
Tang, K.-Y. et al. (2019, e-pub Apr. 18, 2018). "Safety, Pharmacokinetics, and Biomarkers of F-652, A Recombinant Human Interleukin-22 Dimer, in Healthy Subjects," Cellular & Molecular Immunology 16(5):473-482.
Tappe, D. et al. (2016, e-pub. Dec. 24, 2015). "Cytokine Kinetics of Zika Virus-Infected Patients From Acute to Reconvalescent Phase," Med Microbiol Immunol. 205:269-273.
Tilburn, J. et.al. (Dec. 1983). "Transformation by Integration in Aspergillus nidulans," Gene 26(2-3):205-221.
Tschemper, G. et al. (Jul. 1980). "Sequence of a Yeast DNA Fragment Containing a Chromosomal Replicator and the TRP1 Gene," Gene 10(2):157-166.
Tsunoda, S. et al. (May 1995). "Characterization of PEG-IL-6 and its Thrombopoetic Activity in Vivo," Drug Delivery System 10(3):175-180; (with English introduction).
Tymoczko, J.L. et al. (Dec. 23, 2011). "Membranes Define the Cell and Carry out Cellular Functions," Chapter 1.4 in Biochemistry A Short Course, Second Edition, W.H. Freeman and Company, New York, pp. 13-15, 5 pages.
U.S. Appl. No. 17/799,627, filed Aug. 12, 2022, by Yang et al. (submitted herewith pursuant to the waiver of 37 C.F.R. § 1.98 (a)(2)(iii) issued by the Office on Sep. 21, 2004.).
U.S. Appl. No. 18/156,016, filed Jan. 18, 2023, by Marcel et al. (submitted herewith pursuant to the waiver of 37 C.F.R. § 1.98 (a)(2)(iii) issued by the Office on Sep. 21, 2004.).
Ueki, K. et al. (Jul. 13, 2004). "Central Role of Suppressors of Cytokine Signaling Proteins in Hepatic Steatosis, Insulin Resistance, and the Metabolic Syndrome in the Mouse," PNAS 101(28):10422-10427.
Urlaub, G. et al. (Jul. 1980). "Isolation of Chinese Hamster Cell Mutants Deficient in Dihydrofolate Reductase Activity," Proc. Natl. Acad. Sci. USA 77(7):4216-4220.

(56) References Cited

OTHER PUBLICATIONS

Van Den Berg, J.A. et al. (Feb. 1990). "Kluyveromyces as a Host for Heterologous Gene Expression: Expression and Secretion of Prochymosin," Bio/Technology 8(2):135-139.
Van Solingen, P. et al. (May 1977). "Fusion of Yeast Spheroplasts," Journal of Bacteriology 130(2):946-947.
Varona, R. (Jul. 1, 2005, e-pub Mar. 17, 2005) "CCR6 Regulates CD4+ T-Cell-Mediated Acute Graft-Versus-Host Disease Responses," Blood. 106(1):18-26.
Velardi, E. et al. (Sep.-Oct. 2013, e-pub Oct. 8, 2013) "Clinical Strategies to Enhance Thymic Recovery After Allogeneic Hematopoietic Stem Cell Transplantation," Immunol Lett. 155(1-2):31-35.
Vitetta, E.S. et al. (Nov. 20, 1987). "Redesigning Nature's Poisons to Create Anti-Tumor Reagents," Science 238:1098-1104.
Wagner, F. et al. (2020). "P420 A Randomised, Observer-Blinded Phase Ib Multiple, Ascending Dose Study of UTTR1147A, an IL-22Fc Fusion Protein, in Healthy Volunteers and Ulcerative Colitis Patients," Journal of Crohn's and Colitis 14(Supplement 1):S382-S383.
Walsh, M.C. et al. (Feb. 1986). "Necrotizing Enterocolitis: Treatment Based on Staging Criteria", Pediatr Clin North Am. 33(1):179-201.
Wang, F. et al. (Aug. 2013, e-pub. May 2, 2013). "Isolation and Characterization of Intestinal Stem Cells Based on Surface Marker Combinations and Colony-Formation Assay," Gastroenterology 145:383-395.
Wang, X. et al. (Oct. 9, 2014). "Interleukin-22 Alleviates Metabolic Disorders and Restores Mucosal Immunity in Diabetes," Nature 514(7521):237-241.
Weber, G.F. et al. (Apr. 2007, e-pub Jan. 29, 2007). "Inhibition of Interleukin-22 Attenuates Bacterial Load and Organ Failure During Acute Polymicrobial Sepsis," Infection and Immunity 75(4):1690-1697.
Who. (Jul. 2015). "What is Hepatitis?" located at http://www.who.int/features/qa/76/en/, last visited on Jan. 15, 2016, three pages.
Wingard, J.R. et al. (Jun. 1, 2011). "Long-Term Survival and Late Deaths after Allogeneic Hematopoietic Cell Transplantation," J. Clin. Oncol. 29(16):2230-2239.
Witte, E. et al. (Oct. 2010, e-published on Sep. 25, 2010). "Interleukin-22: A Cytokine Produced by T, NK and NKT Cell Subsets, with Importance in the Innate Immune Defense and Tissue Protection," Cytokine Growth Factor Rev. 21(5):365-379.
Wolk, K. (Oct. 2006). "Interleukin-22: A Novel T- and NK-Cell Derived Cytokine That Regulates The Biology of Tissue Cells," Cytokine & Growth Factor Reviews 17(5):367-380. (Abstract Only).
Wolk, K. et al. (2009, e-pub Mar. 30, 2009). "IL-22 and IL-20 are Key Mediators of The Epidermal Alterations in Psoriasis While IL-17 and IFN-γ are Not," Journal of Molecular Medicine 87(5):523-536.
Wolk, K. et al. (Aug. 2004). "IL-22 Increases the Innate Immunity of Tissues," Immunity 21(2):241-254.
Wolk, K. et al. (Jun. 2002). "Cutting Edge: Immune Cells as Sources and Targets of the IL-10 Family Members?," Journal of Immunology 168(11):5397-5402.
Wolk, K. et al. (May 2006). "IL-22 Regulates the Expression of Genes Responsible for Antimicrobial Defense, Cellular Differentiation, and Mobility in Keratinocytes: A Potential Role in Psoriasis," Eur J Immunol. 36:1309-1323.
Written Opinion of the International Searching Authority mailed Mar. 9, 2010, for International Application No. PCT/US10/20673, filed Jan. 11, 2010, four pages.
Written Opinion of the International Searching Authority mailed May 3, 2006, for International Application No. PCT/US05/28186, filed Aug. 8, 2005, three pages.
Written Opinion of the International Searching Authority mailed on Apr. 18, 2013 for PCT Patent Application No. PCT/CN2012/087694, filed on Dec. 27, 2012, 11 pages.
Written Opinion of the International Searching Authority mailed on Dec. 8, 2011 for PCT Patent Application No. PCT/CN2011/079124, filed on Aug. 30, 2011, 7 pages.
Written Opinion of the International Searching Authority mailed on Feb. 10, 2015 for International Application No. PCT/CN2014/090520 filed on Nov. 6, 2014, 4 pages.
Written Opinion of the International Searching Authority mailed on Jan. 30, 2015 for PCT Application No. PCT/CN2014/090519 filed Nov. 6, 2014, 5 pages.
Written Opinion of the International Searching Authority mailed on Nov. 26, 2008 for PCT Application No. PCT/US2008/071859 filed on Aug. 1, 2008, 5 pages.
Wu, C. et al. (Nov. 2007; e-pub. Oct. 14, 2007). "Simultaneous Targeting of Multiple Disease Mediators by a Dual-Variable-Domain Immunoglobulin," Nat. Biotechnol. 25(11):1290-1297.
Xiang, X. et al. (2011). "IL-22 and Non-ELR-CXC Chemokine Expression in Chronic Hepatitis B Virus-Infected Liver," Immunol. Cell Biol. 90(6):1-9.
Xie, M.H. et al. (Oct. 6, 2000; e-pub. Jun. 29, 2000). "Interleukin (IL)-22, a novel human cytokine that signals through the interferon receptor-related proteins CRF2-4 and IL-22R," J. Biol. Chem. 275(40):31335-31339.
Xin, N. et al. (2015, e-pub. Aug. 24, 2015). "Exploring The Role of Interleukin-22 in Neurological and Autoimmune Disorders," Int Immunopharmacol. 28(2):1076-1083.
Xing, W. et al. (Nov. 2011, e-pub Aug. 16, 2011). "Hepatoprotective Effects of IL-22 on Fulminant Hepatic Failure Induced by D-Galactosamine and Lipopolysaccharide in Mice," Cytokine 56(2):174-179. (Abstract Only).
Yamada, A. et al. (Feb. 21, 2016). "Role of Regulatory T Cell in the Pathogenesis of Inflammatory Bowel Disease," World J Gastroenterol 22(7):2195-2205.
Yamaguchi, K. et al. (Jun. 2007). "Inhibiting Triglyceride Synthesis Improves Hepatic Steatosis but Exacerbates Liver Damage and Fibrosis in Obese Mice with Nonalcoholic Steatohepatitis," Hepatology 45(6):1366-1374.
Yang, L. et al. (Aug. 2010; e-published on Apr. 21, 2010). "Amelioration of High Fat Diet Induced Liver Lipogenesis and Hepatic Steatosis by Interleukin-22," Journal of Hepatology 53(2):339-347.
Yang, R. et al. (Nov. 2012). "MR Imaging of Acute Pancreatitis: Correlation of Abdominal Wall Edema with Severity Scores," European Journal of Radiology 81(11):3041-3047.
Yasuda. (1993). Biomedicine and Therapeutics 27(10):1221-1223. (English translation of the Introduction only).
Yazji, I. et al. (May 6, 2013). "Endothelial TLR4 Activation Impairs Intestinal Microcirculatory Perfusion in Necrotizing Enterocolitis via Enos-NO-Nitrite Signaling," Proceedings of The National Academy of Sciences 110(23):9451-9456.
Yelton, M.M. et al. (Mar. 1, 1984). "Transformation of Aspergillus Nidulans by Using a trpC Plasmid," Proc. Natl. Acad. Sci. USA 81(5):1470-1474.
Yokoyama, W.M. (Mar. 2006) "How Do Natural Killer Cells Find Self to Achieve Tolerance?" Immunity. 24(3):249-257.
You, M. et al. (Jul. 2004). "Recent Advances in Alcoholic Liver Disease-II. Minireview: Molecular Mechanisms of Alcoholic Fatty Liver," Am J. Gastrointest Liver Physiol. 287:GI-G6.
Youdim, A. et al. (Jan. 2018). "Metabolic Syndrome," Merck Manual, 4 pages.
Yui, S. et al. (Apr. 2012; e-published on Mar. 11, 2012). "Functional Engraftment of Colon Epithelium Expanded in Vitro from a Single Adult Lgr5+ Stem Cell," Nat Med 18(4):618-624.
Zamecnik, P.C. et al. (Jun. 1, 1986). "Inhibition of Replication and Expression of Human T-Cell Lymphotropic Virus Type III in Cultured Cells by Exogenous Synthetic Oligonucleotides Complementary to Viral RNA," Proc. Natl. Acad. Sci. USA 83(12):4143-4146.
Zani, A. et al. (2015, e-pub. Oct. 26, 2014). "International Survey on The Management of Necrotizing Enterocolitis," European Journal of Pediatric Surgery 25(01):27-33.
Zenewicz, L.A. et al. (2011). "Recent Advances in IL-22 Biology," International Immunol. 23(3):159-163.
Zenewicz, L.A. et al. (Dec. 2008). "Innate and Adaptive Interleukin-22 Protects Mice from Inflammatory Bowel Disease," Immunity 29(6)947-957.

(56) References Cited

OTHER PUBLICATIONS

Zenewicz, L.A. et al. (Oct. 2007, e-pub. Oct. 4, 2007). "Interleukin-22 but Not Interleukin-17 Provides Protection to Hepatocytes during Acute Liver Inflammation," Immunity 27:647-659.
Zhang, H.M. et al. (Nov. 30, 2017). "Endothelial Glycocalyx in Diagnosis and Treatment of Sepsis," Occupation and Health 33(22):3158-3162 (English Abstract Only), as retrieved from https://caod.oriprobe.com/articles/52286835/Endothelial_glycocalyx_in_diagnosis_and_treatment_.htm.
Zhang, Y. et al. (Aug. 2010). "Solid Organ Transplant-Associated Acute Graft-Versus-Host Disease," Arch Pathol Lab Med. 134:1220-1224.
Zhao, K. et al. (Dec. 2013, e-pub May 20, 2013). "The Identification and Characteristics of IL-22-Producing T Cells in Acute Graft-Versus-Host Disease Following Allogeneic Bone Marrow Transplantation," Immunobiology. 218(12):1505-1513.
Zhao, K. et al. (Sep. 2014). "Interleukin-22 Aggravates Murine Acute Graft-Versus-Host Disease by Expanding Effector T Cell and Reducing Regulatory T Cell," J Interferon Cytokine Res 34:707-715.
Zheng, X.X. (May 15, 1995). "Administration of Noncytolytic IL-10/Fc in Murine Models of Lipopolysaccharide-Induced Septic Shock and Allogeneic Islet Transplantation," J. Immunol. 154:5590-5600.
Zheng, Y. et al. (Feb. 8, 2007, e-pub. Dec. 24, 2006). "Interleukin-22, a TH17 Cytokine, Mediates IL-23-Induced Dermal Inflammation and Acanthosis," Nature 445:648-651.
Zheng, Y. et al. (Mar. 2008, e-pub. Feb. 10, 2008). "Interleukin-22 Mediates Early Host Defense Against Attaching and Effacing Bacterial Pathogens," Nat Med 14:282-289.
Zheng, Y.H. et al. (Feb. 28, 2019, e-pub. Feb. 15, 2019). "IL-22/IL-22R1 Axis is Involved in Myocardial Injury of a Mouse Cecal Ligation and Puncture Model," American Journal of Translational Research 2(11):998-1008.
Zhou, W.J. et al. (Sep. 5, 2013). "Induction of Intestinal Stem Cells by R-Spondin 1 and Slit2 Augments Chemoradioprotection," Nature 501:107-111.
Zhu, H. et al. (Nov. 12, 2004). "STAT3 Induces Anti-Hepatitis C Viral Activity in Liver Cells," Biochem. Biophys. Res. Commun. 324(2):518-528.
Zhu, Q. et al. (Nov. 2008). "Expression of rhEPO-L-Fc Fusion Protein and Analysis of its Bioactivity and Pharmacokinetics," Sheng Wu Gong Cheng Xue Bao 24(11):1874-1879 (English Abstract Only).
Zwarycz, B. et al. (2019). "IL22 Inhibits Epithelial Stem Cell Expansion in an Ileal Organoid Model," Cellular and Molecular Gastroenterology and Hepatology 7(1):1-17.
Xiang, X. et al. (2020). "Interleukin-22 Ameliorates Acute-On-Chronic Liver Failure By Reprogramming of Impaired Regeneration Pathways in Mice," J Hepatol. 72(4):736-745.
Zhou, H. et al. (2018). "Enhanced Regeneration and Hepatoprotective Effects of Interleukin 22 Fusion Protein on a Predamaged Liver Undergoing Partial Hepatectomy," J Immunol Res. 2018:5241526.
Hwang, S. et al. (2020). "Interleukin-22 Ameliorates Neutrophil-Driven Nonalcoholic Steatohepatitis Through Multiple Targets," Hepatology 72(2):412-429.
Mo, R. et al. (2018). "Enhanced Autophagy Contributes to Protective Effects of IL-22 Against Acetaminophen-Induced Liver Injury," Theranostics 8(15):4170-4180.
Sivakrishnan, S. (2019). "Liver Disease—An Overview," World J Pharm Pharm Sci. 9(1):1385-1395.
Barthelemy, A. et al. (Jul. 2018, e-pub. Apr. 16, 2018). "Interleukin-22 Immunotherapy During Severe Influenza Enhances Lung Tissue Integrity and Reduces Secondary Bacterial Systemic Invasion," Infection and immunity 86(7): e00706-17, 17 pages.
Hebert, K.D. et al. (2020, e-pub. Oct. 9, 2019). "Targeting The IL-22/IL-22BP Axis Enhances Tight Junctions and Reduces Inflammation During Influenza Infection," Mucosal Immunology 13(1):64-74.
Li, G. et al. (Mar. 2020). "Therapeutic Options for the 2019 Novel Coronavirus (2019-nCoV)," Nature Reviews Drug Discovery 19(3):149-150.
Martin, L. et al. (2016). "The Endothelial Glycocalyx: New Diagnostic and Therapeutic Approaches in Sepsis," Biomed Research International 2016(3758278):9 pages.
Mohty, M. et al. (Mar. 23, 2023). "IL-22, a New Beacon InGastrointestinal aGVHD," Blood 141(12):1369-1370.
Ponce, D.M. et al. (Mar. 23, 2023). "A Phase 2 Study of F-652, a Novel Tissue-Targeted Recombinant Human Interleukin-22 (IL-22) Dimer, for Treatment of Newly Diagnosed Acute Gvhd of the Lower GI Tract," Blood 141(12):1389-1401, Supplemental Information, 32 pages.
Ponce, D.M. et al. (Mar. 23, 2023). "A Phase 2 Study of Interleukin-22 and Systemic Corticosteroids as Initial Treatment for Acute GVHD of The Lower GI tract," Blood 141(12):1389-1401, Abstract, 7 pages.
Ponce, D.M. et al. (2020). "A Phase 2 Study of F-652, a Novel Tissue-Targeted Recombinant Human Interleukin-22 (IL-22) Dimer, for Treatment of Newly Diagnosed Acute Lower GI GVHD," Abstract No. 132763, 4 pages.
Satta, T. et al. (Date Unknown). "Use of a Tissue-Targeting Recombinant Human Interleukin-22 (IL-22) Fusion Molecule (F-652) for the Treatment of Advanced Refractory Lower GI Acute Graft-versus-Host-Disease (GI aGVHD)," Memorial Sloan Kettering Cancer Center, Poster, 1 page.
Satta, T. et al. (Nov. 28, 2023). "Use of a Tissue-Targeting Recombinant Human Interleukin-22 Fusion Molecule (F-652) for the Treatment of Advanced Refractory Lower GI Acute Gvhd," Blood 142(Supplement 1):7019, Abstract No. 722, 2 pages.
Satta, T. et al. (Feb. 2024). "Use of a Tissue-Targeting Recombinant Human Interleukin-22 Fusion Molecule (F-652) for the Treatment of Advanced Refractory Lower GI Acute Gvhd," ScienceDirect 30(2):S263, Abstract No. 348, 2 pages.
Tang, R. et al. (2018, e-pub. Feb. 17, 2017). "Gut Microbial Profile is Altered in Primary Biliary Cholangitis and Partially Restored After UDCA Therapy," Gut 67:534-571.

Pre-treatment GI biopsy

GI biopsy post-F-652 (IL-22)

Non-responders are marked with an arrow.

METHODS FOR TREATING GRAFT VERSUS HOST DISEASE

CROSS REFERENCE TO RELATED APPLICATIONS

This application is a national stage application under 35 U.S.C. § 371 of International Application No. PCT/CN2021/076929, filed internationally on Feb. 19, 2021, which claims priority benefit of U.S. Provisional Application No. 62/978,650, filed on Feb. 19, 2020, the content of each of which is incorporated herein by reference in their entirety.

SUBMISSION OF SEQUENCE LISTING ON ASCII TEXT FILE

The content of the following submission on ASCII text file is incorporated herein by reference in its entirety: a computer readable form (CRF) of the Sequence Listing (file name: 720622001700SEQLIST.TXT, date recorded: Aug. 5, 2022, size: 23,837 bytes).

FIELD OF THE INVENTION

This invention pertains to methods of treating graft vs. host disease (GvHD) and methods of identifying or selecting an individual having GvHD for treatment described herein.

BACKGROUND OF THE INVENTION

Mechanisms regulating host tissue recovery from immune-mediated damage in graft vs. host disease (GvHD) remain incompletely understood. Current strategies to reduce clinical GvHD have the undesired effect of limiting both post-transplant immune function and therapeutic (beneficial) graft vs. leukemia/lymphoma (GVL) responses. For example, one concern is the maintenance and regeneration of intestinal epithelial tissues because GvHD may cause intestinal cell pathology which interferes with intestinal functions. GI GvHD is the predominant contributor to acute GvHD-related mortality after allogeneic hematopoietic stem/progenitor cell transplantation.

The disclosures of all publications, patents, patent applications and published patent applications referred to herein are hereby incorporated herein by reference in their entirety.

BRIEF SUMMARY OF THE INVENTION

The present application provides methods of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy. In some embodiments, the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the individual has an Ann Arbor score of 3, 2, and/or 1 prior to the treatment. In some embodiments, prior to the treatment: i) the fecal microbiota of the individual is characterized with a PC2 score of no more than 0.5 (such as no more than 0) based upon analysis of bacterial 16S rRNA sequencing of the fecal sample; and/or ii) the individual has a gut microbiota profile characterized with enriched Lachnospiraceae and Ruminococcaceae. In some embodiments, the individual has an infection. The present application also provides methods of identifying/selecting an individual for a treatment of graft verse host disease (GvHD) in the individual comprising: a) evaluating intestinal microbiome in the individual; and b) selecting an individual for treatment based upon: i) the individual has a gut microbiota profile characterized with enriched Lachnospiraceae and/or Ruminococcaceae; ii) the fecal microbiota of the individual is characterized with a PC2 score of no more than 0.5 (e.g., no more than 0) based upon analysis of bacterial 16S rRNA sequencing of the fecal sample; and/or iii) the individual has an Ann Arbor score of 3, wherein the treatment comprises: i) an effective amount of an IL-22 dimer comprising two monomeric subunits, wherein each monomeric subunit comprises an IL-22 domain and an Fc domain; and ii) an immunosuppressive therapy.

In one aspect of the present application, there is provided a method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the IL-22 dimer is administered at a frequency of at least about once a week during each of the at least two cycles. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months. In some embodiments, the individual has an Ann Arbor score of 1, 2, and/or 3. In some embodiments, the fecal microbiota of the individual prior to the treatment is characterized with a PC2 score of no more than 0.5 based upon analysis of bacterial 16S rRNA sequencing of the fecal sample; or the individual has a gut microbiota profile characterized with enriched Lachnospiraceae and Ruminococcaceae.

In another aspect of the present application, there is provided a method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, wherein the individual has an Ann Arbor score of 3 prior to the treatment. In some embodiments, the method further comprises assessing Ann Arbor score of the individual. In some embodiments, the method further comprises selecting the individual for the treatment based upon the individual having an Ann Arbor score of 3.

In another aspect of the present application, there is provided a method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, and wherein prior to the treatment: i) the fecal microbiota of the individual is characterized with a PC2 score of no more than 0.5 based upon analysis of bacterial 16S rRNA sequencing of the fecal sample; or ii) the individual has a gut microbiota profile characterized with enriched Lachnospiraceae and Ruminococcaceae. In some embodiments, the method further comprises assessing bacterial 16s rRNA gene sequence in fecal sample of the individual. In some embodiments, the method further comprises selecting the individual for the treatment based upon the fecal microbiota of the individual having a PC2 score of no more than 0.5 based upon analysis of bacterial 16S rRNA sequencing of the fecal sample.

In another aspect of the present application, there is provided a method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, wherein the individual has an infection. In some embodiments, the immunosuppressive therapy comprises one or more corticosteroids. In some embodiments, the one or more corticosteroids are contraindicated for the individual.

In another aspect of the present application, there is provided a method of identifying/selecting an individual for a treatment of graft verse host disease (GvHD) in the individual comprising: a) evaluating intestinal microbiome in the individual; and b) selecting an individual for treatment based upon: i) the individual has a gut microbiota profile characterized with enriched Lachnospiraceae and/or Ruminococcaceae; ii) the fecal microbiota of the individual is characterized with a PC2 score of no more than 0.5 based upon analysis of bacterial 16S rRNA sequencing of the fecal sample; and/or iii) the individual has an Ann Arbor score of 3, wherein the treatment comprises: i) an effective amount of an IL-22 dimer comprising two monomeric subunits, wherein each monomeric subunit comprises an IL-22 domain and an Fc domain; and ii) an immunosuppressive therapy. In some embodiments, the fecal microbiota of the individual prior to the treatment is characterized with a PC2 score of no more than 0 based upon analysis of bacterial 16S rRNA sequencing of the fecal sample.

In some embodiments according to any one of the methods described above, the method or the treatment comprises administering the IL-22 dimer for at least two cycles, wherein each of the at least two cycles comprises administering the IL-22 dimer at least about once a week for a period of at least two weeks, wherein two consecutive cycles of the at least two cycles are separated by a rest period of at least about one week.

In some embodiments according to any one of the methods described above, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6.

In some embodiments according to any one of the methods described above, the amount of the IL-22 dimer for each administration is about 1 μg/kg to about 500 μg/kg for a human being or a comparable dose for an individual who is not a human being. In some embodiments, the amount of the IL-22 dimer for each administration is about 2 μg/kg to about 200 μg/kg for a human being or a comparable dose for an individual who is not a human being. In some embodiments, the amount of the IL-22 dimer for each administration is about 5 μg/kg to about 80 μg/kg, or about 10 μg/kg to about 45 μg/kg (e.g., 10 μg/kg, 30 μg/kg, or 45 μg/kg) for a human being or a comparable dose for an individual who is not a human being. In some embodiments, the amount of the IL-22 dimer for each administration is about 45 μg/kg for a human being or a comparable dose for an individual who is not a human being.

In some embodiments according to any one of the methods described above, the IL-22 dimer is administered intravenously.

In some embodiments according to any one of the methods described above, the GvHD is acute GvHD.

In some embodiments according to any one of the methods described above, the GvHD is a gastrointestinal GvHD (GI GvHD). In some embodiments, the GI GvHD is lower GI GvHD. In some embodiments, the lower GI GvHD is selected from the group consisting of Grade II, Grade III and Grade IV lower GI GvHD.

In some embodiments according to any one of the methods described above, the individual has not been subject to corticosteroid for GvHD for a period of three or more days prior to the treatment.

In some embodiments according to any one of the methods described above, the individual does not have an ongoing Cytomegalovirus (CMV) infection immediately prior to the treatment.

In some embodiments according to any one of the methods described above, the individual is a human.

In some embodiments according to any one of the methods described above, the immunosuppressive therapy comprises a corticosteroid drug. In some embodiments, the corticosteroid drug is a systemic corticosteroid. In some embodiments, the corticosteroid drug is a prednisone. In some embodiments, the prednisone is administered at a dose of no more than about 2 mg/kg for a human being or a comparable dose for an individual who is not a human being. In some embodiments, the corticosteroid drug is administered daily.

BRIEF DESCRIPTION OF THE DRAWINGS

FIG. 3A depicts results of a colonic biopsy with crypt injury and extensive epithelial cell apoptosis. Arrows point to apoptotic cells. FIG. 3B depicts results of a colonic biopsy Day 28 after treatment, which shows colonic mucosa with only rare epithelial apoptotic bodies in basal crypts. Arrow points to a single apoptotic cell.

DETAILED DESCRIPTION OF THE INVENTION

Figure 1:
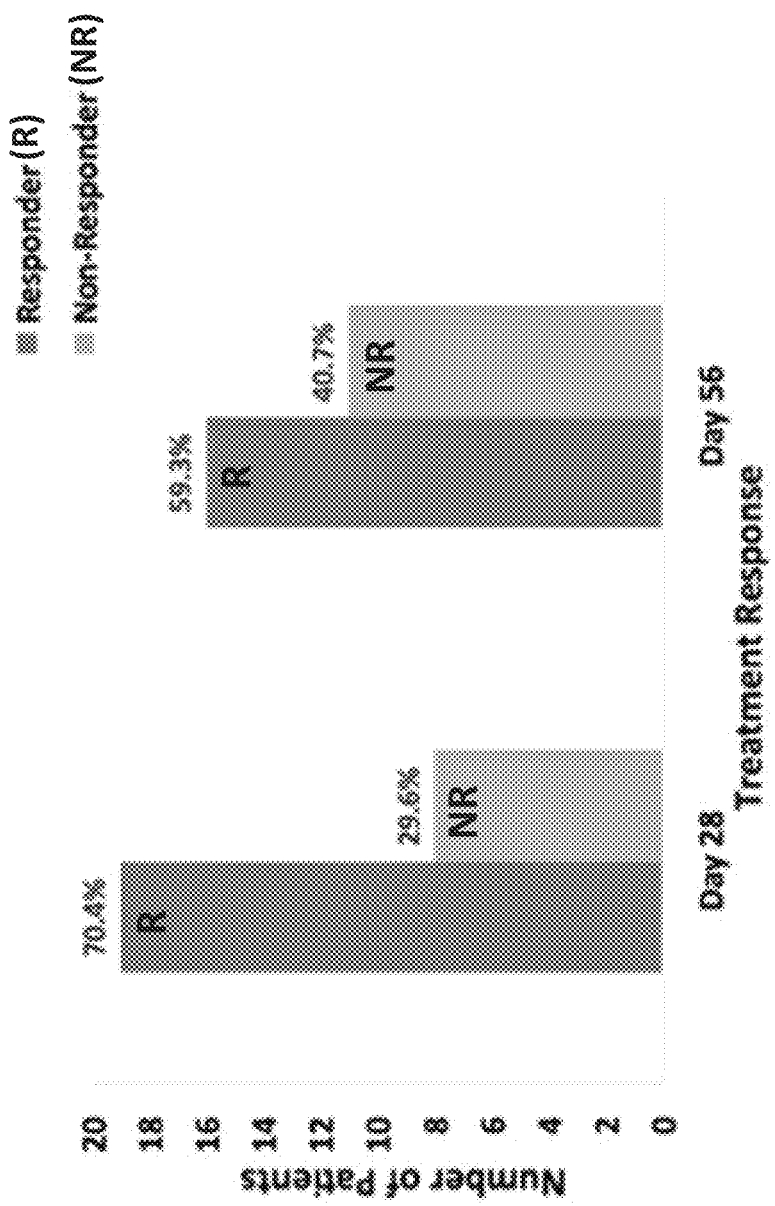
FIG. 1 depicts response rates at Day 28 and Day 56 after treatment.

The present application provides method of treating graft versus host disease (GvHD) in an individual, comprising administering to the individual an effective amount of an agent comprising IL-22 (such as an IL-22 dimer). In some embodiments, the method comprises administering to the individual a) an effective amount of an IL-22 dimer comprising two monomeric subunits, wherein each monomeric subunit comprises an IL-22 domain and an Fc domain, and b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the method comprises administering to the individual: a) an effective amount of an IL-22 dimer comprising two monomeric subunits, wherein each monomeric subunit comprises an IL-22 domain and an Fc domain; and b) an immunosuppressive therapy, wherein the individual has an Ann Arbor score of 3 prior to the treatment. In some embodiments, the method comprises administering to the individual: a) an effective amount of an IL-22 dimer comprising two monomeric subunits, wherein each monomeric subunit comprises an IL-22 domain and an Fc domain; and b) an immunosuppressive therapy, and wherein prior to the treatment: i) the fecal microbiota of the individual is characterized with a PC2 score of no more than 0.5 based upon analysis of bacterial 16S rRNA sequencing of the fecal sample; or ii) the individual has a gut microbiota profile characterized with enriched Lachnospiraceae and Ruminococcaceae. In some embodiments, the method comprises administering to the individual: a) an effective amount of an IL-22 dimer comprising two monomeric subunits, wherein each monomeric subunit comprises an IL-22 domain and an Fc domain; and b) an immunosuppressive therapy, wherein the individual has an infection. The present application also provides methods of identifying/selecting an individual for treatment described herein. In some embodiments, the method comprises a) evaluating intestinal microbiome in the individual; and b) selecting an individual for treatment based upon: i) the individual has a gut microbiota profile characterized with enriched Lachnospiraceae and/or Ruminococcaceae; ii) the fecal microbiota of the individual is characterized with a PC2 score of no more than 0.5 based upon analysis of bacterial 16S rRNA sequencing of the fecal sample; or iii) the individual has an Ann Arbor score of 3.

The present application is at least partly based upon the surprisingly advantageous preliminary results from a Phase IIa study on the effect of a representative agent comprising IL-22 (i.e., F-652, an IL-22 dimer) on treating GvHD. As described in Example 1 in more details, patients having GvHD and treated with F-652 achieved unexpected durable response that prolongs at least about four weeks after completion of the treatment. Such results provides strong support for a regimen that has multiple cycles separated by rest period to better toxicity management. Moreover, patients with low Ann Arbor score (Ann Arbor score=1) achieved 100% response rate; patients with intermediate Ann Arbor score (Ann Arbor score=2) achieved 75% response rate; and patients with high Ann Arbor score (Ann Arbor score=3), a population very difficult to treat, achieved a response rate of about 58%. Such high response rates in all three populations, especially the population with high Ann Arbor score, are striking. Moreover, the preliminary study also provides strong evidence that patients treated with F-652 achieved a) a more diverse and/or abundant gut microbiota profile. Furthermore, the results also suggest that patients with a gut microbiota profile characterized with enriched Lachnospiraceae and/or Ruminococcaceae or having a fecal microbiota characterized with a PC2 score of no more than 0.5 based upon analysis of bacterial 16S rRNA sequencing of the fecal sample responds more favorably to the treatment described herein.

Definitions

Unless specifically indicated otherwise, all technical and scientific terms used herein have the same meaning as commonly understood by those of ordinary skill in the art to which this invention belongs. In addition, any method or material similar or equivalent to a method or material described herein can be used in the practice of the present invention. For purposes of the present invention, the following terms are defined.

As used herein, the term "IL-22 polypeptide" or "IL-22" or "IL22" or "IL-22 protein" refers to a biologically active polypeptide capable of producing the biological activity as described herein. IL-22 of the present invention includes but not limited to human IL-22, recombinant human IL-22, murine IL-22 and/or recombinant murine IL-22. Specific polypeptide sequences are described in U.S. Patent Appln. No. US2003/0100076, U.S. Pat. Nos. 7,226,591 and 6,359,117, herein incorporated by reference in their entirety. "IL-22" also includes modified IL-22, such as pegylated IL-22 and covalently modified IL-22 proteins. The IL-22 polypeptides used herein may be isolated from a variety of sources, such as from human tissue types or from another source, or prepared by recombinant or synthetic methods. For example, descriptions of the preparation of, purification of, derivation of, formation of antibodies to or against, administration of, compositions containing, treatment of a disease with, etc., pertain to each polypeptide of the invention individually. Additionally, the IL-22 for use in the present inventions may be a product of a recombinant method wherein the IL-22 encoding DNA is administered to a subject, for example, such as lactobacilli expressing IL-22. The term "IL-22 polypeptide" also includes variants of the IL-22 polypeptides. The IL-22 of the present invention may also be modified in a way to form a chimeric molecule comprising IL-22 fused to another, heterologous polypeptide or amino acid sequence. The term IL-22 as used herein, includes both a monomer and a dimer form of IL-22 (such as IL-22 dimer as described herein). IL-22 is also known as interleukin-10 related T cell-derived inducible factor (IL-TIF).

As used herein, the term "IL-22 monomer" refers to one unit of an IL-22 protein.

As used herein, the term "IL-22 dimer" refers to a protein having more than one unit of an IL-22 molecule, for one example, an IL-22 dimer may have two IL-22 molecules linked together using linkers such as a short polypeptide, a chemical bond, and a covalent bond. In some embodiments, an IL-22 dimer contains two duplicate IL-22 molecules, in other embodiments, an IL-22 dimer is made up of different IL-22 proteins. Further examples of IL-22 dimers that may find use in the present inventions are described in U.S. patent application No. 20130171100, herein incorporated by reference in its entirety. One suitable IL-22 dimer is a recombinant IL-22 dimerized protein containing human interleukin 22 (IL-22) and produced in transformed Chinese Hamster Ovary (CHO) cells in serum-free culture produced by Generon (Shanghai) Corporation Ltd (now Evive Biotechnology (Shanghai) Ltd). IL-22 dimers are described, for example, in U.S. patent application No. 20130171100, including sequence information, herein incorporated by reference in its entirety. IL-22 dimer forming polypeptides used herein may be isolated from a variety of sources, such as from human tissue types or from another source, or prepared by recombinant or synthetic methods. In some embodiments, an IL-22 dimer comprises a carrier protein, including but not limited to an Fc fragment of human IgG (1, 2, 3, 4), or human albumin. IL-22 can be localized at the C-terminal or N-terminal of the carrier protein.

As used herein, the term "graft-versus-leukemia" or "GVL" or "Graft-versus-tumor effect" or "GVT" refers to a beneficial therapeutic immune reaction of the grafted donor T lymphocytes against the diseased bone marrow and residual tumor cells of the recipient. As used herein, the term "gastrointestinal graft vs. host disease" and "GI-GvHD" refers to damage caused by donor immune cells to host tissue of the stomach and intestine which can cause loss of appetite, nausea, vomiting, or diarrhea as part of GvHD, either acute or chronic. In severe cases, GI-GvHD can cause pain in the abdomen and bleeding in the stomach or intestines.

As used herein, the term "allogeneic transplant" refers to donor blood infusions or marrow stem cell transplants from a donor to a host patient. In other words, the patient receives bone marrow or blood stem cells from a tissue-matched or a close matched donor, i.e. matched at major HLA loci, who may or may not be a relative. Identical twin allogeneic transplants are called syngeneic transplants.

As used herein, the term "hematopoietic stem cell transplantation" or "HSCT" or "hematopoietic cell transplantation" or "HCT" refers to a transplantation of multipotent hematopoietic cells, including stem cells, usually derived from bone marrow, peripheral blood, or umbilical cord blood.

As used herein, the term "progenitor cell" in reference to an intestinal cell refers to multipotent cells that may give rise to differentiated cells of the small or large intestine, such as a columnar cell and a goblet cell.

As used herein, the term "organoid" in reference to an intestinal organoid comprising a central lumen lined by a villus-like epithelium that result from culturing of epithelial stem cells or isolated crypts in a culture medium. Crypts refer to intestinal stem/progenitor cell niche at the base of the epithelium.

As used herein, "cells" refer to the structural unit of an organism consisting of a nucleus and organelles surrounded by a semipermeable cell membrane. It is not intended to be limited to live or functioning cells.

As used herein, the term "contacting" or "treating" or "administering" a compound to a cell or tissue, such as an IL-22 protein, or IL-22 protein composition, or cytokine, or cytokine composition and the like, refers to placing the compound in a location that will allow it to touch the cell in order to produce "contacted" or "treated" cells. The contacting may be accomplished using any suitable method. For example, in one embodiment, contacting is by adding the compound to a tube of cells. Contacting may also be accomplished by adding the compound to cells in a microtiter plate. Contacting may also be accomplished by adding the compound to a culture of the cells or to an organoid culture. It is not meant to limit how the compound contacts the cells. In one embodiment, contacting may be accomplished by administration of the compound, such as an IL-22 molecule composition to an animal in vivo.

As used herein, the terms "culture media," and "cell culture media," refers to media that are suitable to support the growth of cells in vitro (i.e., cell cultures). It is not intended that the term be limited to any particular cell culture medium. For example, it is intended that the definition encompass outgrowth as well as maintenance media. Indeed, it is intended that the term encompass any culture medium suitable for the growth of the cell cultures of interest.

The term "sample" such as a "test sample" is used in its broadest sense. In one sense it can refer to an animal cell or tissue including a human cell or tissue. In another sense, it is meant to include a specimen or culture obtained from any source, in particular as a biological sample. Biological samples may be obtained from animals (including humans) and encompass fluids, solids, gases, tissues, cells, blood bone marrow and bones.

As used herein, the term "portion" when used in reference to a population of cells (as in "a portion of intestinal cells" or "a portion of bone marrow cells") refers to at least one cell of that population up to 99% of those cells. For example, where contacting results in at least a "portion" of said cell population, it should be clear that portion is with reference to a population.

As used herein, "polypeptide" or "protein" refers to an amino acid, amino acid sequence, oligopeptide, peptide, or protein or portions thereof whether naturally occurring or synthetic.

As used herein, the term "portion" when used in reference to a protein (as in "a portion of a given protein") refers to fragments of that protein. The fragments may range in size from four amino acid residues to the entire amino sequence minus one amino acid.

As used herein, the term "altered function" refers to a change in function, either increasing a function or decreasing a function, for example, a change in cell numbers, such as total thymocytes, a change in cell type, such as a change in the number of pre B cells, a change in the number of CD8+ cells, a change in function, such as epithelial cells capable of secreting a specific cytokine or inducing survival or maturation of a specific cell type, and the like.

As used herein, the term "in vitro assay" refers to any in vitro assay used to measure the increase or decrease of function or number of cells or cell subtypes. Readouts for in vitro assays of organoid cultures could include for examples, flow cytometry measurements of intestinal stem cell progeny, such as basal crypt cells. Readouts for in vitro assays of immune function could include for examples, T cell functional assays, including cytokine production, T cell subtypes, granulocytes, stromal cells, proliferation, extent of apoptosis, etc., see assays used in the Examples.

As used herein, the term "subject" refers to any animal (e.g., a mammal), including, but not limited to, humans, non-human primates, rodents, and the like, which is to be the recipient of a particular treatment. Typically, the terms "subject" and "patient" are used interchangeably herein, particularly in reference to a "human subject." For the purposes of the present inventions, a subject may be immunocompromised, i.e. not able to fight off infections or control abnormal cell growth. Examples of immunocompromised subjects include subjects that have any of the following conditions, chemotherapy, exposure to radiation, deliberate irradiation, human immunodeficiency virus infections, transplantation, etc.

The terms "treatment", "treating" and the like are used herein to generally mean obtaining a desired pharmacological and/or physiological effect. In relation to a therapeutic treatment of subject the effect may be prophylactic in terms of completely or partially preventing a disease or symptom thereof and/or may be therapeutic in terms of partially or completely curing a disease and/or adverse effect attributed to the disease. Thus "treatment" refers to both therapeutic treatment and prophylactic or preventative measures, wherein the object is to prevent or slow down (lessen) the targeted pathologic condition or disorder. Subjects in need of treatment include those already with the disorder as well as those prone to have the disorder or those in whom the disorder is to be prevented.

As used herein, when referring to a method of the present invention the term "treatment" covers any treatment of a disease in a mammal, particularly a human, and includes: (a) preventing the disease from occurring in a subject which may be predisposed to the disease but has not yet been diagnosed as having it; (b) inhibiting the disease, i.e. arresting its development; or (c) relieving the disease, i.e. causing regression of the disease. The present invention is directed towards treating patients with medical conditions relating to a loss of immunocompetence from a treatment related to a disease such as irradiation, chemotherapy, immunosuppression, etc. Accordingly, a treatment of the invention would involve preventing, inhibiting or relieving any medical condition where a desired level of immunocompetence would be achieved by the use of an IL-22 composition of the present inventions. In certain embodiments, treatment refers to exposing a subject to a therapy directed towards treating a disease, such as irradiation, chemotherapy, and the like.

As used herein, the term "administering" or "administration" refers to the act of giving a drug, prodrug, pharmaceutical composition, or other agent, or therapeutic treatment (e.g., a composition of the present invention) to a physiological system (e.g., a subject or in vivo, in vitro, or ex vivo cells, tissues, and organs). Acceptable routes of administration to the human body can be through the eyes (ophthalmic), mouth (oral), skin (transdermal), nose (nasal), lungs (inhalant), mucosal (e.g., oral mucosa or buccal), rectal, ear, by injection (e.g., intravenously, subcutaneously, intratumorally, intraperitoneally, etc.) and the like. Administration "in combination with" one or more further therapeutic agents includes simultaneous (concurrent) and consecutive administration in any order.

As used herein, the term "pharmaceutical" or "therapeutic" in reference to a composition refers to the combination of an active agent (for example, in an effective amount) (e.g., such as an IL-22 protein or IL-22 DNA)) with a carrier, inert or active, making the composition especially suitable for diagnostic or therapeutic use in vitro, in vivo or ex vivo (in vitro).

An "effective amount" of a polypeptide disclosed herein or an agonist or antagonist thereof is an amount sufficient to carry out a specifically stated purpose. An "effective amount" may be determined empirically and in a routine manner, in relation to the stated purpose. Examples of effective amounts On using the pharmaceutical composition, a safe and effective amount of the IL-22 dimer of the present invention is administrated to a mammal (e.g. human) in need thereof, in which the dosage administrated is a pharmaceutically acceptable effective administration dosage. As one example, for a human of 60 kg, the administration dosage is usually 0.01-300 mg; in a preferred embodiment, the administration dosage is 0.5-100 mg, see, for example, U.S. patent application No. 20130171100, herein incorporated by reference in its entirety.

As used herein, the term "pharmaceutically acceptable carrier" refers to any of the standard pharmaceutical carriers including, but not limited to, phosphate buffered saline solution, water, emulsions (e.g., such as an oil/water or water/oil emulsions), and various types of wetting agents, any and all solvents, dispersion media, coatings, sodium lauryl sulfate, isotonic and absorption delaying agents, disintrigrants (e.g., potato starch or sodium starch glycolate), and the like. The compositions also may include stabilizers and preservatives. Examples of carriers, stabilizers, and adjuvants are described in the art (See e.g., Martin, Remington's Pharmaceutical Sciences, 15th Ed., Mack Publ. Co., Easton, Pa. (1975), incorporated herein by reference).

The terms "pharmaceutically acceptable" or "pharmacologically acceptable," as used herein, refer to compositions that do not substantially produce adverse reactions (e.g., toxic, allergic, or immunological reactions) when administered to a subject. Examples of forms of IL-22 of the present invention used for administration comprise ointment, powder, patch, sprayer, and inhalant.

As used herein, "cytokine" refers to a protein or glycoprotein that is used in an organism as signaling compounds. It is intended to include homologues and synthetic versions. Examples include IL-22, IL-23, IL-21, the IL-10 family, IL-7, the interferon (IFN) family, CC chemokines, CXC chemokines, and the like.

As used herein the term "biologically active polypeptide" refers to any polypeptide which maintains a desired biological activity, for one example, biological IL-22 activities as described herein, such as increasing intestinal stem cell and intestinal progenitor cell division, maturation, and the like.

Where "amino acid sequence" is recited herein to refer to an amino acid sequence of a naturally occurring protein molecule, "amino acid sequence" and like terms, such as "polypeptide" and "protein" are not meant to limit the amino acid sequence to the complete, native amino acid sequence associated with the recited protein molecule. As used herein the term "recombinant protein" or "recombinant polypeptide" refers to a protein molecule that is expressed from a recombinant DNA molecule (e.g. human IL-22 expressed by cells containing a plasmid or virus expressing a human IL-22 gene).

As used herein the term "recombinant DNA molecule" refers to a DNA molecule that is comprised of segments of DNA joined together by means of molecular biological techniques (e.g. a human IL-22 gene ligated into a plasmid DNA sequence or viral sequence).

As used herein, the terms "nucleic acid molecule encoding," "DNA sequence encoding," and "DNA encoding" refer to the order or sequence of deoxyribonucleotides along a strand of deoxyribonucleic acid. The order of these deoxyribonucleotides determines the order of amino acids along the polypeptide (protein) chain. The DNA sequence thus codes for the amino acid sequence.

The term "gene" refers to a nucleic acid (e.g., DNA) sequence that comprises coding sequences necessary for the production of a polypeptide or precursor. It is intended that the term encompass polypeptides encoded by a full length coding sequence, as well as any portion of the coding sequence, so long as the desired activity and/or functional properties (e.g., IL-22 activity, ligand binding, enzymatic activity, etc.) of the full-length or fragmented polypeptide are retained. The term also encompasses the coding region of a structural gene and the sequences located adjacent to the coding region on both the 5' and 3' ends for a distance of about 1 kb on either end such that the gene corresponds to the length of the full-length m NA. The sequences that are located 5' of the coding region and which are present on the mRNA are referred to as "5' untranslated sequences." The sequences that are located 3' (i.e., "downstream") of the coding region and that are present on the mRNA are referred to as "3' untranslated sequences."

The term "gene" encompasses both cDNA and genomic forms of a gene. A genomic form of a genetic clone contains the coding region interrupted with non-coding sequences termed "introns" or "intervening regions" or "intervening sequences." Introns are segments of a gene that are transcribed into nuclear RNA (hnRNA); introns may contain regulatory elements such as enhancers. Introns are removed or "spliced out" from the nuclear or primary transcript; introns therefore are absent in the messenger RNA (mRNA) transcript. The mRNA functions during translation to specify the sequence or order of amino acids in a nascent polypeptide.

As used herein, "based upon" includes assessing, determining, or measuring the individual's characteristics as described herein (and preferably selecting an individual suitable for receiving treatment).

It is understood that embodiments of the invention described herein include "consisting" and/or "consisting essentially of" embodiments.

Reference to "about" a value or parameter herein includes (and describes) variations that are directed to that value or parameter per se. For example, description referring to "about X" includes description of "X".

The term "about X-Y" used herein has the same meaning as "about X to about Y." The expression "about X, Y or Z" used herein has the same meaning as "about X, about Y, or about Z."

As used herein, reference to "not" a value or parameter generally means and describes "other than" a value or parameter. For example, the method is not used to treat cancer of type X means the method is used to treat cancer of types other than X.

The terms "a," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

Methods of Treatment

The present application provides methods of treating graft versus host disease (GvHD) in an individual comprising administering to the individual: an effective amount of an agent comprising IL-22 (such as an IL-22 dimer comprising two monomeric subunits, wherein each monomeric subunit comprises an IL-22 domain and an Fc domain). In some embodiments, the method further comprises administering an immunosuppressive therapy (such as a corticosteroid, which is optionally contraindicated for the individual). In some embodiments, the agent comprising IL-22 (such as the IL-22 dimer) is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the individual has an Ann Arbor score of 3 prior to the treatment. In some embodiments, the individual has an Ann Arbor score of 2 or 1 prior to the treatment. In some embodiments, prior to the treatment, the fecal microbiota of the individual is characterized with a PC2 score of no more than 0.5 based upon analysis of bacterial 16S rRNA sequencing of the fecal sample; or the individual has a gut microbiota profile characterized with enriched Lachnospiraceae and Ruminococcaceae. In some embodiments, the individual has an infection.

In some embodiments, there is provided a method of treating graft versus host disease (GvHD, such as acute GvHD, such as lower GI aGvHD) in an individual, comprising administering to the individual: an effective amount of an agent comprising IL-22 (such as an IL-22 dimer comprising two monomeric subunits, wherein each monomeric subunit comprises an IL-22 domain and an Fc domain, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain); and b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the IL-22 dimer is administered at a frequency of at least about once a week during each of the at least two cycles. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months. In some embodiments, the individual has an Ann Arbor score of 3. In some embodiments, the individual has an Ann Arbor score of 2. In some embodiments, the individual has an Ann Arbor score of 1. In some embodiments, the fecal microbiota of the individual prior to the treatment is characterized with a PC2 score of no more than 0.5 (such as no more than 0) based upon analysis of bacterial 16S rRNA sequencing of the fecal sample. In some embodiments, the individual has a gut microbiota profile characterized with enriched Lachnospiraceae and/or Ruminococcaceae. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously.

In some embodiments, there is provided a method of treating graft versus host disease (GvHD, such as acute GvHD, such as lower GI aGvHD) in an individual, comprising administering to the individual: an effective amount of an agent comprising IL-22 (such as an IL-22 dimer comprising two monomeric subunits, wherein each monomeric subunit comprises an IL-22 domain and an Fc domain), wherein the individual has an Ann Arbor score of 3. In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain); and b) an immunosuppressive therapy, wherein the individual has an Ann Arbor score of 3. In some embodiments, the fecal microbiota of the individual prior to the treatment is characterized with a PC2 score of no more than 0.5 (such as no more than 0) based upon analysis of bacterial 16S rRNA sequencing of the fecal sample. In some embodiments, the individual has a gut microbiota profile characterized with enriched Lachnospiraceae and/or Ruminococcaceae. In some embodiments, the method further comprises assessing Ann Arbor score of the individual. In some embodiments, the method further comprises selecting the individual for the treatment based upon the individual having an Ann Arbor score of 3. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously. In some embodiments, the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the IL-22 dimer is administered at a frequency of at least about once a week during each of the at least two cycles. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months.

In some embodiments, there is provided a method of treating graft versus host disease (GvHD, such as acute GvHD, such as lower GI aGvHD) in an individual, comprising administering to the individual: an effective amount of an agent comprising IL-22 (such as an IL-22 dimer comprising two monomeric subunits, wherein each monomeric subunit comprises an IL-22 domain and an Fc domain), wherein the individual has an Ann Arbor score of 2. In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain); and b) an immunosuppressive therapy, wherein the individual has an Ann Arbor score of 2. In some embodiments, the fecal microbiota of the individual prior to the treatment is characterized with a PC2 score of no more than 0.5 (such as no more than 0) based upon analysis of bacterial 16S rRNA sequencing of the fecal sample. In some embodiments, the individual has a gut microbiota profile characterized with enriched Lachnospiraceae and/or Ruminococcaceae. In some embodiments, the method further comprises assessing Ann Arbor score of the individual. In some embodiments, the method further comprises selecting the individual for the treatment based upon the individual having an Ann Arbor score of 2. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously. In some embodiments, the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the IL-22 dimer is administered at a frequency of at least about once a week during each of the at least two cycles. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months.

In some embodiments, there is provided a method of treating graft versus host disease (GvHD, such as acute GvHD, such as lower GI aGvHD) in an individual, comprising administering to the individual: an effective amount of an agent comprising IL-22 (such as an IL-22 dimer comprising two monomeric subunits, wherein each monomeric subunit comprises an IL-22 domain and an Fc domain), wherein the individual has an Ann Arbor score of 1. In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain); and b) an immunosuppressive therapy, wherein the individual has an Ann Arbor score of 1. In some embodiments, the fecal microbiota of the individual prior to the treatment is characterized with a PC2 score of no more than 0.5 (such as no more than 0) based upon analysis of bacterial 16S rRNA sequencing of the fecal sample. In some embodiments, the individual has a gut microbiota profile characterized with enriched Lachnospiraceae and/or Ruminococcaceae. In some embodiments, the method further comprises assessing Ann Arbor score of the individual. In some embodiments, the method further comprises selecting the individual for the treatment based upon the individual having an Ann Arbor score of 1. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously. In some embodiments, the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the IL-22 dimer is administered at a frequency of at least about once a week during each of the at least two cycles. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months.

In some embodiments, there is provided a method of treating graft versus host disease (GvHD, such as acute GvHD, such as lower GI aGvHD) in an individual, comprising administering to the individual: an effective amount of an agent comprising IL-22 (such as an IL-22 dimer comprising two monomeric subunits, wherein each monomeric subunit comprises an IL-22 domain and an Fc domain), wherein prior to the treatment: i) the fecal microbiota of the individual is characterized with a PC2 score of no more than 0.5 based upon analysis of bacterial 16S rRNA sequencing of the fecal sample; or ii) the individual has a gut microbiota profile characterized with enriched Lachnospiraceae and Ruminococcaceae. In some embodiments, the method further comprises administering to the individual an immunosuppressive therapy. In some embodiments, the method further comprises assessing bacterial 16s rRNA gene sequence in fecal sample of the individual. In some embodiments, the method further comprises selecting the individual for the treatment based upon the fecal microbiota of the individual having a PC2 score of no more than 0.5 based upon analysis of bacterial 16S rRNA sequencing of the fecal sample. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously. In some embodiments, the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the IL-22 dimer is administered at a frequency of at least about once a week during each of the at least two cycles. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months.

In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain), b) an immunosuppressive therapy, wherein the individual has an infection. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously. In some embodiments, the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week. In some embodiments, the IL-22 dimer is administered at a frequency of at least about once a week during each of the at least two cycles. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months.

In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain), b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week, and wherein the individual has an Ann Arbor score of 3 prior to the treatment. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously.

In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain), b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week, and wherein the individual has an Ann Arbor score of 2 prior to the treatment. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously.

In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain), b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week, and wherein the individual has an Ann Arbor score of 1 prior to the treatment. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 μg/kg to about 500 μg/kg for a human being or a comparable dose for an individual who is not a human being. In some embodiments, the amount of the IL-22 dimer for each administration is about 45 μg/kg for a human being or a comparable dose for an individual who is not a human being. In some embodiments, the IL-22 dimer is administered intravenously.

In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain), b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week, and wherein prior to the treatment: i) the fecal microbiota of the individual is characterized with a PC2 score of no more than 0.5 based upon analysis of bacterial 16S rRNA sequencing of the fecal sample; or ii) the individual has a gut microbiota profile characterized with enriched Lachnospiraceae and Ruminococcaceae. In some embodiments, at least one of the at least two cycles comprises administering the IL-22 dimer at least about once a week for at least about four weeks. In some embodiments, each of the at least two cycles comprises administering the IL-22 dimer at least once a week for at least about four weeks. In some embodiments, at least one of the at least two cycles comprises administering the IL-22 dimer no more than about three months. In some embodiments, each of the at least two cycles comprises administering the IL-22 dimer no more than about three months. In some embodiments, the rest period is about one to four weeks. In some embodiments, the rest period is at least about four weeks. In some embodiments, the rest period is no more than three months. In some embodiments, the immunosuppressive therapy comprises a corticosteroid, which is optionally contraindicated for the individual. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 μg/kg to about 500 μg/kg for a human being or a comparable dose for an individual who is not a human being. In some embodiments, the amount of the IL-22 dimer for each administration is about 45 μg/kg for a human being or a comparable dose for an individual who is not a human being. In some embodiments, the IL-22 dimer is administered intravenously.

In some embodiments, there is provided a method of treating graft versus host disease (GvHD, such as acute GvHD, such as lower GI aGvHD) in an individual, comprising administering to the individual: a) an effective amount of an agent comprising IL-22 (such as an IL-22 dimer comprising two monomeric subunits, wherein each monomeric subunit comprises an IL-22 domain and an Fc domain), b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week, and wherein the individual has an infection.

In some embodiments, the GvHD is acute GvHD. In some embodiments, the GvHD is a gastrointestinal GvHD (GI GvHD). In some embodiments, the GI GvHD is lower GI GvHD. In some embodiments, the lower GI GvHD is selected from the group consisting of Grade II, Grade III and Grade IV lower GI GvHD. In some embodiments, the individual has not been subject to corticosteroid for GvHD for a period of three or more days prior to the treatment. In some embodiments, the individual does not have an ongoing Cytomegalovirus (CMV) infection immediately prior to the treatment. In some embodiments, the individual is a human. In some embodiments, the immunosuppressive therapy comprises a corticosteroid drug. In some embodiments, the corticosteroid drug is a systemic corticosteroid. In some embodiments, the corticosteroid drug is a prednisone. In some embodiments, the prednisone is administered at a dose of no more than about 2 mg/kg for a human being or a comparable dose for an individual who is not a human being. In some embodiments, the corticosteroid drug is administered daily.

In some embodiments, there is provided a method of treating graft versus host disease (GvHD, such as acute GvHD, such as lower GI aGvHD) in an individual, comprising administering to the individual: a) an effective amount of an IL-22 dimer comprising two monomeric subunits, wherein each monomeric subunit comprises an IL-22 domain and an Fc domain, wherein the IL-22 dimer comprises the amino acid sequence of any one of SEQ ID NOS: 6-9; and b) a corticosteroid drug (e.g., a systemic corticosteroid, e.g., prednisone), wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week.

In some embodiments, there is provided a method of treating graft versus host disease (GvHD, such as acute GvHD, such as lower GI aGvHD) in an individual, comprising administering to the individual: a) an effective amount of an IL-22 dimer comprising two monomeric subunits, wherein each monomeric subunit comprises an IL-22 domain and an Fc domain, wherein the IL-22 dimer comprises the amino acid sequence of any one of SEQ ID NOS: 6-9; and b) a corticosteroid drug (e.g., a systemic corticosteroid, e.g., prednisone), and wherein prior to the treatment: i) the fecal microbiota of the individual is characterized with a PC2 score of no more than 0.5 based upon analysis of bacterial 16S rRNA sequencing of the fecal sample; or ii) the individual has a gut microbiota profile characterized with enriched Lachnospiraceae and Ruminococcaceae.

In some embodiments, there is provided a method of treating graft versus host disease (GvHD, such as acute GvHD, such as lower GI aGvHD) in an individual, comprising administering to the individual: a) an effective amount of an IL-22 dimer comprising two monomeric subunits, wherein each monomeric subunit comprises an IL-22 domain and an Fc domain, wherein the IL-22 dimer comprises the amino acid sequence of any one of SEQ ID NOS: 6-9; and b) a corticosteroid drug (e.g., a systemic corticosteroid, e.g., prednisone), wherein the individual has an infection.

In some embodiments, the method further comprises administering a second or third agent or therapy. In some embodiments, the second or third agent or therapy is a standard or commonly used agent or therapy for treating GvHD. In some embodiments, the second or third agent or therapy modulates gut microbiota. For example, in some embodiments, the second or third agent or therapy promotes a more abundant and/or diverse gut microbiota profile. In some embodiments, the second or third agent or therapy promotes a gut microbiota profile characterized with enriched Lachnospiraceae and/or Ruminococcaceae in gut microbiota in the individual. In some embodiments, the agent (such as an IL-22 dimer) and the second/third agent or therapy are administered sequentially. In some embodiments, the agent (such as an IL-22 dimer) and the second/third agent or therapy are administered concurrently. In some embodiments, the agent (such as an IL-22 dimer) and the second/third agent or therapy are administered simultaneously.

Agent Comprising IL-22

The agents that comprise an IL-22 domain described herein include, and not limited to, an IL-22 or variant thereof and various IL-22 fusion proteins, such as an IL-22 dimer, such as an IL-22 dimer.

In some embodiments, the agent comprising IL-22 is an IL-22 fusion protein comprising a) an IL-22 domain, and b) a half-life prolonging domain. In some embodiments, the IL-22 domain comprises a recombinant IL-22. In some embodiments, the recombinant IL-22 is a human IL-22. In some embodiments, the half-life prolonging domain comprises an Fc domain (such as any of the Fc domain described herein). In some embodiments, the half-life prolonging domain comprises an albumin-binding domain (such as an anti-albumin domain).

IL-22

Interleukin-22 (IL-22) is protein that in humans is encoded by the IL22 gene (also known as TIFα, IL-21, ILTIF, IL-TIF, IL-D110, zcyto18, TIFIL-23). Native IL-22 precursor peptide consists of 179 amino acid residues, while the mature peptide consists of 146 amino acid residues.

IL-22 is an α-helical cytokine. IL-22 binds to a heterodimeric cell surface receptor composed of IL-10R2 and IL-22R1 subunits. IL-22R is expressed on tissue cells, and it is absent on immune cells. IL-22 is produced by several populations of immune cells at a site of inflammation. Producers include αβ T cells classes Th1, Th22 and Th17 along with γδ T cells, NKT, ILC3, neutrophils and macrophages. IL-22 takes effect on non-hematopoietic cells-mainly stromal and epithelial cells. Effects involve stimulation of cell survival, proliferation and synthesis of antimicrobials including S100, Reg3β, Reg3γ and defensins. IL-22 thus participates in both wound healing and in protection against microbes. IL-22 dysregulation takes part in pathogenesis of several autoimmune diseases like systemic lupus erythematosus, rheumatoid arthritis and psoriasis.

The use of IL-22 was reported for use in the treatment of human diseases (for example, U.S. Pat. No. 6,551,799, U.S. patent application No. 20130171100, PCT patent application No. WO2015070077, herein incorporated by reference in their entirety).

IL-22 has been shown to support intestinal mucosa after damage through multiple mechanisms, including direct signaling to the intestinal epithelium that promotes its survival and regeneration as well by inducing epithelial production of innate antimicrobial antimicrobial molecules such as REG3. In experimental murine models, aGvHD resulted in elimination of host-derived IL-22-producing cells, IL-22 deficiency increased GvHD mortality and GI pathology, and early initiation of treatment with exogenous IL-22 reduced GI pathology and improved survival.

An agent comprising an IL-22 domain for use in practicing the method of the present invention can not only be generated using recombinant DNA technology, but can also be produced through fusion of heterologous polypeptides. A description of other methods, vectors and host cells for synthesis of an IL-22 for use in practicing the method of the present invention can be found in Gething et al, Nature, 293:620-625; Mantei et al, Nature, 281:40-46. Recombinant IL-22, dimers and fusion proteins thereof are produced using methods known to those of skill in the art. For more details, see U.S. published application no. 2013/0171100, the contents of which are hereby incorporated by reference into the present disclosure.

DNA sequences encoding an IL-22 dimer or fusion protein can be entirely synthesized artificially. Alternatively, DNA encoding IL-22 can be obtained by PCR amplification or synthesis and then joined together to form a DNA sequence encoding an IL-22 dimer.

Briefly, suitable host cells are transformed or transfected with an IL-22 expression vector in accordance with known methods and subsequently grown under conditions known to those of skill in the art to promote growth; transfection techniques are described in greater detail in, for example, Molecular Cloning: a Laboratory Manual 3rd edition, J. F. Sambrook and D. W. Russell, ed. Cold Spring Harbor Laboratory Press 2001.

Host cells suitable for expression of IL-22 are also known in the art and include invertebrate cells, such as insect cells, and mammalian cells. Suitable mammalian cells include Chinese Hamster Ovary (CHO), COS cells; in particular, SV40-transformed monkey kidney CV1 cell line (COS-7, ATCC CRL 1651); human embryo kidney cell line 293 (Graham et al, J. Gen Virol, 36:59 (1997)); CHO/-DHFR (Urlaub and Chasin, Proc. Natl. Acad. Sci. USA, 77:4216

(1980)); murine testis trophoblastic cells (TM4, Mather, Biol. Reprod., 23:243-251) (1980)); human lung cells (W138, ATCC CCL 75); human liver cells (Hep G2, HB 8065); murine breast cancer cells (MMT 060562, ATCC CCL51).

A nucleic acid comprising a nucleotide sequence encoding IL-22 can be inserted into a replicable vector for gene cloning or protein expression. Many vectors for protein expression are known in the art. Using these techniques, a nucleic acid sequence encoding IL-22 is inserted into an appropriate vector, which may further include any of the following: one or more signal sequences, an origin of replication, one or more reporter genes, an enhancer element, a promoter, and a transcription termination sequence.

Methods of transfecting eukaryotic cells and transforming prokaryotic cells are also known to those of skill in the art, and may include the use of calcium chloride, calcium phosphate precipitation, lipofectamine or electroporation. One skilled in the art will be able to select a suitable method depending on the host cell selected.

In some embodiments, the agent comprising an IL-22 domain is an IL-22. In some embodiments, the IL-22 is a recombinant IL-22 (rIL-22). In some embodiments, the IL-22 is a human IL-22. In some embodiments, the IL-22 is a recombinant human IL-22.

In some embodiments, the IL-22 is an IL-22 monomer. In some embodiments, the IL-22 monomer comprises the amino acid sequence of SEQ ID NO: 1.

In some embodiments, the agent comprising an IL-22 domain is an IL-22 fusion protein comprising a) an IL-22 domain, and b) a half-life extending domain. In some embodiments, the half-life extending domain is an Fc domain, such as any of the Fc domains described herein. In some embodiments, the half-life extending domain is an albumin binding domain (such as an anti-albumin antibody).

IL-22 Dimer

In some embodiments, the IL-22 is an IL-22 dimer. In some embodiments, the IL-22 dimer has exactly two units of IL-22. In some embodiments, one or both units of IL-22 comprise the amino acid sequence of SEQ ID NO: 1.

In some embodiments, the IL-22 dimer comprises two monomeric subunits, wherein each monomeric subunit comprises an IL-22 domain and a dimerization domain. In some embodiments, the IL-22 domain is fused to the N-terminus of the dimerization domain. In some embodiments, the IL-22 domain is fused to the C-terminus of the dimerization domain. In some embodiments, the IL-22 domain is fused to the dimerization domain via a linker, such as any of the linkers described herein. In some embodiments, the linker is a peptide linker. In some embodiments, the linker has a length of about one to 50 amino acids (such as about three to thirty amino acids, such as about four to twenty-five amino acids, such as about five to twenty amino acids). In some embodiments, the linker comprises or has an amino acid sequence of any one of SEQ ID NOS: 4, 5, and 11-19. In some embodiments, the linker comprises has an amino acid sequence of SEQ ID NO: 4 or 5.

The IL-22 dimer described herein comprises two monomeric subunits, wherein each monomeric subunit comprises an IL-22 domain and a dimerization domain that is an Fc domain, such as any of the Fc domains described herein. In some embodiments, the IL-22 domain is fused to the N-terminus or C-terminus of the Fc domain via a linker. In some embodiments, the linker is a peptide linker. In some embodiments, the linker has a length of about one to 50 amino acids (such as about three to thirty amino acids, such as about four to twenty-five amino acids, such as about five to twenty amino acids). In some embodiments, the linker comprises or has an amino acid sequence of any one of SEQ ID NOS: 4, 5, and 11-19. In some embodiments, the linker comprises has an amino acid sequence of SEQ ID NO: 4 or 5.

In some embodiments, the IL-22 domain comprises a recombinant IL-22. In some embodiments, the recombinant IL-22 is a human IL-22. In some embodiments, the IL-22 domain has an IL-22 monomer. In some embodiments, the IL-22 domain monomer comprises the amino acid sequence of SEQ ID NO: 1.

In some embodiments, the IL-22 dimer comprises an amino acid sequence selected from the group consisting of SEQ ID NOS: 6-9. In some embodiments, the IL-22 dimer comprises an amino acid sequence of SEQ ID NO: 6.

Fc Domain

The term "Fc domain" herein refers to a domain that comprises a C-terminal region of an immunoglobulin heavy chain, including native-sequence Fc regions and variant Fc regions. Although the boundaries of the Fc region of an immunoglobulin heavy chain might vary, the human IgG heavy-chain Fc region is usually defined to stretch from an amino acid residue at position Cys226, or from Pro230, to the carboxyl-terminus thereof. The C-terminal lysine (residue 447 according to the EU numbering system) of the Fc region may be removed, for example, during production or purification of the molecule that has the Fc region.

Suitable native-sequence Fc regions for use in the agent comprising IL-22 (such as IL-22 dimer) described herein include human IgG1, IgG2 (IgG2A, IgG2B), IgG3 and IgG4.

In some embodiments, the Fc domain comprises the Fc region of human IgG1, IgG2, IgG3, IgG4, or a combination or hybrid IgG. In some embodiments, the Fc domain is an IgG2 Fc region (such as a human IgG2 Fc region). In some embodiments, the Fc domain comprises an amino acid sequence of SEQ ID NO: 2. In some embodiments, the Fc domain is an IgG4 Fc region (such as a human IgG4 Fc region). In some embodiments, the Fc domain comprises an amino acid sequence of SEQ ID NO: 3.

Fc Region Variants

In some embodiments, one or more amino acid modifications may be introduced into the Fc region, thereby generating an Fc region variant. The Fc region variant may comprise a human Fc region sequence (e.g., a human IgG1, IgG2, IgG3 or IgG4 Fc region) comprising an amino acid modification (e.g. a substitution) at one or more amino acid positions.

In some embodiments, the FC domain possesses some but not all effector functions, which make it a desirable candidate for applications in which the half-life of the agent comprising IL-22 (such as IL-22 dimer) in vivo is important yet certain effector functions (such as complement and ADCC) are unnecessary or deleterious. In vitro and/or in vivo cytotoxicity assays can be conducted to confirm the reduction/depletion of CDC and/or ADCC activities. For example, Fc receptor (FcR) binding assays can be conducted to ensure that the agent comprising IL-22 (such as IL-22 dimer) lacks FcγR binding (hence likely lacking ADCC activity), but retains FcRn binding ability. The primary cells for mediating ADCC, NK cells, express FcγRIII only, whereas monocytes express FcγRI, FcγRII and FcγRIII. FcR expression on hematopoietic cells is summarized in Table 2 on page 464 of Ravetch and Kinet, *Annu. Rev. Immunol.* 9:457-492 (1991). Non-limiting examples of in vitro assays to assess ADCC activity of a molecule of interest is described in U.S. Pat. No. 5,500,362 (see, e.g. Hellstrom, I. et al. *Proc. Nat'l Acad. Sci. USA* 83:7059-7063 (1986)) and Hellstrom, I et al., *Proc. Nat'l Acad. Sci. USA* 82:1499-1502 (1985); 5,821,337 (see Bruggemann, M. et al., *J. Exp. Med.* 166:1351-1361 (1987)). Alternatively, non-radioactive assays methods may be employed (see, for example, ACTI™ non-radioactive cytotoxicity assay for flow cytometry (CellTechnology, Inc. Mountain View, CA; and Cyto-Tox 96® non-radioactive cytotoxicity assay (Promega, Madison, WI). Useful effector cells for such assays include peripheral blood mononuclear cells (PBMC) and Natural Killer (NK) cells. Alternatively, or additionally, ADCC activity of the molecule of interest may be assessed in vivo, e.g., in an animal model such as that disclosed in Clynes et al. *Proc. Nat'l Acad. Sci. USA* 95:652-656 (1998). C1q binding assays may also be carried out to confirm that the agent comprising IL-22 (such as IL-22 dimer) is unable to bind C1q and hence lacks CDC activity. See, e.g., C1q and C3c binding ELISA in WO 2006/029879 and WO 2005/100402. To assess complement activation, a CDC assay may be performed (see, for example, Gazzano-Santoro et al., *J. Immunol. Methods* 202:163 (1996); Cragg, M. S. et al., *Blood* 101:1045-1052 (2003); and Cragg, M. S. and M. J. Glennie, *Blood* 103:2738-2743 (2004)). FcRn binding and in vivo clearance/half-life determinations can also be performed using methods known in the art (see, e.g., Petkova, S. B. et al., *Int'l. Immunol.* 18 (12): 1759-1769 (2006)).

Fc region variants with reduced effector function include those with substitution of one or more of Fc region residues 238, 265, 269, 270, 297, 327 and 329 (U.S. Pat. No. 6,737,056). Such Fc mutants include Fc mutants with substitutions at two or more of amino acid positions 265, 269, 270, 297 and 327, including the so-called "DANA" Fc mutant with substitution of residues 265 and 297 to alanine (U.S. Pat. No. 7,332,581).

Certain Fc region variants with improved or diminished binding to FcRs are described. (See, e.g., U.S. Pat. No. 6,737,056; WO 2004/056312, and Shields et al., *J. Biol. Chem.* 9 (2): 6591-6604 (2001).)

In some embodiments, the FC domain is an IgG1 Fc region. In some embodiments, the IgG1 Fc fragment comprises a L234A mutation and/or a L235A mutation. In some embodiments, the Fc fragment is an IgG2 or IgG4 Fc fragment. In some embodiments, the Fc fragment is an IgG4 Fc fragment comprising a S228P, F234A, and/or a L235A mutation.

In some embodiments, the Fc domain comprises an Fc region with one or more amino acid substitutions which improve ADCC, e.g., substitutions at positions 298, 333, and/or 334 of the Fc region (EU numbering of residues).

In some embodiments, alterations are made in the Fc region that result in altered (i.e., either improved or diminished) C1q binding and/or Complement Dependent Cytotoxicity (CDC), e.g., as described in U.S. Pat. No. 6,194,551, WO 99/51642, and Idusogie et al. *J. Immunol.* 164:4178-4184 (2000).

In some embodiments, the Fc domain comprises a variant Fc region comprising one or more amino acid substitutions which alters half-life and/or changes binding to the neonatal Fc receptor (FcRn). Fc region variants with increased half-lives and improved binding to the neonatal Fc receptor (FcRn), which is responsible for the transfer of maternal IgGs to the fetus (Guyer et al., *J. Immunol.* 117:587 (1976) and Kim et al., *J. Immunol.* 24:249 (1994)), are described in US2005/0014934A1 (Hinton et al.). Those Fc regions have one or more substitutions therein which alters binding of the Fc region to FcRn. Such Fc region variants include those with substitutions at one or more of Fc region residues, e.g., substitution of Fc region residue 434 (U.S. Pat. No. 7,371, 826).

See also Duncan & Winter, *Nature* 322:738-40 (1988); U.S. Pat. Nos. 5,648,260; 5,624,821; and WO 94/29351 concerning other examples of Fc region variants.

Linkers

In some embodiments, the agent comprising an IL-22 domain (e.g., IL-22 dimer) described herein comprise one or more linkers (such as the linker between the IL-22 domain and dimerization domain). The length, the degree of flexibility and/or other properties of the linkers used in the agent comprising an IL-22 domain (e.g., IL-22 dimer) may have some influence on properties of the IL-22 domain or any other domains in the agent. For example, longer linkers may be selected to ensure that two adjacent domains do not sterically interfere with one another. In some embodiment, a linker (such as peptide linker) comprises flexible residues (such as glycine and serine) so that the adjacent domains are free to move relative to each other. For example, a glycine-serine doublet can be a suitable peptide linker. In some embodiments, the linker is a non-peptide linker. In some embodiments, the linker is a peptide linker.

Other linker considerations include the effect on physical or pharmacokinetic properties of the resulting compound, such as solubility, lipophilicity, hydrophilicity, hydrophobicity, stability (more or less stable as well as planned degradation), rigidity, flexibility, immunogenicity, modulation of agent binding, the ability to be incorporated into a micelle or liposome, and the like.

In some embodiments, the linker (or one or more of the linkers) is a peptide linker. In some embodiments, the linker (or one or more of the linkers) is a non-peptide linker.

Peptide Linkers

The peptide linker may have a naturally occurring sequence, or a non-naturally occurring sequence. For example, a sequence derived from the hinge region of heavy chain only antibodies may be used as the linker. See, for example, WO1996/34103.

The peptide linker can be of any suitable length. In some embodiments, the peptide linker is at least about any of 1, 2, 3, 4, 5, 6, 7, 8, 9, 10, 11, 12, 13, 14, 15, 16, 17, 18, 19, 20, 25, 30, 35, 40, 50, 75, 100 or more amino acids long. In some embodiments, the peptide linker is no more than about any of 100, 75, 50, 40, 35, 30, 25, 20, 19, 18, 17, 16, 15, 14, 13, 12, 11, 10, 9, 8, 7, 6, 5 or fewer amino acids long. In some embodiments, the length of the peptide linker is any of about 1 amino acid to about 10 amino acids, about 1 amino acid to about 20 amino acids, about 1 amino acid to about 30 amino acids, about 5 amino acids to about 15 amino acids, about 10 amino acids to about 25 amino acids, about 5 amino acids to about 30 amino acids, about 10 amino acids to about 30 amino acids long, about 30 amino acids to about 50 amino acids, about 50 amino acids to about 100 amino acids, or about 1 amino acid to about 100 amino acids.

An essential technical feature of such peptide linker is that said peptide linker does not comprise any polymerization activity. The characteristics of a peptide linker, which comprise the absence of the promotion of secondary structures, are known in the art and described, e.g., in Dall'Acqua et al. (Biochem. (1998) 37, 9266-9273), Cheadle et al. (Mol Immunol (1992) 29, 21-30) and Raag and Whitlow (FASEB (1995) 9 (1), 73-80). A particularly preferred amino acid in context of the "peptide linker" is Gly. Furthermore, peptide linkers that also do not promote any secondary structures are preferred. The linkage of the domains to each other can be provided by, e.g., genetic engineering. Methods for preparing fused and operatively linked agents such as those described in the present application and expressing them in mammalian cells or bacteria are well-known in the art (e.g. WO 99/54440, Ausubel, *Current Protocols in Molecular Biology*, Green Publishing Associates and Wiley Interscience, N. Y. 1989 and 1994 or Sambrook et al., *Molecular Cloning: A Laboratory Manual*, Cold Spring Harbor Laboratory Press, Cold Spring Harbor, N. Y., 2001).

The peptide linker can be a stable linker, which is not cleavable by proteases, especially by Matrix metalloproteinases (MMPs).

The linker can also be a flexible linker. Exemplary flexible linkers include glycine polymers $(G)_n$ (SEQ ID NO: 11), glycine-serine polymers (including, for example, $(GS)_n$ (SEQ ID NO: 12), $(GSGGS)_n$ (SEQ ID NO: 13), (GGGGS), (SEQ ID NO: 14), and $(GGGS)_n$ (SEQ ID NO: 15), where n is an integer of at least one), glycine-alanine polymers, alanine-serine polymers, and other flexible linkers known in the art. Glycine and glycine-serine polymers are relatively unstructured, and therefore may be able to serve as a neutral tether between components. Glycine accesses significantly more phi-psi space than even alanine, and is much less restricted than residues with longer side chains (see Scheraga, *Rev. Computational Chem.* 11 173-142 (1992)). The ordinarily skilled artisan will recognize that design of the agent (such as a IL-22 fusion protein, such as an IL-22 dimer) can include linkers that are all or partially flexible, such that the linker can include a flexible linker portion as well as one or more portions that confer less flexible structure to provide a desired agent structure.

Further, a linker may comprise, for example, the amino acid sequence of such as $(GGGGS)_n$ (SEQ ID NO: 16), wherein n is an integer between 1 and 8, e.g. (GGGGS) 3 (SEQ ID NO: 17; hereinafter referred to as "(G4S) 3" or "GS3"), or (GGGGS) 6 (SEQ ID NO: 18; hereinafter referred to as "(G4S) 6" or "GS6"). In some embodiments, the peptide linker comprise the amino acid sequence of $(GSTSGSGKPGSGEGS)_n$ (SEQ ID NO: 19), wherein n is an integer between 1 and 3.

Non-Peptide Linkers

Coupling of two moieties may be accomplished by any chemical reaction that will bind the two molecules so long as both components retain their respective activities. This linkage can include many chemical mechanisms, for instance covalent binding, affinity binding, intercalation, coordinate binding and complexation. In some embodiments, the binding is covalent binding. Covalent binding can be achieved either by direct condensation of existing side chains or by the incorporation of external bridging molecules. Many bivalent or polyvalent linking agents may be useful in coupling protein molecules in this context. For example, representative coupling agents can include organic compounds such as thioesters, carbodiimides, succinimide esters, diisocyanates, glutaraldehyde, diazobenzenes and hexamethylene diamines. This listing is not intended to be exhaustive of the various classes of coupling agents known in the art but, rather, is exemplary of the more common coupling agents (see Killen and Lindstrom, Jour. Immun. 133:1335-2549 (1984); Jansen et al., Immunological Reviews 62:185-216 (1982); and Vitetta et al., Science 238:1098 (1987)).

Linkers the can be applied in the present application are described in the literature (see, for example, Ramakrishnan, S. et al., *Cancer Res.* 44:201-208 (1984) describing use of MBS (M-maleimidobenzoyl-N-hydroxysuccinimide ester). In some embodiments, non-peptide linkers used herein include: (i) EDC (1-ethyl-3-(3-dimethylamino-propyl) carbodiimide hydrochloride; (ii) SMPT (4-succinimidyloxycarbonyl-alpha-methyl-alpha-(2-pridyl-dithio)-toluene (Pierce Chem. Co., Cat. (21558G); (iii) SPDP (succinimidyl-6 [3-(2-pyridyldithio) propionamido] hexanoate (Pierce Chem. Co., Cat #21651G); (iv) Sulfo-LC-SPDP (sulfosuccinimidyl 6 [3-(2-pyridyldithio)-propianamide] hexanoate (Pierce Chem. Co. Cat. #2165-G); and (v) sulfo-NHS (N-hydroxysulfo-succinimide: Pierce Chem. Co., Cat. #24510) conjugated to EDC.

The linkers described above contain components that have different attributes, thus may lead to the agents that comprise IL-22 (such as IL-22 fusion protein, IL-22 dimer) with differing physio-chemical properties. For example, sulfo-NHS esters of alkyl carboxylates are more stable than sulfo-NHS esters of aromatic carboxylates. NHS-ester containing linkers are less soluble than sulfo-NHS esters. Further, the linker SMPT contains a sterically hindered disulfide bond, and can form fusion protein with increased stability. Disulfide linkages, are in general, less stable than other linkages because the disulfide linkage is cleaved in vitro, resulting in less antibody fusion protein available. Sulfo-NHS, in particular, can enhance the stability of carbodimide couplings. Carbodimide couplings (such as EDC) when used in conjunction with sulfo-NHS, forms esters that are more resistant to hydrolysis than the carbodimide coupling reaction alone.

Immunosuppressive Therapy

The immunosuppressive therapy described in this application can be any immunosuppressive drugs in some embodiments is a corticosteroid drug.

In some embodiments, the corticosteroid drug is a systemic corticosteroid.

In some embodiments, the corticosteroid drug is administered at a frequency and dosage that is routinely or often used in treating GvHD. In some embodiments, the corticosteroid is administered daily. In some embodiments, the corticosteroid is administered weekly. In some embodiments, the corticosteroid is administered both during the cycle of administering the IL-22 (e.g., the IL-22 dimer) and the rest period.

In some embodiments, the corticosteroid drug is a prednisone or an equivalent. In some embodiments, the corticosteroid drug is selected from the group consisting of prednisone, bethamethasone, prednisolone, triamcinolone, methylprednisolone, and dexamethasone. In some embodiments, the corticosteroid drug is a prednisone. In some embodiments, the prednisone or the equivalent is administered (e.g., intravenously administered) at a dose of no more than about 2 mg/kg for a human being or a comparable dose for an individual who is not a human being. In some embodiments, the prednisone is administered daily.

In some embodiments, the prednisone or the equivalent (such as methylprednisolone) is administered at a dose of about 0.2 mg/kg/day to about 2 mg/kg/day (such as about 0.25 mg/kg/day to about 2 mg/kg/day, such as 0.5 mg/kg/day to about 2 mg/kg/day, such as 1 mg/kg/day to about 2 mg/kg/day) for a human being or a comparable dose for an individual who is not a human being. In some embodiments, the prednisone or the equivalent (such as methylprednisolone) is administered in divided doses.

In some embodiments, the prednisone or the equivalent (such as methylprednisolone) is administered at a dose of about 2 mg/kg/day for a human being or a comparable dose for an individual who is not a human being for at least one, two or three consecutive days after the first administration of the IL-22 dimer. In some embodiments, the prednisone or the equivalent (such as methylprednisolone) is administered at a dose of at least about 0.2 mg/kg/day (such as at least about 0.25 mg/kg/day) for a human being or a comparable dose for an individual who is not a human being for at least about one, two, three or four weeks after the first administration of the IL-22 dimer.

In some embodiments, the method further provides administering a second corticosteroid drug. In some embodiments, the second corticosteroid drug is a poorly absorbable corticosteroid (such as budesonide or beclomethasone). In some embodiments, the second corticosteroid drug is administered simultaneously with the prednisone or the equivalent (such as methylprednisolone).

GvHD

As used herein, the term "graft vs. host disease" or "GvHD" refers to a condition, including acute and chronic, resulting from transplanted (graft) cell effects on host cells and tissues resulting from GVH. In other words, donor immune cells infused within the graft or donor immune cells that develop from the stem cells, may see the patient's (host) cells as foreign and turn against them with an immune response. As examples, patients who have had a blood or marrow transplant from someone else are at risk of having acute GvHD. Even donors who are HLA-matched with the recipient can cause GvHD because the donor cells can potentially also make an immune response against minor antigen differences in the recipient.

Acute graft-versus-host disease (aGvHD) is specifically a disorder caused by donor immune cells in patients who have had an allogeneic marrow or blood cell transplantation. The most commonly affected tissues are skin intestine and liver. In severe cases, GvHD can cause blistering in the skin or excessive diarrhea and wasting. Also, inflammation caused by donor immune cells in the liver can cause obstruction that causes jaundice. Other tissues such as lung and thymus may also become affected. The diagnosis is usually confirmed by looking at a small piece of skin, liver, stomach or intestine with a microscope for observation of specific inflammatory characteristics. In severe cases, the liver does not function properly to eliminate waste products from the body. Acute GvHD usually begins during the first 3 months after the transplant. In some cases, it can persist, come back or begin more than 3 months after the transplant. In some embodiments, prednisone and/or other immunosuppressive medications are used to treat acute graft-versus-host disease. In some embodiments, other immunosuppressive medications are used if treatment with prednisone is not successful, even though a large proportion of patients is refractory to immunosuppressive medication and die.

Patients who have had acute GvHD and survive have a greater risk of developing chronic GvHD. Older patients, patients who received a peripheral blood (instead of bone marrow) transplant, and patients who had a mismatched or unrelated donor have a greater risk of chronic GvHD. Chronic GvHD usually begins later after transplant and lasts longer than acute GvHD. Patients with Chronic GvHD may present with a wide variety of symptoms. Skin rash and/or mouth sores are among the most common initial signs of the disease. Unlike acute GvHD, chronic GvHD can cause damage in the glands that produce tears in the eyes and saliva in the mouth resulting in dry eyes or a dry mouth. Patients may have mouth ulcers causing pain while eating, skin rashes, or liver inflammation. Chronic GvHD can also cause many other problems. One such problem is formation of scar tissue in the skin (cutaneous sclerosis) and joints. Another such problem is chronic damage to air passages in the lungs (bronchiolitis obliterans syndrome). Prednisone or other similar antiinflammatory or immunosuppressive medications are used to treat chronic graft-versus-host disease. Other immunosuppressive medications can be used if treatment with prednisone is not successful. Just as in acute GvHD a large proportion of patients is not cured from chronic GvHD.

In some embodiments, the GvHD is acute GvHD (aGvHD). In some embodiments, the acute GvHD is newly diagnosed acute GvHD. In some embodiments, the acute GvHD is classic acute GvHD. In some embodiments, the acute GvHD is persistant, recurrant or late onset acute GvHD.

In some embodiments, the GvHD is chronic GvHD. In some embodiments, the chronic GvHD is classic chronic GvHD.

In some embodiments, the GvHD is an "acute on chronic" GvHD (i.e., with overlap syndrome).

In some embodiments, the GvHD is a gastrointestinal GvHD (GI GvHD). In some embodiments, the GI GvHD is lower GI GvHD. In some embodiments, the GI GvHD is upper GI GvHD. In some embodiments, the GI GvHD (such as lower GI GvHD) is selected from the group consisting of Grade II, Grade III and Grade IV lower GI GvHD. In some embodiments, the grading of GvHD (such as aGvHD) is based on International Bone Marrow Transplant Registry (IBMTR) criteria.

Patient Population

In some embodiments, the individual is a mammal. In some embodiments, the individual is a human.

In some embodiments, the individual has acute GvHD (aGvHD) (such as newly diagnosed acute GvHD, such as classic acute GvHD, such as persistant, recurrant or late onset acute GvHD.)

In some embodiments, the individual has chronic GvHD (such as classic chronic GvHD).

In some embodiments, the individual has "acute on chronic" GvHD (i.e., with overlap syndrome).

In some embodiments, the individual has gastrointestinal GvHD (GI GvHD). In some embodiments, the individual has lower GI GvHD. In some embodiments, the individual has upper GI GvHD. In some embodiments, the individual has GI GvHD (such as lower GI GvHD) selected from the group consisting of Grade II, Grade III and Grade IV lower GI GvHD.

In some embodiments, the individual is female. In some embodiments, the individual is male.

In some embodiments, the individual does not have an infection at the time of initiating the treatment and/or during the treatment. In some embodiments, the individual has an infection at the time of initiation of the treatment and/or during the treatment. In some embodiments, the infection is a CMV infection.

In some embodiments, the individual has not been subject to a corticosteroid therapy for the GvHD (such as aGvHD) prior to the treatment. In some embodiments, the individual has not been subject to a corticosteroid therapy for the GvHD (such as aGvHD) prior to the treatment for more than about 14, 10, 7, 6, 5, 4, 3, 2, or 1 day.

In some embodiments, the individual has an Ann Arbor score of 3, 2, and/or 1 prior to the treatment. In some embodiments, the individual has an Ann Arbor score of 3. In some embodiments, the individual has an Ann Arbor score of 2. In some embodiments, the individual has an Ann Arbor score of 1.

In some embodiments, the fecal microbiota of the individual is characterized with a PC2 score of no more than 0.5 (for example, no more than 0.45, 0.4, 0.35, 0.3, 0.25, 0.2, 0.15, 0.1, 0.05, 0) based upon analysis of bacterial 16S rRNA sequencing of the fecal sample.

In some embodiments, the individual has a gut microbiota profile characterized with enriched Lachnospiraceae and/or Ruminococcaceae. See, for example, Oki et al. *BMC Microbiology* (2016) 16:284. In some embodiments, the individual has a gut microbiota profile characterized with enriched Lachnospiraceae. In some embodiments, the individual has a gut microbiota profile characterized with abundant Lachnospiraceae to an extent of about 50%, 60%, 70%, 80%, 90%, 100%, 110%, 120%, 130%, 140% or 150% as a healthy individual (or average of healthy individuals) of the same race/ethnicity and/or in the same region. In some embodiments, the individual has a gut microbiota profile characterized with enriched Ruminococcaceae. In some embodiments, the individual has a gut microbiota profile characterized with abundant Ruminococcaceae to an extent of about 50%, 60%, 70%, 80%, 90%, 100%, 110%, 120%, 130%, 140% or 150% as a healthy individual (or average of healthy individuals) of the same race/ethnicity and/or in the same region.

In some embodiments, the individual is resistant to a prior therapy (such as an immunosuppressive therapy).

Gut Microbiota

In some embodiments, the abundance of the gut microbiota composition in the individual is increased after the treatment. For example, in some embodiments, the abundance of the gut microbiota composition is increased by at least about 10%, 20%, 30%, 40%, 50%, 60%, 70%, 80%, 90% as compared to the abundance before treatment. The abundance of the gut microbiota composition can be assessed as a whole or on a specific bacterial family. For example, the abundance of the gut microbiota composition can be assessed for Prevotellaceae, Bacteroidaceae, Lachnospiraceae, Ruminococcaceae, and/or Bifidobacteriaceae.

In some embodiments, the diversity of the gut microbiota composition in the individual is increased after the treatment. For example, in some embodiments, the diversity of the gut microbiota composition is increased by at least about 10%, 20%, 30%, 40%, 50%, 60%, 70%, 80%, 90% as compared to the diversity before treatment. The diversity of the gut microbiota composition can be assessed as a whole or on a specific bacterial family. For example, the diversity of the gut microbiota composition can be assessed for Prevotellaceae, Bacteroidaceae, Lachnospiraceae, Ruminococcaceae, and/or Bifidobacteriaceae.

The abundance and/or diversity of the gut microbiota can be characterized by assessing the fetal microbiota of the individual. For example, the abundance and/or diversity of the gut microbiota composition can be assessed based upon analysis of bacterial 16S rRNA sequencing of the fecal sample.

Dosing and Method of Administering

The dose of the agent that comprises an IL-22 domain (such as an IL-22 dimer) administered to an individual (e.g., a human) in methods described herein may vary with the particular agent, the method of administration, and the type and stage of the GvHD being treated. The amount should be sufficient to produce a desirable response, such as a therapeutic or prophylactic response against GvHD. In some embodiments, the amount of the agent that comprises an IL-22 domain (such as an IL-22 dimer) in the composition is below the level that induces an intolerable toxicological when the agent is administered to the individual according to any of the methods described herein.

In some embodiments, the amount of the agent that comprises an IL-22 domain (such as the IL-22 dimer described herein) for each administration is about 1 µg/kg to about 1 mg/kg (such as about 2 µg/kg to about 500 µg/kg, such as about 2 µg/kg to about 250 µg/kg, such as about 2 µg/kg to about 200 µg/kg, such as about 2 µg/kg to about 100 µg/kg, such as about 2 µg/kg to about 50 µg/kg) for a human being or a comparable dose for an individual who is not a human being. In some embodiments, the amount of the IL-22 dimer for each administration is about 2 µg/kg to about 200 µg/kg for a human being or a comparable dose for an individual who is not a human being. In some embodiments, the amount of the IL-22 dimer for each administration is about 5 µg/kg to about 80 µg/kg, or about 10 µg/kg to about 45 µg/kg (e.g., about 10 µg/kg, 30 µg/kg, or 45 µg/kg) for a human being or a comparable dose for an individual who is not a human being. In some embodiments, the agent is an IL-22 dimer and the amount of the IL-22 dimer for each administration is about 45 µg/kg for a human being or a comparable dose for an individual who is not a human being. The comparable dose for an individual that is not a human can be calculated, for example, based upon guidance provided in Nair, A. B., & Jacob, S. (2016). A simple practice guide for dose conversion between animals and human. *Journal of basic and clinical pharmacy, 7* (2), 27.

In some embodiments, the agent that comprises an IL-22 domain (such as the IL-22 dimer described herein) is administered at least at a frequency that is about once every one to three times of its serum half-life (such as about twice of its serum half-life). For examples, if the agent has a serum half-life of about 24 hours. Exemplary frequencies include at least about once a day, once every two days, or once every three days. In some embodiments, the agent (such as the IL-22 dimer) is administered at least about or about weekly (for example, daily, weekly, or once every two, three, four, five or six days). In some embodiments, the agent (such as the IL-22 dimer) is administered no more than about once every two days (such as no more than about once every three, four, five, six days, or weekly, or bi-weekly).

In some embodiments, the agent that comprises an IL-22 domain (such as the IL-22 dimer described herein) is administered for a period of at least about or about one, two, three or four weeks at a frequency described herein (such as weekly). In some embodiments the agent (such as the IL-22 dimer) is administered for a period of no more than about six months, five months, four months, three months, two months, one month, or four weeks at a frequency described herein (such as weekly).

In some embodiments, the agent that comprises an IL-22 domain (such as the IL-22 dimer described herein) is administered for at least two cycles, wherein each of the at least two cycles comprises administering the agent (such as the IL-22 dimer described herein) at a frequency described herein (such as weekly) for at least about two weeks (such as about four weeks). In some embodiments, two consecutive cycles of the at least two cycles are separated by a rest period of at least about or about one week (such as at least about or about two, three, or four weeks). In some embodiments, at least one (such as two, three, four or more) of the at least two cycles comprises administering the IL-22 dimer no more than about six months, five months, four months, three months, two months, one month, or four weeks at a frequency described herein (such as weekly). In some embodiments, each of the at least two cycles comprises administering the IL-22 dimer no more than about six months, five months, four months, three months, two months, one month, or four weeks at a frequency described herein (such as weekly). In some embodiments, the rest period between two consecutive cycles varies. In some embodiments, the rest period between two consecutive cycles remains same.

Agents that comprises an IL-22 domain (such as IL-22 dimer as described herein) or suppressive agents described herein can be administered to an individual (such as a human) via various routes, including, for example, intravenous, intra-arterial, intraperitoneal, intrapulmonary, oral, inhalation, intravesicular, intramuscular, intra-tracheal, subcutaneous, intraocular, intrathecal, transmucosal, and transdermal. In some embodiments, the agent that comprises an IL-22 domain (such as IL-22 dimer) and/or the suppressive agent are administered intravenously.

Benefits from using agents comprising IL-22 and methods described herein include prophylactic protection and disease recovery of cells from GVHD including but not limited to cells of the small intestine, large intestine and liver. See WO2015070077, which is incorporated herein by its entirety.

In some embodiments, the number of ISC or Paneth cells are increased after treatment. In some embodiments, the number of ISC or Paneth cells are increased by at least about 5%, 10%, 15%, 20%, 25%, 30%, 35%, 40%, 45%, or 50% after treatment. Number of ISC or Paneth cells can be indicated by measuring the GI expression of molecules involved with ISC and Paneth cell function and kinetics of epithelial renewal. For example, individuals can be evaluated for the kinetics of epithelial regeneration from Lgr5+ cells in both the small and LI, and specific attention will be paid in the SI to the kinetics of Paneth cell renewal. In addition, RNA and protein expression of ISC genes (e.g., Lgr5, BMI-1, Hopx, mTert, Lrig1), Paneth cell genes involved with ISC function (e.g., Wnt3, EGF) by quantitative (q) PCR and western blot in samples from individuals.

In some embodiments, GI epithelial renewal is promoted (such as increased by at least about 5%, 10%, 15%, 20%, 25%, 30%, 35%, 40%, 45%, or 50%) after treatment. Evaluating GI epithelial renewal after treatment with may be done by evaluating for damage to the ISC compartment in individuals. For example, Lgr5 expression as a marker of ISCs supported by the in vivo and ex vivo stem cell function of Lgr5+ cells. An alternative approach to stem cell phenotyping such as assessment of CD44+CD166 CD24" cells. Paneth cells make up the ISC niche in the small intestine (SI) but are largely absent in the large intestine (LI), where Wnt signals are thought to be provided to the ISCs by niche-supporting kit+ cells. In some embodiments, Paneth cells in the SI are measured to evaluate GI epithelial renewal. In some embodiments, cKit+LI niche cells are measured to evaluate GI epithelial renewal.

Methods of Identifying or Selecting an Individual for Treatment

The present application also provides a method of selecting or identifying an individual having GvHD for treatment as described herein.

In some embodiments, there is provided a method of identifying/selecting an individual for a treatment of graft verse host disease (GvHD) in the individual comprising: a) evaluating intestinal microbiome in the individual; and b) selecting an individual for treatment based upon: i) the individual has a gut microbiota profile characterized with enriched Lachnospiraceae and/or Ruminococcaceae; ii) the fecal microbiota of the individual is characterized with a PC2 score of no more than 0.5 (for example, no more than 0.45, 0.4, 0.35, 0.3, 0.25, 0.2, 0.15, 0.1, 0.05, 0) based upon analysis of bacterial 16S rRNA sequencing of the fecal sample; or iii) the individual has an Ann Arbor score of 3, wherein the treatment comprises: i) an effective amount of an IL-22 dimer comprising two monomeric subunits, wherein each monomeric subunit comprises an IL-22 domain and an Fc domain; and ii) an immunosuppressive therapy. In some embodiments, the fecal microbiota of the individual prior to the treatment is characterized with a PC2 score of no more than 0 based upon analysis of bacterial 16S rRNA sequencing of the fecal sample.

In some embodiments, there is provided a method of selecting or identifying an individual having GvHD for treatment with an agent described herein (such as an IL-22 dimer), wherein the method comprises: assessing Ann Arbor score, and selecting or recommending the individual for treatment based upon the Ann Arbor score. In some embodiments, the method comprises selecting or recommending the individual for treatment when the individual has an Ann Arbor score of 3. In some embodiments, the method comprises selecting or recommending the individual for treatment when the individual has an Ann Arbor score of 2. In some embodiments, the method comprises selecting or recommending the individual for treatment when the individual has an Ann Arbor score of 1. In some embodiments, the method further comprises administering an effective amount of an IL-22 dimer comprising two monomeric subunits to the selected individual, wherein each monomeric subunit comprises an IL-22 domain and an Fc domain.

In some embodiments, there is provided a method of selecting or identifying an individual having GvHD for treatment with an agent described herein (such as an IL-22 dimer), wherein the method comprises: assessing the diversity and/or abundance of the gut microbiota in the individual, and selecting or recommending the individual for treatment based upon the diversity and/or abundance of gut microbiota. In some embodiments, the method comprises selecting or recommending an individual for treatment based upon the fecal microbiota of the individual having a PC2 score of no more than 0.5 (for example, no more than 0.45, 0.4, 0.35, 0.3, 0.25, 0.2, 0.15, 0.1, 0.05, 0) based upon analysis of bacterial 16S rRNA sequencing of the fecal sample. In some embodiments, the method further comprises administering an effective amount of an IL-22 dimer comprising two monomeric subunits to the selected individual, wherein each monomeric subunit comprises an IL-22 domain and an Fc domain.

In some embodiments, there is provided a method of selecting or identifying an individual having GvHD for treatment with an agent described herein (such as an IL-22 dimer), wherein the method comprises: assessing gut microbiota profile in the individual, and selecting or recommending the individual for treatment based upon a gut microbiota profile characterized with enriched Lachnospiraceae and/or Ruminococcaceae in gut microbiota in the individual. In some embodiments, the individual has a gut microbiota profile characterized with enriched Lachnospiraceae. In some embodiments, the individual has a gut microbiota profile characterized with abundant Lachnospiraceae to an extent of about 50%, 60%, 70%, 80%, 90%, 100%, 110%, 120%, 130%, 140% or 150% as a healthy individual (or average of healthy individuals) of the same race/ethnicity and/or in the same region. In some embodiments, the individual has a gut microbiota profile characterized with enriched Ruminococcaceae. In some embodiments, the individual has a gut microbiota profile characterized with abundant Ruminococcaceae to an extent of about 50%, 60%, 70%, 80%, 90%, 100%, 110%, 120%, 130%, 140% or 150% as a healthy individual (or average of healthy individuals) of the same race/ethnicity and/or in the same region. In some embodiments, the method further comprises administering an effective amount of an IL-22 dimer comprising two monomeric subunits to the selected individual, wherein each monomeric subunit comprises an IL-22 domain and an Fc domain.

In some embodiments, the method comprises administering an agent comprising IL-22 (such as an IL-22 dimer as described herein) for at least two cycles, wherein each of the at least two cycles comprises administering the IL-22 dimer at least about once a week for a period of at least two weeks, wherein two consecutive cycles of the at least two cycles are separated by a rest period of at least about one week. In some embodiments, the IL-22 domain comprises a recombinant IL-22. In some embodiments, said recombinant IL-22 is a human IL-22. In some embodiments, the IL-22 dimer comprises the amino acid sequence of any one of SEQ ID NOS: 6-9. In some embodiments, the IL-22 dimer comprises the amino acid sequence of SEQ ID NO: 6. In some embodiment, the amount of the IL-22 dimer for each administration is about 1 µg/kg to about 500 µg/kg for a human being or a comparable dose for an individual who is not a human being. In some embodiments, the amount of the IL-22 dimer for each administration is about 45 µg/kg for a human being or a comparable dose for an individual who is not a human being. In some embodiments, the IL-22 dimer is administered intravenously.

Kits, Medicines and Compositions

The present application also provides kits, medicines, compositions, and unit dosage forms for use in any of the methods described herein.

In some embodiments, there is provided a kit comprising (a) an effective amount of IL-22 (such as an IL-22 dimer comprising two monomeric subunits, wherein each monomeric subunit comprises an IL-22 domain and an Fc domain); and b) an immunosuppressive therapy (such as an immunosuppressive agent, such as a corticosteroid, such as a systemic corticosteroid). In some embodiments, the kit further comprises instructions for use in accordance with any of the methods described herein. In some embodiments, the instructions comprise information relating to dosage and/or dosing schedule of administration for the intended treatment. In some embodiments the instructions provide that the IL-22 (e.g., the IL-22 dimer described herein) is administered for at least two cycles, wherein each of the at least two cycles comprises administering the IL-22 for a period of at least two weeks (e.g., for a period of at least four weeks), wherein two consecutive cycles of the at least two cycles are separated by a rest period of at least about one week (e.g., a rest period of at least about two weeks, three weeks, or four weeks) . . . . The IL-22 and the immunosuppressive therapy can be present in separate containers or in a single container. For example, the kit may comprise one distinct composition or two or more compositions wherein one composition comprises IL-22 (such as IL-22 dimer) and one composition comprises the immunosuppressive therapy (such as a corticosteroid).

In some embodiments, the kit further comprises an agent for assessing the Ann Arbor score of the individual. In some embodiments, the kit further comprises an agent for assessing the diversity and/or abundance of the gut microbiota in the individual. In some embodiments, the kit further comprises an agent for assessing the composition of Lachnospiraceae and/or Ruminococcaceae in gut microbiota in the individual. In some embodiments, the kit further comprises an agent for assessing presence of an infection (such as an active infection that is deemed as uncontrolled infection, such as a CMV infection) in the individual.

The kits of the invention are in suitable packaging. Suitable packaging include, but is not limited to, vials, bottles, jars, flexible packaging (e.g., seled Mylar or plastic bags), and the like. Kits may optionally provide additional components such as buffers and interpretative information. The present application thus also provides articles of manufacture, which include vials (such as sealed vials), bottles, jars, flexible packaging, and the like.

The kit described herein may further comprise instructions that include descriptions of selecting an individual suitable or treatment. In some embodiments, the instructions provide that the individual has an Ann Arbor score of 3, 2, and/or 1 prior to the treatment. In some embodiments, the instructions provide that, prior to the treatment: a) the fecal microbiota of the individual is characterized with a PC2 score of no more than 0.5 (such as no more than 0) based upon analysis of bacterial 16S rRNA sequencing of the fecal sample; and/or ii) the individual has a gut microbiota profile characterized with enriched Lachnospiraceae and Ruminococcaceae. In some embodiments, the instructions provide that the individual has an infection.

Instructions supplied in the kits of the invention are typically written instructions on a label or package insert (e.g., a paper sheet included in the kit), but machine-readable instructions (e.g., instructions carried on a magnetic or optical storage disk) are also acceptable.

The instructions generally also include information as to other aspects such as route of administration for the intended treatment. For example, kits may be provided that contain sufficient dosages of the IL-22 (such as IL-22 dimer) and/or the immunosuppressive therapy (such as a corticosteroid) as disclosed herein to provide effective treatment of an individual for any period of time, such as any of about 1, 2, 3, 4, 5, 6, or 7 days, or about 1, 2, 3, 4, 5, or 6 week, or about 1, 2, 3, 4, 5, 6, 7, 8, 9, 10, 11, or 12 months, or 1, 2, 3, 4, 5, 6 years. Kits may also include multiple unit doses of IL-22 (such as IL-22 dimer) and/or the immunosuppressive therapy (such as a corticosteroid) and pharmaceutical compositions and instructions for use and packaged in quantities sufficient for storage and use in pharmacies, for example, hospital pharmacies and compounding pharmacies.

Also provided are medicines, compositions, and unit dosage forms useful for the methods described herein. In some embodiments, there is provided a medicine (or composition) for use in treating GvHD comprising (a) an effective amount of IL-22 (such as an IL-22 dimer comprising two monomeric subunits, wherein each monomeric subunit comprises an IL-22 domain and an Fc domain); and b) an immunosuppressive therapy (such as an immunosuppressive agent, such as a corticosteroid, such as a systemic corticosteroid).

Exemplary Embodiment

Embodiment 1. A method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, wherein the IL-22 dimer is administered for at least two cycles, wherein each of the at least two cycles comprises administering the IL-22 dimer for a period of at least two weeks, wherein two consecutive cycles of the at least two cycles are separated by a rest period of at least about one week.

Embodiment 2. The method of embodiment 1, wherein the IL-22 dimer is administered at a frequency of at least about once a week during each of the at least two cycles.

Embodiment 3. The method of embodiment 1 or embodiment 2, wherein at least one of the at least two cycles comprises administering the IL-22 dimer at least about once a week for at least about four weeks.

Embodiment 4. The method of embodiment 3, wherein each of the at least two cycles comprises administering the IL-22 dimer at least once a week for at least about four weeks.

Embodiment 5. The method of any one of embodiments 1-4, wherein at least one of the at least two cycles comprises administering the IL-22 dimer no more than about three months.

Embodiment 6. The method of embodiment 5, wherein each of the at least two cycles comprises administering the IL-22 dimer no more than about three months.

Embodiment 7. The method of any one of embodiments 1-6, wherein the rest period is about one to four weeks.

Embodiment 8. The method of any one of embodiments 1-6, wherein the rest period is at least about four weeks.

Embodiment 9. The method of embodiment 8, wherein the rest period is no more than three months.

Embodiment 10. The method of any one of embodiments 1-9, wherein the individual has an Ann Arbor score of 1, 2, and/or 3.

Embodiment 11. The method of any one of embodiments 1-10, wherein: a) the fecal microbiota of the individual prior to the treatment is characterized with a PC2 score of no more than 0.5 based upon analysis of bacterial 16S rRNA sequencing of the fecal sample; or b) the individual has a gut microbiota profile characterized with enriched Lachnospiraceae and Ruminococcaceae.

Embodiment 12. A method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, wherein the individual has an Ann Arbor score of 3 prior to the treatment.

Embodiment 13. The method of embodiment 12, wherein the method further comprises assessing Ann Arbor score of the individual.

Embodiment 14. The method of embodiment 12 or embodiment 13, wherein the method further comprises selecting the individual for the treatment based upon the individual having an Ann Arbor score of 3.

Embodiment 15. A method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, and wherein prior to the treatment: i) the fecal microbiota of the individual is characterized with a PC2 score of no more than 0.5 based upon analysis of bacterial 16S rRNA sequencing of the fecal sample; or ii) the individual has a gut microbiota profile characterized with enriched Lachnospiraceae and Ruminococcaceae.

Embodiment 16. The method of embodiment 15, wherein the method further comprises assessing bacterial 16s rRNA gene sequence in fecal sample of the individual.

Embodiment 17. The method of embodiment 15 or embodiment 16, wherein the method further comprises selecting the individual for the treatment based upon the fecal microbiota of the individual having a PC2 score of no more than 0.5 based upon analysis of bacterial 16S rRNA sequencing of the fecal sample.

Embodiment 18. A method of treating graft versus host disease (GvHD) in an individual, comprising administering to the individual: a) an effective amount of an IL-22 dimer comprising two monomeric subunits, wherein each monomeric subunit comprises an IL-22 domain and an Fc domain; and b) an immunosuppressive therapy, wherein the individual has an infection.

Embodiment 19. The method of embodiment 18, wherein the immunosuppressive therapy comprises a corticosteroid, wherein the corticosteroid is optionally contraindicated for the individual.

Embodiment 20. A method of identifying/selecting an individual for a treatment of graft verse host disease (GvHD) in the individual comprising: a) evaluating intestinal microbiome in the individual; and b) selecting an individual for treatment based upon: i) the individual has a gut microbiota profile characterized with enriched Lachnospiraceae and/or Ruminococcaceae; ii) the fecal microbiota of the individual is characterized with a PC2 score of no more than 0.5 based upon analysis of bacterial 16S rRNA sequencing of the fecal sample; or iii) the individual has an Ann Arbor score of 3, wherein the treatment comprises: i) an effective amount of an IL-22 dimer comprising two monomeric subunits, wherein each monomeric subunit comprises an IL-22 domain and an Fc domain; and ii) an immunosuppressive therapy.

Embodiment 21. The method of embodiment 20, wherein the fecal microbiota of the individual prior to the treatment is characterized with a PC2 score of no more than 0 based upon analysis of bacterial 16S rRNA sequencing of the fecal sample.

Embodiment 22. The method of any one of embodiments 12-21, wherein the method of any one of embodiments 1-19 or the treatment of embodiment 20 or 21 comprises administering the IL-22 dimer for at least two cycles, wherein each of the at least two cycles comprises administering the IL-22 dimer at least about once a week for a period of at least two weeks, wherein two consecutive cycles of the at least two cycles are separated by a rest period of at least about one week.

Embodiment 23. The method of any one of embodiments 1-22, wherein the IL-22 domain comprises a recombinant IL-22.

Embodiment 24. The method of embodiment 23, wherein said recombinant IL-22 is a human IL-22.

Embodiment 25. The method of any one of embodiments 1-24, wherein the IL-22 dimer comprises the amino acid sequence of any one of SEQ ID NOS: 6-9.

Embodiment 26. The method of any one of embodiments 1-25, wherein the IL-22 dimer comprises the amino acid sequence of SEQ ID NO: 6.

Embodiment 27. The method of any one of embodiments 1-26, wherein the amount of the IL-22 dimer for each administration is about 1 µg/kg to about 500 µg/kg for a human being or a comparable dose for an individual who is not a human being.

Embodiment 28. The method of embodiment 27, wherein the amount of the IL-22 dimer for each administration is about 2 µg/kg to about 200 µg/kg for a human being or a comparable dose for an individual who is not a human being.

Embodiment 29. The method of embodiment 28, wherein the amount of the IL-22 dimer for each administration is about 5 µg/kg to about 80 µg/kg for a human being or a comparable dose for an individual who is not a human being.

Embodiment 30. The method of embodiment 29, wherein the amount of the IL-22 dimer for each administration is about 10 µg/kg to about 45 µg/kg (such as about 10 µg/kg, about 30 µg/kg, or about 45 µg/kg) for a human being or a comparable dose for an individual who is not a human being.

Embodiment 31. The method of any one of embodiments 1-30, wherein the IL-22 dimer is administered intravenously.

Embodiment 32. The method of any one of embodiments 1-31, wherein the GvHD is acute GvHD.

Embodiment 33. The method of any one of embodiments 1-32, wherein the GvHD is a gastrointestinal GvHD (GI GvHD).

Embodiment 34. The method of embodiment 33, wherein the GI GvHD is lower GI GvHD.

Embodiment 35. The method of embodiment 34, wherein the lower GI GvHD is selected from the group consisting of Grade II, Grade III and Grade IV lower GI GvHD.

Embodiment 36. The method of any one of embodiments 1-35, wherein the individual has not been subject to corticosteroid for GvHD for a period of three or more days prior to the treatment.

Embodiment 37. The method of any one of embodiments 1-36, wherein the individual does not have an ongoing Cytomegalovirus (CMV) infection immediately prior to the treatment.

Embodiment 38. The method of any one of embodiments 1-37, wherein the individual is a human.

Embodiment 39. The method of any one of embodiments 1-38, wherein the immunosuppressive therapy comprises a corticosteroid drug.

Embodiment 40. The method of embodiment 39, wherein the corticosteroid drug is a systemic corticosteroid.

Embodiment 41. The method of embodiment 39 or embodiment 40, wherein the corticosteroid drug is a prednisone.

Embodiment 42. The method of embodiment 41, wherein the prednisone is administered at a dose of no more than about 2 mg/kg for a human being or a comparable dose for an individual who is not a human being.

Embodiment 43. The method of any one of embodiments 39-42, wherein the corticosteroid drug is administered daily.

EXAMPLES

The examples below are intended to be purely exemplary of the invention and should therefore not be considered to limit the invention in any way. The following examples and detailed description are offered by way of illustration and not by way of limitation.

Example 1. a Phase 2 Study of F-652, a Novel Tissue-Targeted Recombinant Human Interleukin-22 (IL-22) Dimer, for Treatment of Newly Diagnosed Acute Lower GI GvHD F-652 is recombinant IL-22 dimer consisting of two monomeric subunits each comprising a sequence shown in SEQ ID NO: 6. In this study, it was tested if the addition of F-652 to corticosteroids could promote healing of GI tract injury and improve treatment response in patients with lower GI aGvHD.

A 27-patient open-label, single-cohort, multicenter prospective phase 2 study was conducted. Eligible patients were ≥18 years old and had new onset biopsy-proven grade II-IV lower GI aGvHD following an allo-HCT. Patients were treated with four weekly doses of F-652, a recombinant human IL-22 dimer/Fc fusion molecule at a dose of 45 µg/kg intravenously, in combination with standard corticosteroid treatment. Patients were administered the third and fourth doses only after demonstrating a treatment response to the first two doses. Primary endpoints included PK, safety, and day 28 lower GI aGvHD response. Additional endpoints included day 56 treatment response, evaluation of changes in gut microbiota by 16S sequencing, and plasma GvHD biomarkers. The study was powered to distinguish between an unpromising response rate of 35% and a promising response rate of 60%.

The 27 patients (median age 55 years, mostly PBSC recipients) had predominantly stage 2-4 lower GI GvHD (17/27, 63%), with 6/27 (22%) patients having stage 3 and 6/27 (22%) patients having stage 4 disease. All patients had detectable F-652 levels and measurement of CRP levels in a subset of patients confirmed in vivo biologic activity.

Figure 2:
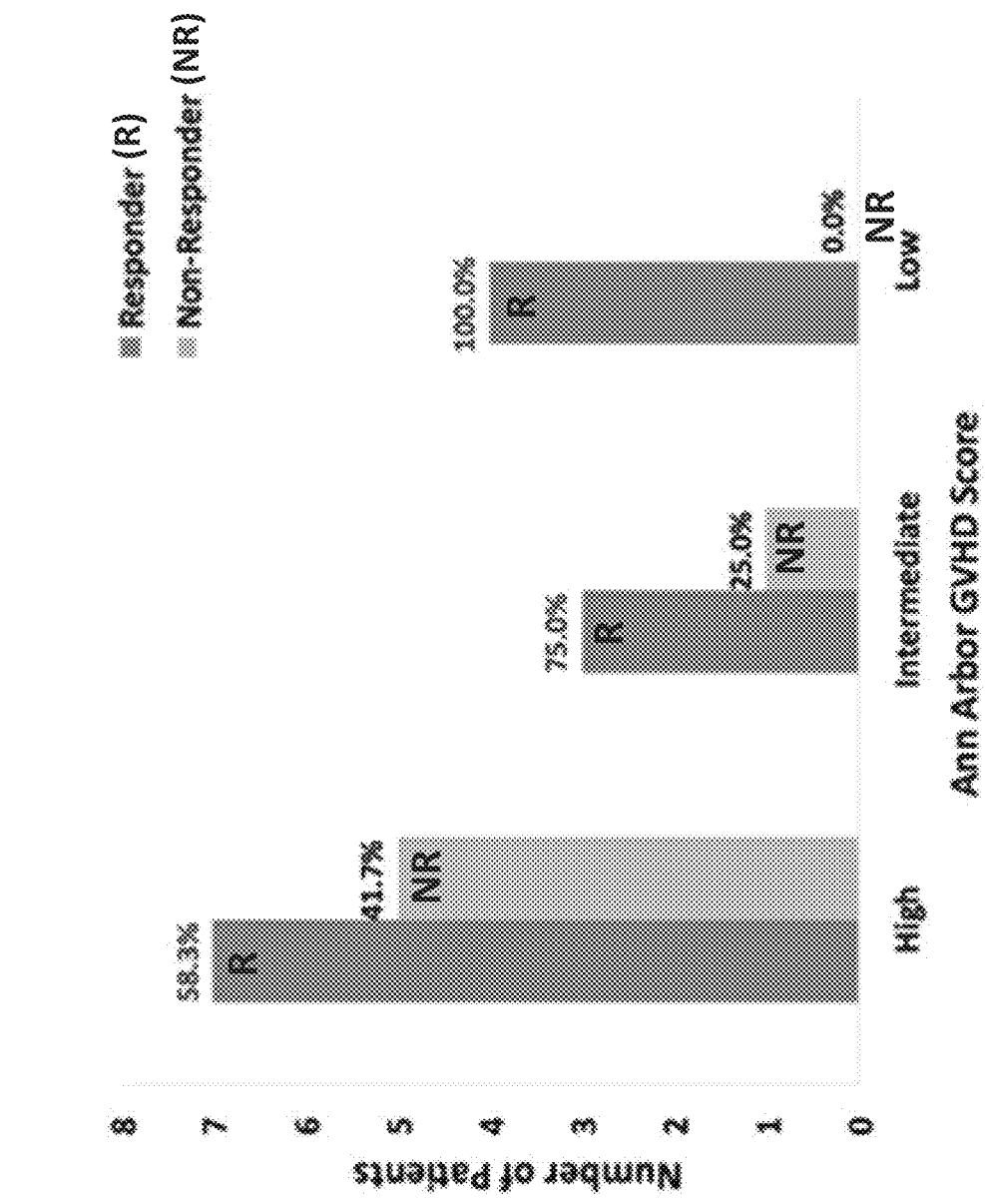
FIG. 2 depicts response rates in patients with high, intermediate, or low Ann Arbor GvHD score (i.e., the score of 3, 2, or 1).
Figure 3A:
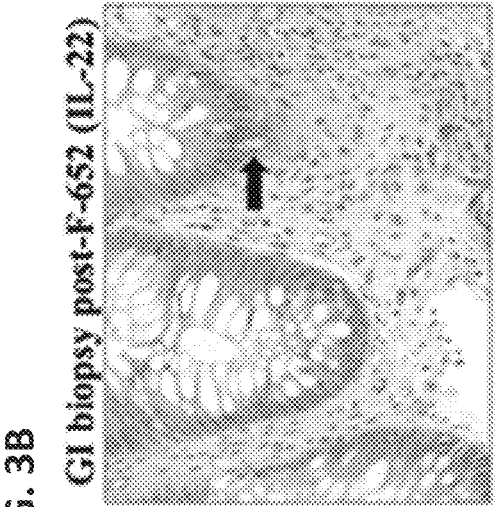
FIGS. 3A-3B depict H&E stained histopathologic assessment performed at the onset of aGvHD (pre-treatment) and after IL-22 treatment.
Figure 3B:
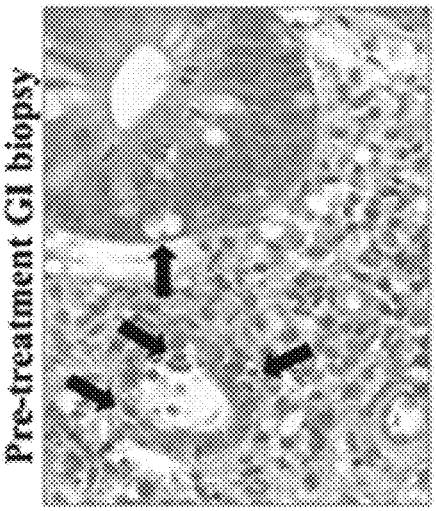
Figure 4A:
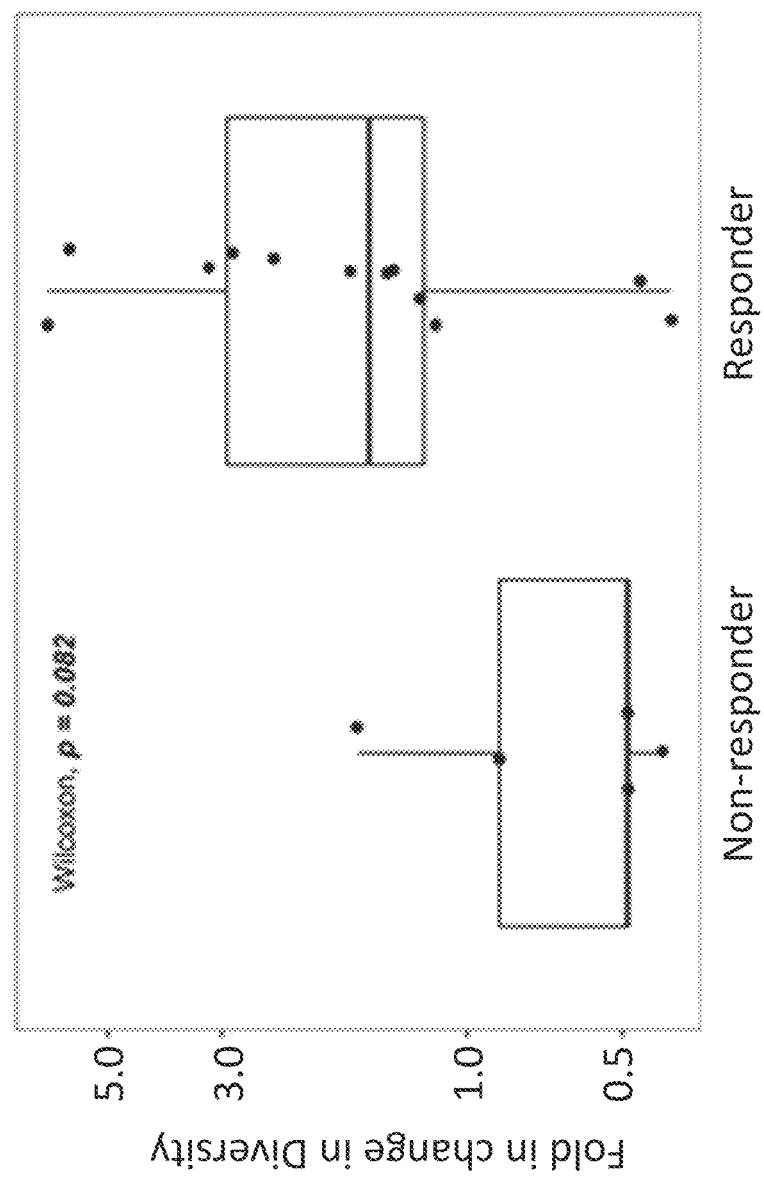
FIGS. 4A-4B depict intestinal microbiota diversity according to treatment response (n=17) (FIG. 4A) and relative abundance of Genus Blautia according to treatment response (n=17) (FIG. 4B).
Figure 4B:
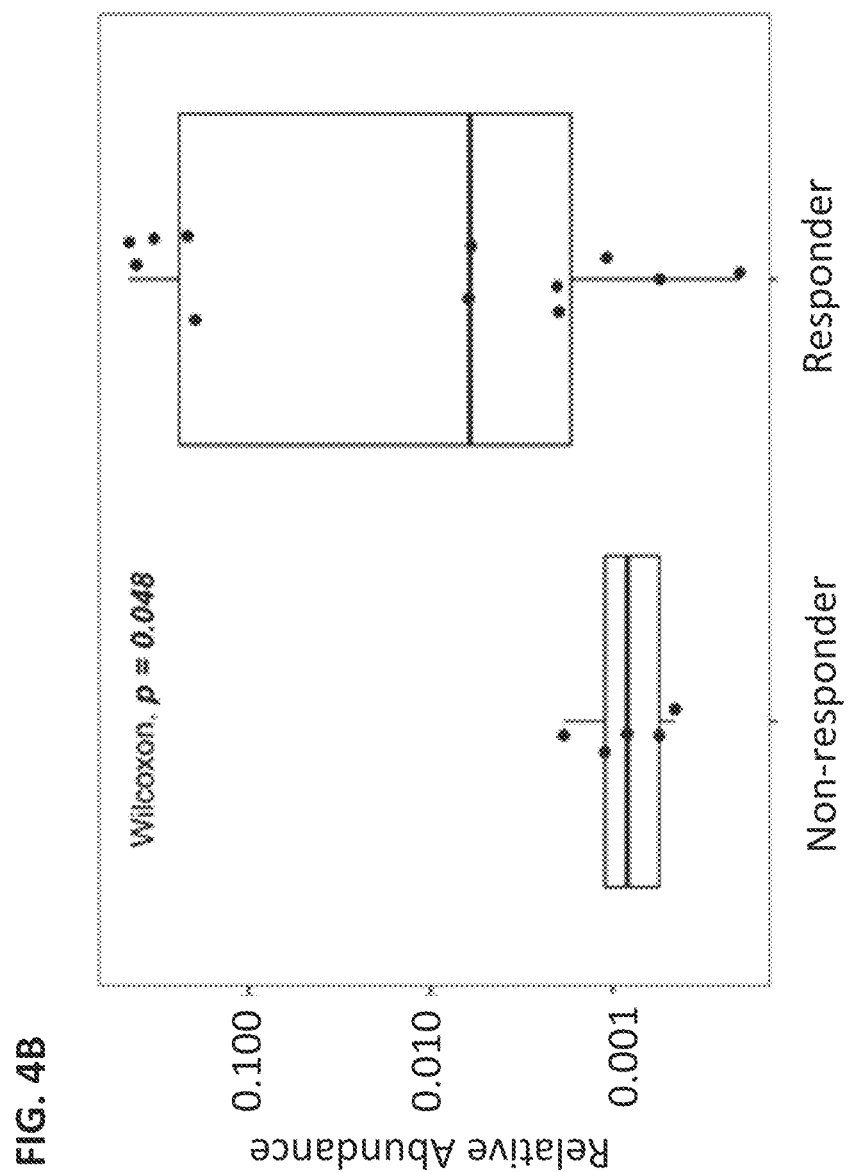

Overall, 19 out of 27 patients achieved a day 28 response (70%, 90% CI: 56-79). See FIG. 1. Response to treatment based on Ann Arbor Risk, evaluable in 20 patients, was 7/12 (58%) with high, 3/4 (75%) with intermediate, and 4/4 (100%) with low risk biomarkers. See FIG. 2. Surprisingly, at day 56, the majority (sixteen) patients remained treatment responders (59%, 90% CI: 45-69). See FIG. 1. Three patients had repeat GI biopsy after treatment and demonstrated improvement in GI epithelial injury. See FIGS. 3A-3B. Additionally, in a subset of 17 patients with evaluable stool samples, microbial diversity and the relative abundance of commensal Blautia were higher in patients with a clinical response to F-652 (p=0.082 and 0.048, respectively.). See FIGS. 4A-4B.

Figure 5A:
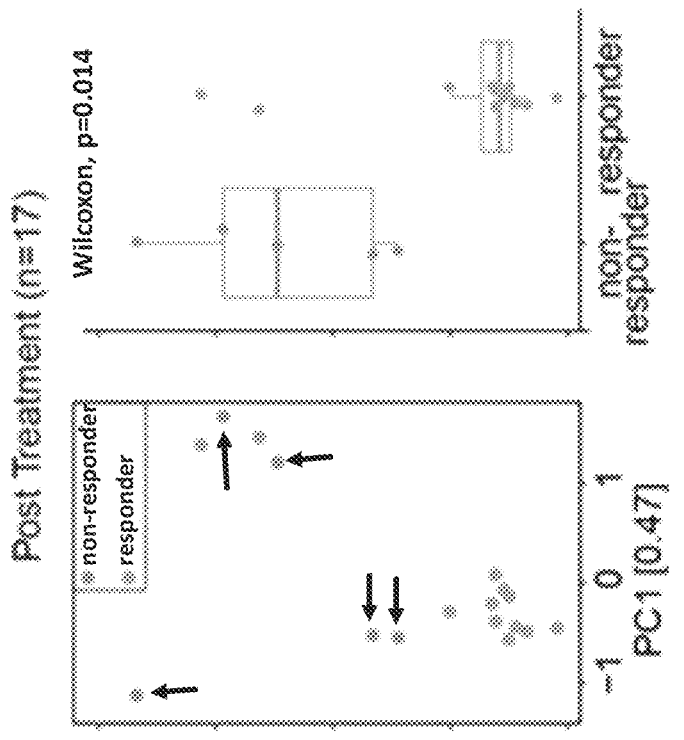
FIGS. 5A-5B depict principal analysis of 16S-sequenced Bray-Curtis distances of fecal samples collected at baseline (FIG. 5A) and peri-day 28 (post-treatment, FIG. 5B). Post-treatment samples from responding patients are segregated along PC2, indicating a global difference in microbiota composition.
Figure 5B:
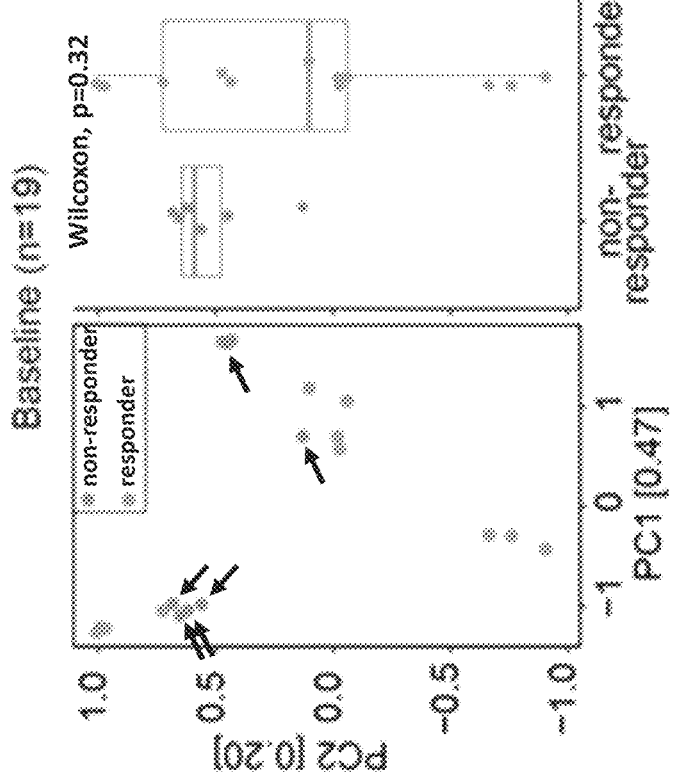

Principal component analysis (PCA) demonstrated that baseline microbiota composition was similar among patients (n=19 patients) whereas the global microbiota composition was significantly different between responders and non-responders (n=17 patients, p=0.01). See FIGS. 5A-5B. Specifically, at the baseline, about 82% of the responders had a PC2 value that is lower than 0.5, and 100% of the responders had a PC2 value that is lower than 0. No such trend is shown in a similar PC1 analysis. See Tables 1 and 2.

TABLE 1

|  | Responders (%) | Non-responders (%) |
|---|---|---|
| Cut-off: PC2 = 0.5 | | |
| PC2 < 0.5 | 9/11 (81.8%) | 2/11 (18.2%) |
| PC2 > 0.5 | 4/8 (50%) | 4/8 (50%) |
| Cut-off: PC2 = 0 | | |
| PC2 < 0 | 6/6 (100%) | 0/6 (0%) |
| PC2 > 0 | 7/13 (53.8%) | 6/13 (46.2%) |

TABLE 2

|  | Responders (%) | Non-responders (%) |
|---|---|---|
| Cut-off: PC1 = 1 | | |
| PC1 < 1 | 9/14 (64.3%) | 5/14 (35.7%) |
| PC1 > 1 | 4/5 (80%) | 1/5 (20%) |
| Cut-off: PC1 = 0 | | |
| PC1 < 0 | 7/11 (63.6%) | 4/11 (36.4%) |
| PC1 > 0 | 6/8 (75%) | 2/8 (25%) |
| Cut-off: PC1 = −1 | | |
| PC1 < −1 | 4/8 (50%) | 4/8 (50%) |
| PC1 > −1 | 7/9 (77.8%) | 2/9 (22.2%) |

Serious TEAEs were observed in 11 patients (40%) including enterocolitis (n=1), pyrexia (n=1), infection (2 sepsis, 1 device-related, 1 pneumonia, 1 sinusitis), musculoskeletal (n=2), and respiratory (n=1). One patient was diagnosed with squamous cell carcinoma 8 months after F-652 treatment.

SEQUENCE TABLE

| SEQ ID NO | Description | Amino acid sequence |
|---|---|---|
| 1. | IL-22 | APISSHCRLDKSNFQQPYITNRTFMLAKEASLADNNTDVRLIGEKLFHGVSMSERCYLMKQVLNFTLEEVLFPQSDRFQPYMQEVVPFLARLSNRLSTCHIEGDDLHIQRNVQKLKDTVKKLGESGEIKAIGELDLLFMSLRNACI |
| 2. | IgG2 Fc | VECPPCPAPPVAGPSVFLFPPKPKDTLMISRTPEVTCVVVDVSHEDPEVQFNWYVDGVEVHNAKTKPREEQFNSTFRVVSVLTVVHQDWLNGKEYKCKVSNKGLPASIEKHSKTKGQPREPQVYTLPPSREEMTKNQVSLTCLVKGFYPSDIAVEWESNGQPENNYKTTPPMLDSDGSFFLYSKLTVDKSRWQQGNVFSCSVMHEALHNHYTQKSLSLSPGK |
| 3. | IgG2 Fc | ERKCCVECPPCPAPPVAGPSVFLFPPKPKDTLMISRTPEVTCVVVDVSHEDPEVQFNWYVDGVEVHNAKTKPREEQFNSTFRVVSVLTVVHQDWLNGKEYKCKVSNKGLPAPIEKTISKTKGQPREPQVYTLPPSREEMTKNQVSLTCLVKGFYPSDISVEWESNGQPENNYKTTPPMLDSDGSFFLYSKLTVDKSRWQQGNVFSCSVMHEALHNHYTQKSLSLSPGK |
| 4. | Peptide linker | GSGGGSGGGGSGGGGS |
| 5. | Peptide linker | ASTKGP |
| 6. | IL22-linker-IgG2 Fc | APISSHCRLDKSNFQQPYITNRTFMLAKEASLADNNTDVRLIGEKLFHGVSMSERCYLMKQVLNFTLEEVLFPQSDRFQPYMQEVVPFLARLSNRLSTCHIEGDDLHIQRNVQKLKDTVKKLGESGEIKAIGELDLLFMSLRNACIGSGGGSGGGGSGGGGSVECPPCPAPPVAGPSVFLFPPKPKDTLMISRTPEVTCVVVDVSHEDPEVQFNWYVDGVEVHNAKTKPREEQFNSTFRVVSVLTVVHQDWLNGKEYKCKVSNKGLPASIEKTISKTKGQPREPQVYTLPPSREEMTKNQVSLTCLVKGFYPSDIAVEWESNGQPENNYKTTPPMLDSDGSFFLYSKLTVDKSRWQQGNVFSCSVMHEALHNHYTQKSLSLSPGK |
| 7. | IL-22-linker-IgG2 Fc | APISSHCRLDKSNFQQPYITNRTFMLAKEASLADNNTDVRLIGEKLFHGVSMSERCYLMKQVLNFTLEEVLFPQSDRFQPYMQEVVPFLARLSNRLSTCHIEGDDLHIQRNVQKLKDTVKKLGESGEIKAIGELDLLFMSLRNACIASTKGPVECPPCPAPPVAGPSVFLFPPKPKDTLMISRTPEVTCVVVDVSHEDPEVQFNWYVDGVEVHNAKTKPREEQFNSTFRVVSVLTVVHQDWLNGKEYKCKVSNKGLPASIEKTISKTKGQPREPQVYTLPPSREEMTKNQVSLTCLVKGFYPSDIAVEWESNGQPENNYKTTPPMLDSDGSFFLYSKLTVDKSRWQQGNVFSCSVMHEALHNHYTQKSLSLSPGK |
| 8. | IgG2 Fc-linker-IL-22 | VECPPCPAPPVAGPSVFLFPPKPKDTLMISRTPEVTCVVVDVSHEDPEVQFNWYVDGVEVHNAKTKPREEQFNSTFRVVSVLTVVHQDWLNGKEYKCKVSNKGLPASIEKHSKTKGQPREPQVYTLPPSREEMTKNQVSLTCLVKGFYPSDIAVEWESNGQPENNYKTTPPMLDSDGSFFLYSKLTVDKSRWQQGNVFSCSVMHEALHNHYTQKSLSLSPGKGSGGGSGGGGSGGGGSAPISSHCRLDKSNFQQPYITNRTFMLAKEASLADNNTDVRLIGEKLFHGVSMSERCYLMKQVLNFTLEEVLFPQSDRFQPYMQEVVPFLARLSNRLSTCHIEGDDLHIQRNVQKLKDTVKKLGESGEIKAIGELDLLFMSLRNACI |
| 9. | IgG2 Fc-linker-IL-22 | VECPPCPAPPVAGPSVFLFPPKPKDTLMISRTPEVTCVVVDVSHEDPEVQFNWYVDGVEVHNAKTKPREEQFNSTFRVVSVLTVVHQDWLNGKEYKCKVSNKGLPASIEKHSKTKGQPREPQVYTLPPSREEMTKNQVSLTCLVKGFYPSDIAVEWESNGQPENNYKTTPPMLDSDGSFFLYSKLTVDKSRWQQGNVFSCSVMHEALHNHYTQKSLSLSPGKASTKGPAPISSHCRLDKSNFQQPYITNRTFMLAKEASLADNNTDVRLIGEKLFHGVSMSERCYLMKQVLNFTLEEVLFPQSDRFQPYMQEVVPFLARLSNRLSTCHIEGDDLHIQRNVQKLKDTVKKLGESGEIKAIGELDLLFMSLRNACI |
| 10. | IL-22-linker-IL-22 | APISSHCRLDKSNFQQPYITNRTFMLAKEASLADNNTDVRLIGEKLFHGVSMSERCYLMKQVLNFTLEEVLFPQSDRFQPYMQEVVPFLARLSNRLSTCHIEGDDLHIQRNVQKLKDTVKKLGESGEIKAIGELDLLFMSLRNACIGSGGGSGGGGSGGGGSAPISSHCRLDKSNFQQPYITNRTFMLAKEASLADNNTDVRLIGEKLFHGVSMSERCYLMKQVLNFTLEEVLFPQSDRFQPYMQEVVPFLARLSNRLSTCHIEGDDLHIQRNVQKLKDTVKKLGESGEIKAIGELDLLFMSLRNACI |

SEQUENCE TABLE-continued

| SEQ ID NO | Description | Amino acid sequence |
|---|---|---|
| 11. | Peptide linker | $(G)_n$, n >= 1 |
| 12. | Peptide linker | $(GS)_n$, n >= 1 |
| 13. | Peptide linker | $(GSGGS)_n$, n >= 1 |
| 14. | Peptide linker | $(GGGGS)_n$, n >= 1 |
| 15. | Peptide linker | $(GGGS)_n$, n >= 1 |
| 16. | Peptide linker | $(GGGGS)_n$, n is an integer between 1 and 8 |
| 17. | Peptide linker | $(GGGGS)_3$ |
| 18. | Peptide linker | $(GGGGS)_6$ |
| 19. | Peptide linker | $(GSTSGSGKPGSGEGS)_n$, n is between 1 and 3 |

The invention claimed is:

1. A method of treating graft versus host disease (GvHD) in an individual, comprising:
   (a) selecting an individual for treatment based upon the individual having an Ann Arbor score of 3, 2, or 1; and
   (b) administering to the selected individual: (1) an effective amount of an IL-22 dimer comprising two monomeric subunits, wherein each monomeric subunit comprises an IL-22 domain and an Fc domain; and (2) an immunosuppressive therapy.

2. The method of claim 1, wherein each monomeric subunit of the IL-22 dimer comprises the amino acid sequence of any one of SEQ ID NOs: 6-9.

3. The method of claim 1, wherein the effective amount of the IL-22 dimer for each administration for a human, or a comparable dose for an individual who is not a human, is
   (i) 1 µg/kg to 500 µg/kg;
   (ii) 2 µg/kg to 200 µg/kg;
   (iii) 5 µg/kg to about 80 µg/kg; or
   (iv) 10 µg/kg to about 45 µg/kg.

4. The method of claim 1, wherein the administering in step (b) comprises administering the IL-22 dimer intravenously.

5. The method of claim 1, wherein the GvHD is acute GvHD.

6. The method of claim 1, wherein the GvHD is a gastrointestinal GvHD (GI GvHD).

7. The method of claim 6, wherein the GI GvHD is lower GI GvHD.

8. The method of claim 1, wherein the immunosuppressive therapy comprises a corticosteroid drug.

9. The method of claim 8, wherein the corticosteroid drug is selected from the group consisting of prednisone, betamethasone, prednisolone, triamcinolone, methylprednisolone, and dexamethasone.

10. The method of claim 1, wherein the IL-22 dimer is administered at least once a week for at least four weeks.

11. The method of claim 1, wherein the abundance of Lachnospiraceae and/or Ruminococcaceae in the individual is increased after the treatment by at least 10%.

12. The method of claim 2, wherein each monomeric subunit of the IL-22 dimer comprises the amino acid sequence of SEQ ID NO: 6.

13. The method of claim 1, wherein the method comprises selecting an individual for treatment based upon the individual having an Ann Arbor score of 3.

14. The method of claim 8, wherein the corticosteroid drug is administered to the individual at a dose of 0.2 mg/kg to 2 mg/kg for a human, or a comparable dose for an individual who is not a human.

15. The method of claim 8, wherein:
   (i) the corticosteroid drug is administered orally or intravenously; and/or
   (ii) the corticosteroid drug is administered daily.

16. The method of claim 8, wherein the individual is a human, wherein:
  (i) the IL-22 dimer is intravenously administered to the individual once a week for at least four weeks, and wherein the amount of the IL-22 dimer for each administration is 2 µg/kg to 200 µg/kg; and
  (ii) the corticosteroid drug is orally or intravenously administered to the individual at a dose of 0.25 mg/kg to 2 mg/kg daily for at least four weeks starting from the first administration of the IL-22 dimer.

17. The method of claim 16, wherein each monomeric subunit of the IL-22 dimer comprises the amino acid sequence of SEQ ID NO: 6.

18. The method of claim 17, wherein the GvHD is a lower GI acute GvHD.

19. The method of claim 1, wherein the GvHD is following allogeneic hematopoietic/stem cell transplantation (allo-HCT).

20. The method of claim 16, wherein the corticosteroid drug is selected from the group consisting of prednisone, betamethasone, prednisolone, triamcinolone, methylprednisolone, and dexamethasone.

\* \* \* \* \*

SEQUENCE LISTING

<160> NUMBER OF SEQ ID NOS: 19

<210> SEQ ID NO 1
<211> LENGTH: 146
<212> TYPE: PRT
<213> ORGANISM: Artificial Sequence
<220> FEATURE:
<223> OTHER INFORMATION: Synthetic Construct

<400> SEQUENCE: 1

Ala Pro Ile Ser Ser His Cys Arg Leu Asp Lys Ser Asn Phe Gln Gln
1               5                   10                  15

Pro Tyr Ile Thr Asn Arg Thr Phe Met Leu Ala Lys Glu Ala Ser Leu
            20                  25                  30

Ala Asp Asn Asn Thr Asp Val Arg Leu Ile Gly Glu Lys Leu Phe His
        35                  40                  45

Gly Val Ser Met Ser Glu Arg Cys Tyr Leu Met Lys Gln Val Leu Asn
    50                  55                  60

Phe Thr Leu Glu Glu Val Leu Phe Pro Gln Ser Asp Arg Phe Gln Pro
65                  70                  75                  80

Tyr Met Gln Glu Val Val Pro Phe Leu Ala Arg Leu Ser Asn Arg Leu
                85                  90                  95

Ser Thr Cys His Ile Glu Gly Asp Asp Leu His Ile Gln Arg Asn Val
            100                 105                 110

Gln Lys Leu Lys Asp Thr Val Lys Lys Leu Gly Glu Ser Gly Glu Ile
        115                 120                 125

Lys Ala Ile Gly Glu Leu Asp Leu Leu Phe Met Ser Leu Arg Asn Ala
    130                 135                 140

Cys Ile
145

<210> SEQ ID NO 2
<211> LENGTH: 223
<212> TYPE: PRT
<213> ORGANISM: Artificial Sequence
<220> FEATURE:
<223> OTHER INFORMATION: Synthetic Construct

<400> SEQUENCE: 2

Val Glu Cys Pro Pro Cys Pro Ala Pro Pro Val Ala Gly Pro Ser Val

```
              1               5                  10                 15
            Phe Leu Phe Pro Pro Lys Pro Lys Asp Thr Leu Met Ile Ser Arg Thr
                          20                 25                 30

Pro Glu Val Thr Cys Val Val Asp Val Ser His Glu Asp Pro Glu
                      35                 40                 45

Val Gln Phe Asn Trp Tyr Val Asp Gly Val Glu Val His Asn Ala Lys
                50                 55                 60

Thr Lys Pro Arg Glu Glu Gln Phe Asn Ser Thr Phe Arg Val Val Ser
             65                 70                 75                 80

Val Leu Thr Val Val His Gln Asp Trp Leu Asn Gly Lys Glu Tyr Lys
                              85                 90                 95

Cys Lys Val Ser Asn Lys Gly Leu Pro Ala Ser Ile Glu Lys Thr Ile
                          100                105                110

Ser Lys Thr Lys Gly Gln Pro Arg Glu Pro Gln Val Tyr Thr Leu Pro
                          115                120                125

Pro Ser Arg Glu Glu Met Thr Lys Asn Gln Val Ser Leu Thr Cys Leu
            130                135                140

Val Lys Gly Phe Tyr Pro Ser Asp Ile Ala Val Glu Trp Glu Ser Asn
            145                150                155                160

Gly Gln Pro Glu Asn Asn Tyr Lys Thr Thr Pro Pro Met Leu Asp Ser
                              165                170                175

Asp Gly Ser Phe Phe Leu Tyr Ser Lys Leu Thr Val Asp Lys Ser Arg
                          180                185                190

Trp Gln Gln Gly Asn Val Phe Ser Cys Ser Val Met His Glu Ala Leu
                          195                200                205

His Asn His Tyr Thr Gln Lys Ser Leu Ser Leu Ser Pro Gly Lys
                          210                215                220

<210> SEQ ID NO 3
<211> LENGTH: 228
<212> TYPE: PRT
<213> ORGANISM: Artificial Sequence
<220> FEATURE:
<223> OTHER INFORMATION: Synthetic Construct

<400> SEQUENCE: 3

Glu Arg Lys Cys Cys Val Glu Cys Pro Pro Cys Pro Ala Pro Pro Val
            1               5                  10                 15

Ala Gly Pro Ser Val Phe Leu Phe Pro Pro Lys Pro Lys Asp Thr Leu
                          20                 25                 30

Met Ile Ser Arg Thr Pro Glu Val Thr Cys Val Val Asp Val Ser
                          35                 40                 45

His Glu Asp Pro Glu Val Gln Phe Asn Trp Tyr Val Asp Gly Val Glu
                50                 55                 60

Val His Asn Ala Lys Thr Lys Pro Arg Glu Glu Gln Phe Asn Ser Thr
             65                 70                 75                 80

Phe Arg Val Val Ser Val Leu Thr Val Val His Gln Asp Trp Leu Asn
                              85                 90                 95

Gly Lys Glu Tyr Lys Cys Lys Val Ser Asn Lys Gly Leu Pro Ala Pro
                          100                105                110

Ile Glu Lys Thr Ile Ser Lys Thr Lys Gly Gln Pro Arg Glu Pro Gln
                          115                120                125

Val Tyr Thr Leu Pro Pro Ser Arg Glu Glu Met Thr Lys Asn Gln Val
            130                135                140

Ser Leu Thr Cys Leu Val Lys Gly Phe Tyr Pro Ser Asp Ile Ser Val
```

```
                145                 150                 155                 160
Glu Trp Glu Ser Asn Gly Gln Pro Glu Asn Asn Tyr Lys Thr Thr Pro
                    165                 170                 175

Pro Met Leu Asp Ser Asp Gly Ser Phe Phe Leu Tyr Ser Lys Leu Thr
                180                 185                 190

Val Asp Lys Ser Arg Trp Gln Gln Gly Asn Val Phe Ser Cys Ser Val
            195                 200                 205

Met His Glu Ala Leu His Asn His Tyr Thr Gln Lys Ser Leu Ser Leu
    210                 215                 220

Ser Pro Gly Lys
225

<210> SEQ ID NO 4
<211> LENGTH: 16
<212> TYPE: PRT
<213> ORGANISM: Artificial Sequence
<220> FEATURE:
<223> OTHER INFORMATION: Synthetic Construct

<400> SEQUENCE: 4

Gly Ser Gly Gly Gly Ser Gly Gly Gly Ser Gly Gly Gly Ser
1               5                   10                  15

<210> SEQ ID NO 5
<211> LENGTH: 6
<212> TYPE: PRT
<213> ORGANISM: Artificial Sequence
<220> FEATURE:
<223> OTHER INFORMATION: Synthetic Construct

<400> SEQUENCE: 5

Ala Ser Thr Lys Gly Pro
1               5

<210> SEQ ID NO 6
<211> LENGTH: 385
<212> TYPE: PRT
<213> ORGANISM: Artificial Sequence
<220> FEATURE:
<223> OTHER INFORMATION: Synthetic Construct

<400> SEQUENCE: 6

Ala Pro Ile Ser Ser His Cys Arg Leu Asp Lys Ser Asn Phe Gln Gln
1               5                   10                  15

Pro Tyr Ile Thr Asn Arg Thr Phe Met Leu Ala Lys Glu Ala Ser Leu
                20                  25                  30

Ala Asp Asn Asn Thr Asp Val Arg Leu Ile Gly Glu Lys Leu Phe His
            35                  40                  45

Gly Val Ser Met Ser Glu Arg Cys Tyr Leu Met Lys Gln Val Leu Asn
        50                  55                  60

Phe Thr Leu Glu Glu Val Leu Phe Pro Gln Ser Asp Arg Phe Gln Pro
65                  70                  75                  80

Tyr Met Gln Glu Val Val Pro Phe Leu Ala Arg Leu Ser Asn Arg Leu
                85                  90                  95

Ser Thr Cys His Ile Glu Gly Asp Asp Leu His Ile Gln Arg Asn Val
                100                 105                 110

Gln Lys Leu Lys Asp Thr Val Lys Lys Leu Gly Glu Ser Gly Glu Ile
            115                 120                 125

Lys Ala Ile Gly Glu Leu Asp Leu Leu Phe Met Ser Leu Arg Asn Ala
        130                 135                 140
```

Cys Ile Gly Ser Gly Gly Ser Gly Gly Gly Ser Gly Gly Gly
145                 150                 155                 160

Gly Ser Val Glu Cys Pro Pro Cys Pro Ala Pro Pro Val Ala Gly Pro
            165                 170                 175

Ser Val Phe Leu Phe Pro Pro Lys Pro Lys Asp Thr Leu Met Ile Ser
        180                 185                 190

Arg Thr Pro Glu Val Thr Cys Val Val Val Asp Val Ser His Glu Asp
            195                 200                 205

Pro Glu Val Gln Phe Asn Trp Tyr Val Asp Gly Val Glu Val His Asn
    210                 215                 220

Ala Lys Thr Lys Pro Arg Glu Glu Gln Phe Asn Ser Thr Phe Arg Val
225                 230                 235                 240

Val Ser Val Leu Thr Val Val His Gln Asp Trp Leu Asn Gly Lys Glu
                245                 250                 255

Tyr Lys Cys Lys Val Ser Asn Lys Gly Leu Pro Ala Ser Ile Glu Lys
            260                 265                 270

Thr Ile Ser Lys Thr Lys Gly Gln Pro Arg Glu Pro Gln Val Tyr Thr
        275                 280                 285

Leu Pro Pro Ser Arg Glu Glu Met Thr Lys Asn Gln Val Ser Leu Thr
    290                 295                 300

Cys Leu Val Lys Gly Phe Tyr Pro Ser Asp Ile Ala Val Glu Trp Glu
305                 310                 315                 320

Ser Asn Gly Gln Pro Glu Asn Asn Tyr Lys Thr Thr Pro Pro Met Leu
                325                 330                 335

Asp Ser Asp Gly Ser Phe Phe Leu Tyr Ser Lys Leu Thr Val Asp Lys
            340                 345                 350

Ser Arg Trp Gln Gln Gly Asn Val Phe Ser Cys Ser Val Met His Glu
        355                 360                 365

Ala Leu His Asn His Tyr Thr Gln Lys Ser Leu Ser Leu Ser Pro Gly
    370                 375                 380

Lys
385

<210> SEQ ID NO 7
<211> LENGTH: 375
<212> TYPE: PRT
<213> ORGANISM: Artificial Sequence
<220> FEATURE:
<223> OTHER INFORMATION: Synthetic Construct

<400> SEQUENCE: 7

Ala Pro Ile Ser Ser His Cys Arg Leu Asp Lys Ser Asn Phe Gln Gln
1               5                   10                  15

Pro Tyr Ile Thr Asn Arg Thr Phe Met Leu Ala Lys Glu Ala Ser Leu
            20                  25                  30

Ala Asp Asn Asn Thr Asp Val Arg Leu Ile Gly Glu Lys Leu Phe His
        35                  40                  45

Gly Val Ser Met Ser Glu Arg Cys Tyr Leu Met Lys Gln Val Leu Asn
    50                  55                  60

Phe Thr Leu Glu Glu Val Leu Phe Pro Gln Ser Asp Arg Phe Gln Pro
65                  70                  75                  80

Tyr Met Gln Glu Val Val Pro Phe Leu Ala Arg Leu Ser Asn Arg Leu
                85                  90                  95

Ser Thr Cys His Ile Glu Gly Asp Asp Leu His Ile Gln Arg Asn Val
            100                 105                 110

-continued

Gln Lys Leu Lys Asp Thr Val Lys Leu Gly Glu Ser Gly Glu Ile
         115                 120                 125

Lys Ala Ile Gly Glu Leu Asp Leu Leu Phe Met Ser Leu Arg Asn Ala
130                 135                 140

Cys Ile Ala Ser Thr Lys Gly Pro Val Glu Cys Pro Pro Cys Pro Ala
145                 150                 155                 160

Pro Pro Val Ala Gly Pro Ser Val Phe Leu Phe Pro Pro Lys Pro Lys
             165                 170                 175

Asp Thr Leu Met Ile Ser Arg Thr Pro Glu Val Thr Cys Val Val Val
             180                 185                 190

Asp Val Ser His Glu Asp Pro Glu Val Gln Phe Asn Trp Tyr Val Asp
             195                 200                 205

Gly Val Glu Val His Asn Ala Lys Thr Lys Pro Arg Glu Glu Gln Phe
             210                 215                 220

Asn Ser Thr Phe Arg Val Val Ser Val Leu Thr Val Val His Gln Asp
225                 230                 235                 240

Trp Leu Asn Gly Lys Glu Tyr Lys Cys Lys Val Ser Asn Lys Gly Leu
             245                 250                 255

Pro Ala Ser Ile Glu Lys Thr Ile Ser Lys Thr Lys Gly Gln Pro Arg
             260                 265                 270

Glu Pro Gln Val Tyr Thr Leu Pro Pro Ser Arg Glu Glu Met Thr Lys
             275                 280                 285

Asn Gln Val Ser Leu Thr Cys Leu Val Lys Gly Phe Tyr Pro Ser Asp
             290                 295                 300

Ile Ala Val Glu Trp Glu Ser Asn Gly Gln Pro Glu Asn Asn Tyr Lys
305                 310                 315                 320

Thr Thr Pro Pro Met Leu Asp Ser Asp Gly Ser Phe Phe Leu Tyr Ser
                 325                 330                 335

Lys Leu Thr Val Asp Lys Ser Arg Trp Gln Gln Gly Asn Val Phe Ser
                 340                 345                 350

Cys Ser Val Met His Glu Ala Leu His Asn His Tyr Thr Gln Lys Ser
             355                 360                 365

Leu Ser Leu Ser Pro Gly Lys
             370                 375

<210> SEQ ID NO 8
<211> LENGTH: 385
<212> TYPE: PRT
<213> ORGANISM: Artificial Sequence
<220> FEATURE:
<223> OTHER INFORMATION: Synthetic Construct

<400> SEQUENCE: 8

Val Glu Cys Pro Pro Cys Pro Ala Pro Pro Val Ala Gly Pro Ser Val
1               5                   10                  15

Phe Leu Phe Pro Pro Lys Pro Lys Asp Thr Leu Met Ile Ser Arg Thr
             20                  25                  30

Pro Glu Val Thr Cys Val Val Val Asp Val Ser His Glu Asp Pro Glu
         35                  40                  45

Val Gln Phe Asn Trp Tyr Val Asp Gly Val Glu Val His Asn Ala Lys
     50                  55                  60

Thr Lys Pro Arg Glu Glu Gln Phe Asn Ser Thr Phe Arg Val Val Ser
65                  70                  75                  80

Val Leu Thr Val Val His Gln Asp Trp Leu Asn Gly Lys Glu Tyr Lys
                 85                  90                  95

Cys Lys Val Ser Asn Lys Gly Leu Pro Ala Ser Ile Glu Lys Thr Ile
            100                 105                 110

Ser Lys Thr Lys Gly Gln Pro Arg Glu Pro Gln Val Tyr Thr Leu Pro
        115                 120                 125

Pro Ser Arg Glu Glu Met Thr Lys Asn Gln Val Ser Leu Thr Cys Leu
130                 135                 140

Val Lys Gly Phe Tyr Pro Ser Asp Ile Ala Val Glu Trp Glu Ser Asn
145                 150                 155                 160

Gly Gln Pro Glu Asn Asn Tyr Lys Thr Thr Pro Pro Met Leu Asp Ser
                165                 170                 175

Asp Gly Ser Phe Phe Leu Tyr Ser Lys Leu Thr Val Asp Lys Ser Arg
        180                 185                 190

Trp Gln Gln Gly Asn Val Phe Ser Cys Ser Val Met His Glu Ala Leu
                195                 200                 205

His Asn His Tyr Thr Gln Lys Ser Leu Ser Leu Ser Pro Gly Lys Gly
        210                 215                 220

Ser Gly Gly Gly Ser Gly Gly Gly Ser Gly Gly Gly Ser Ala
225                 230                 235                 240

Pro Ile Ser Ser His Cys Arg Leu Asp Lys Ser Asn Phe Gln Gln Pro
                245                 250                 255

Tyr Ile Thr Asn Arg Thr Phe Met Leu Ala Lys Glu Ala Ser Leu Ala
        260                 265                 270

Asp Asn Asn Thr Asp Val Arg Leu Ile Gly Glu Lys Leu Phe His Gly
        275                 280                 285

Val Ser Met Ser Glu Arg Cys Tyr Leu Met Lys Gln Val Leu Asn Phe
290                 295                 300

Thr Leu Glu Glu Val Leu Phe Pro Gln Ser Asp Arg Phe Gln Pro Tyr
305                 310                 315                 320

Met Gln Glu Val Val Pro Phe Leu Ala Arg Leu Ser Asn Arg Leu Ser
                325                 330                 335

Thr Cys His Ile Glu Gly Asp Asp Leu His Ile Gln Arg Asn Val Gln
        340                 345                 350

Lys Leu Lys Asp Thr Val Lys Lys Leu Gly Glu Ser Gly Glu Ile Lys
        355                 360                 365

Ala Ile Gly Glu Leu Asp Leu Leu Phe Met Ser Leu Arg Asn Ala Cys
370                 375                 380

Ile
385

<210> SEQ ID NO 9
<211> LENGTH: 375
<212> TYPE: PRT
<213> ORGANISM: Artificial Sequence
<220> FEATURE:
<223> OTHER INFORMATION: Synthetic Construct

<400> SEQUENCE: 9

Val Glu Cys Pro Pro Cys Pro Ala Pro Pro Val Ala Gly Pro Ser Val
1               5                   10                  15

Phe Leu Phe Pro Pro Lys Pro Lys Asp Thr Leu Met Ile Ser Arg Thr
            20                  25                  30

Pro Glu Val Thr Cys Val Val Val Asp Val Ser His Glu Asp Pro Glu
        35                  40                  45

Val Gln Phe Asn Trp Tyr Val Asp Gly Val Glu Val His Asn Ala Lys
    50                  55                  60

Thr Lys Pro Arg Glu Glu Gln Phe Asn Ser Thr Phe Arg Val Val Ser
 65                  70                  75                  80

Val Leu Thr Val Val His Gln Asp Trp Leu Asn Gly Lys Glu Tyr Lys
                 85                  90                  95

Cys Lys Val Ser Asn Lys Gly Leu Pro Ala Ser Ile Glu Lys Thr Ile
            100                 105                 110

Ser Lys Thr Lys Gly Gln Pro Arg Glu Pro Gln Val Tyr Thr Leu Pro
        115                 120                 125

Pro Ser Arg Glu Glu Met Thr Lys Asn Gln Val Ser Leu Thr Cys Leu
130                 135                 140

Val Lys Gly Phe Tyr Pro Ser Asp Ile Ala Val Glu Trp Glu Ser Asn
145                 150                 155                 160

Gly Gln Pro Glu Asn Asn Tyr Lys Thr Thr Pro Pro Met Leu Asp Ser
                165                 170                 175

Asp Gly Ser Phe Phe Leu Tyr Ser Lys Leu Thr Val Asp Lys Ser Arg
            180                 185                 190

Trp Gln Gln Gly Asn Val Phe Ser Cys Ser Val Met His Glu Ala Leu
        195                 200                 205

His Asn His Tyr Thr Gln Lys Ser Leu Ser Leu Ser Pro Gly Lys Ala
210                 215                 220

Ser Thr Lys Gly Pro Ala Pro Ile Ser Ser His Cys Arg Leu Asp Lys
225                 230                 235                 240

Ser Asn Phe Gln Gln Pro Tyr Ile Thr Asn Arg Thr Phe Met Leu Ala
                245                 250                 255

Lys Glu Ala Ser Leu Ala Asp Asn Asn Thr Asp Val Arg Leu Ile Gly
            260                 265                 270

Glu Lys Leu Phe His Gly Val Ser Met Ser Glu Arg Cys Tyr Leu Met
        275                 280                 285

Lys Gln Val Leu Asn Phe Thr Leu Glu Glu Val Leu Phe Pro Gln Ser
290                 295                 300

Asp Arg Phe Gln Pro Tyr Met Gln Glu Val Val Pro Phe Leu Ala Arg
305                 310                 315                 320

Leu Ser Asn Arg Leu Ser Thr Cys His Ile Glu Gly Asp Asp Leu His
                325                 330                 335

Ile Gln Arg Asn Val Gln Lys Leu Lys Asp Thr Val Lys Lys Leu Gly
            340                 345                 350

Glu Ser Gly Glu Ile Lys Ala Ile Gly Glu Leu Asp Leu Leu Phe Met
        355                 360                 365

Ser Leu Arg Asn Ala Cys Ile
370                 375

<210> SEQ ID NO 10
<211> LENGTH: 308
<212> TYPE: PRT
<213> ORGANISM: Artificial Sequence
<220> FEATURE:
<223> OTHER INFORMATION: Synthetic Construct

<400> SEQUENCE: 10

Ala Pro Ile Ser Ser His Cys Arg Leu Asp Lys Ser Asn Phe Gln Gln
1               5                   10                  15

Pro Tyr Ile Thr Asn Arg Thr Phe Met Leu Ala Lys Glu Ala Ser Leu
            20                  25                  30

Ala Asp Asn Asn Thr Asp Val Arg Leu Ile Gly Glu Lys Leu Phe His
        35                  40                  45

Gly Val Ser Met Ser Glu Arg Cys Tyr Leu Met Lys Gln Val Leu Asn
                50                  55                  60

Phe Thr Leu Glu Glu Val Leu Phe Pro Gln Ser Asp Arg Phe Gln Pro
 65                  70                  75                  80

Tyr Met Gln Glu Val Val Pro Phe Leu Ala Arg Leu Ser Asn Arg Leu
                 85                  90                  95

Ser Thr Cys His Ile Glu Gly Asp Asp Leu His Ile Gln Arg Asn Val
                100                 105                 110

Gln Lys Leu Lys Asp Thr Val Lys Lys Leu Gly Glu Ser Gly Glu Ile
                115                 120                 125

Lys Ala Ile Gly Glu Leu Asp Leu Leu Phe Met Ser Leu Arg Asn Ala
130                 135                 140

Cys Ile Gly Ser Gly Gly Ser Gly Gly Gly Ser Gly Gly Gly
145                 150                 155                 160

Gly Ser Ala Pro Ile Ser Ser His Cys Arg Leu Asp Lys Ser Asn Phe
                165                 170                 175

Gln Gln Pro Tyr Ile Thr Asn Arg Thr Phe Met Leu Ala Lys Glu Ala
                180                 185                 190

Ser Leu Ala Asp Asn Asn Thr Asp Val Arg Leu Ile Gly Glu Lys Leu
                195                 200                 205

Phe His Gly Val Ser Met Ser Glu Arg Cys Tyr Leu Met Lys Gln Val
210                 215                 220

Leu Asn Phe Thr Leu Glu Glu Val Leu Phe Pro Gln Ser Asp Arg Phe
225                 230                 235                 240

Gln Pro Tyr Met Gln Glu Val Val Pro Phe Leu Ala Arg Leu Ser Asn
                245                 250                 255

Arg Leu Ser Thr Cys His Ile Glu Gly Asp Asp Leu His Ile Gln Arg
                260                 265                 270

Asn Val Gln Lys Leu Lys Asp Thr Val Lys Lys Leu Gly Glu Ser Gly
                275                 280                 285

Glu Ile Lys Ala Ile Gly Glu Leu Asp Leu Leu Phe Met Ser Leu Arg
290                 295                 300

Asn Ala Cys Ile
305

<210> SEQ ID NO 11
<211> LENGTH: 1
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: 1
<223> OTHER INFORMATION: Can be present in repeats of any integer

<400> SEQUENCE: 11

Gly
1

<210> SEQ ID NO 12
<211> LENGTH: 2
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(2)

```
<223> OTHER INFORMATION: Can be present in repeats of any integer

<400> SEQUENCE: 12

Gly Ser
1

<210> SEQ ID NO 13
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(5)
<223> OTHER INFORMATION: Can be present in repeats of any integer

<400> SEQUENCE: 13

Gly Ser Gly Gly Ser
1               5

<210> SEQ ID NO 14
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(5)
<223> OTHER INFORMATION: Can be present in repeats of any integer

<400> SEQUENCE: 14

Gly Gly Gly Gly Ser
1               5

<210> SEQ ID NO 15
<211> LENGTH: 4
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(4)
<223> OTHER INFORMATION: Can be present in repeats of any integer

<400> SEQUENCE: 15

Gly Gly Gly Ser
1

<210> SEQ ID NO 16
<211> LENGTH: 5
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(5)
<223> OTHER INFORMATION: Can be present in repeats of any integer up to
      8

<400> SEQUENCE: 16

Gly Gly Gly Gly Ser
1               5

<210> SEQ ID NO 17
<211> LENGTH: 15
```

```
<212> TYPE: PRT
<213> ORGANISM: Artificial Sequence
<220> FEATURE:
<223> OTHER INFORMATION: Synthetic Construct

<400> SEQUENCE: 17

Gly Gly Gly Gly Ser Gly Gly Gly Gly Ser Gly Gly Gly Gly Ser
1               5                   10                  15

<210> SEQ ID NO 18
<211> LENGTH: 30
<212> TYPE: PRT
<213> ORGANISM: Artificial Sequence
<220> FEATURE:
<223> OTHER INFORMATION: Synthetic Construct

<400> SEQUENCE: 18

Gly Gly Gly Gly Ser Gly Gly Gly Gly Ser Gly Gly Gly Gly Ser Gly
1               5                   10                  15

Gly Gly Gly Ser Gly Gly Gly Gly Ser Gly Gly Gly Gly Ser
            20                  25                  30

<210> SEQ ID NO 19
<211> LENGTH: 15
<212> TYPE: PRT
<213> ORGANISM: Artificial Sequence
<220> FEATURE:
<223> OTHER INFORMATION: Synthetic Construct
<220> FEATURE:
<221> NAME/KEY: VARIANT
<222> LOCATION: (1)..(15)
<223> OTHER INFORMATION: Can be present in repeats of any integer up to
      3

<400> SEQUENCE: 19

Gly Ser Thr Ser Gly Ser Gly Lys Pro Gly Ser Gly Glu Gly Ser
1               5                   10                  15
```